United States Patent [19]

Hayball et al.

[11] Patent Number: 6,018,625

[45] Date of Patent: Jan. 25, 2000

[54] MANAGEMENT SYSTEM ARCHITECTURE AND DESIGN METHOD TO SUPPORT REUSE

[75] Inventors: Clive Colin Hayball, Sawbridgeworth; Peter Jamieson Tattersfield, Chelmsford; Nigel Lawrence Bragg, Colville, all of United Kingdom

[73] Assignee: Northern Telecom Limited, Montreal, Canada

[21] Appl. No.: 08/921,225

[22] Filed: Aug. 27, 1997

[51] Int. Cl.$^7$ .................................................. G06F 15/173
[52] U.S. Cl. ..................... 395/500.43; 709/223; 709/302; 709/303
[58] Field of Search ............................... 395/500, 500.34, 395/500.43, 500.42, 500.41, 200.53–200.56, 680–683; 709/223–226, 300, 302, 303

[56] References Cited

U.S. PATENT DOCUMENTS

| 5,317,742 | 5/1994 | Bapat | 395/680 |
| 5,375,070 | 12/1994 | Hershey et al. | 709/224 |
| 5,559,958 | 9/1996 | Farrand et al. | 395/183.03 |
| 5,680,325 | 10/1997 | Rohner | 395/500.34 |
| 5,774,689 | 6/1998 | Curtis et al. | 395/500.34 |

FOREIGN PATENT DOCUMENTS

| 0 585 052 A1 | 3/1994 | European Pat. Off. . |
| 2308779 | 7/1997 | United Kingdom . |
| WO 95/34856 | 12/1995 | WIPO . |
| WO 95/34974 | 12/1995 | WIPO . |
| WO 95/34975 | 12/1995 | WIPO . |

OTHER PUBLICATIONS

Sundstrom et al., "Principle–Driven Design of an Integrated Graphical Support System: Enhancing Joint Human–Machine Network Management", 1991 IEEE Int'l Conf. On Systems, Man, and Cybernetics, Decision Aiding for Complex Systems, pp. 1133–1138, vol. 2.

Sankar et al., "Performance Trending for Management of High–Speed Packet–Switched Networks", IEEE, GLOBECOM '93 Global Telecommunications Conf., 1993, pp. 1777–1781, vol. 3.

Mouchtaris et al., "An Object–Oriented Interface for a Distributed Connection Manager", IEEE Int'l Conf. On Communications, 1994, SUPERCOMM/ICC '94, pp. 273–277, vol. 1.

E.J. Reger, "Implementation of the Monitor and Control System for the Caribbean Regional Operations Center (CARIBROC) Communications Network", 1994 IEEE Military Communications Conf., MILCOM '94, pp. 669–673, vol. 2.

Soo–Hyun Park et al., "Platform Independent Class Repository of TMN in Personal Communication Network using Entity–Aspect Oriented Programming", 4th Int'l Workshop on Real–Time Computing Systems and Applications, IEEE, 1997, pp. 174–177.

Soo–Hyun Park et al., "The TMN Agent in PCN Based on the Entity–Aspect Model", 1997 IEEE Int'l Conf. On Personal Wireless Communications, pp. 394–398.

*Primary Examiner*—Eric W. Stamber
*Assistant Examiner*—Russell W. Frejd
*Attorney, Agent, or Firm*—Harness, Dickey & Pierce, P.L.C.

[57] ABSTRACT

A management base of a communications network manager is constructed using object oriented techniques. A network comprises a plurality of physical resources in the form of components and assemblies of components, which are distributed across the network. A management system for the network is constructed in an evolutionary manner by representing an overall functionality of the network by an application model in which each function of the network is modeled independently of its implementation, decomposing the application model into an implementation model in which every function represented in the application model is represented in the implementation model, representing the application model as a plurality of objects, representing the implementation model as another plurality of objects, connecting the objects of the application model and implementation model together to obtain a combined object model, and constructing a management base according to the combined object model.

6 Claims, 44 Drawing Sheets

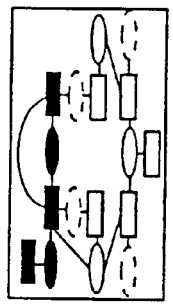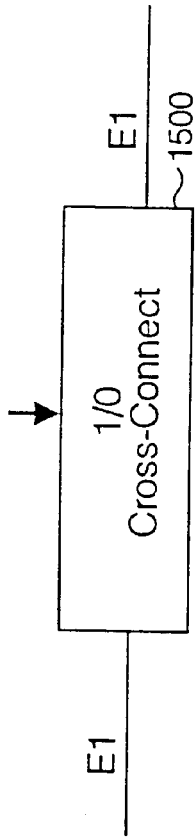
Fig. 15
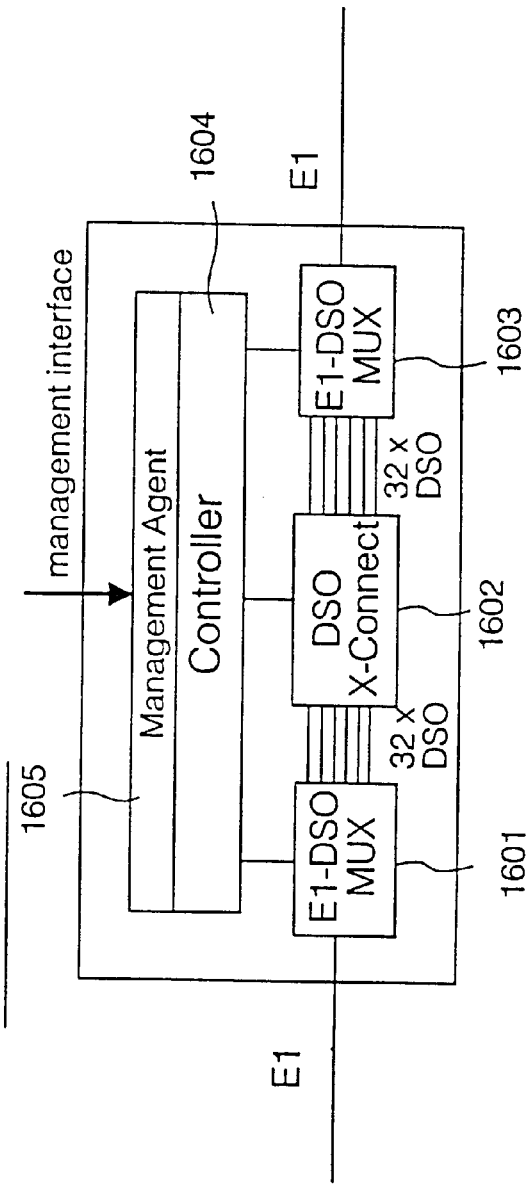
Fig. 16

Application:

Architecture:

Implementation:

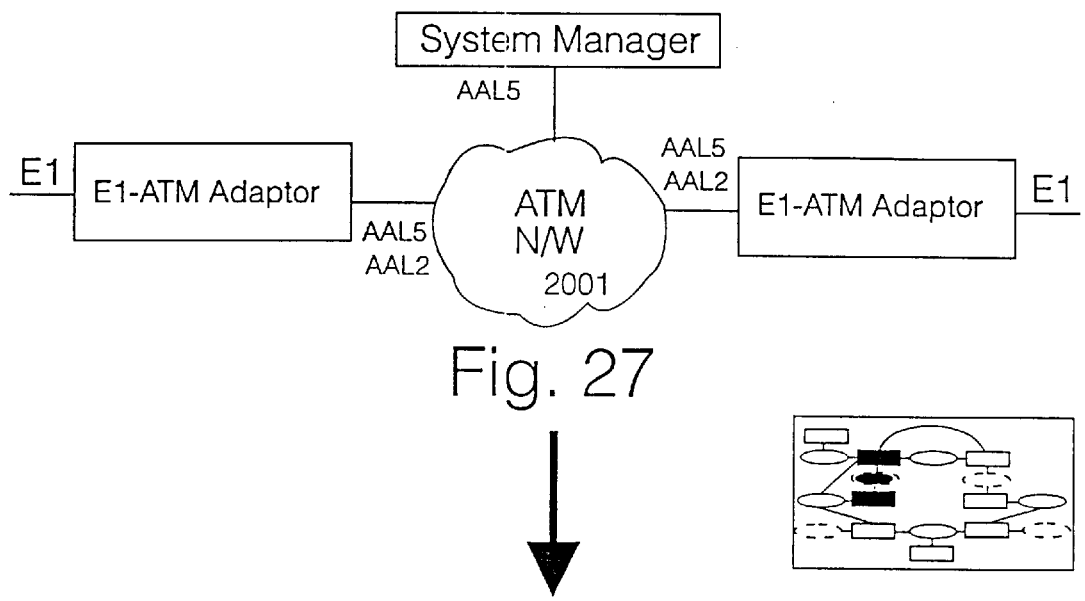
Fig. 27
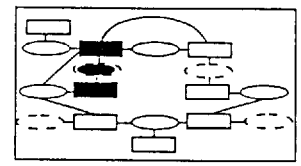
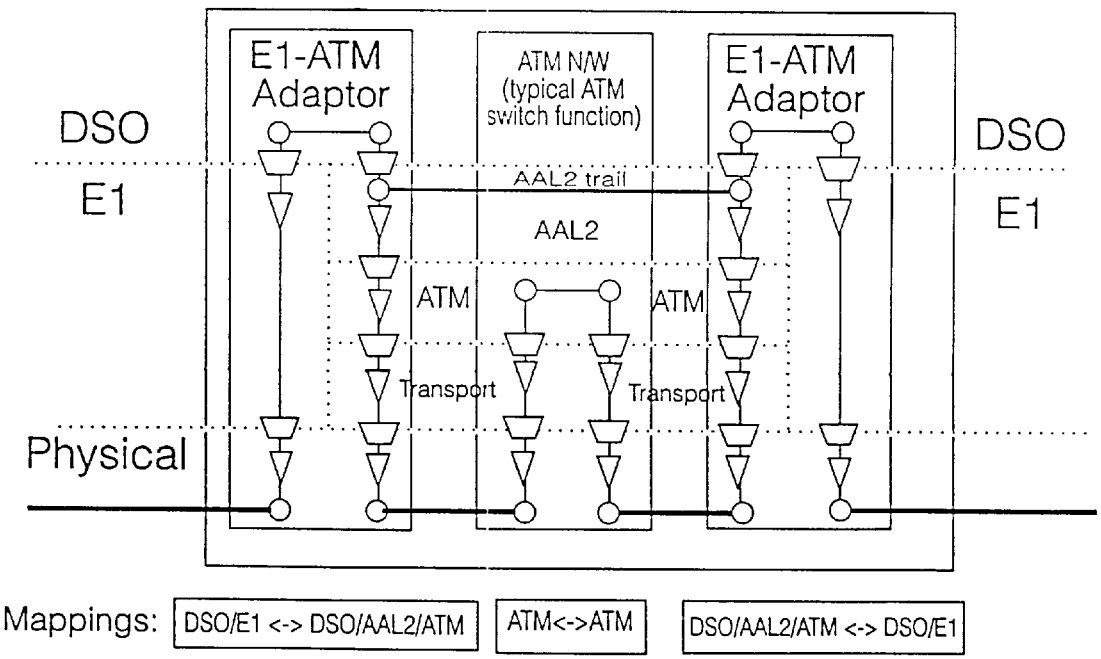
Fig. 28

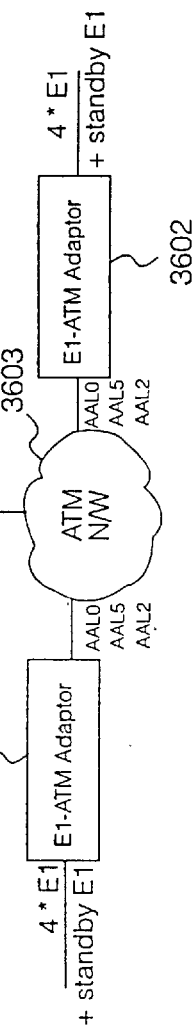
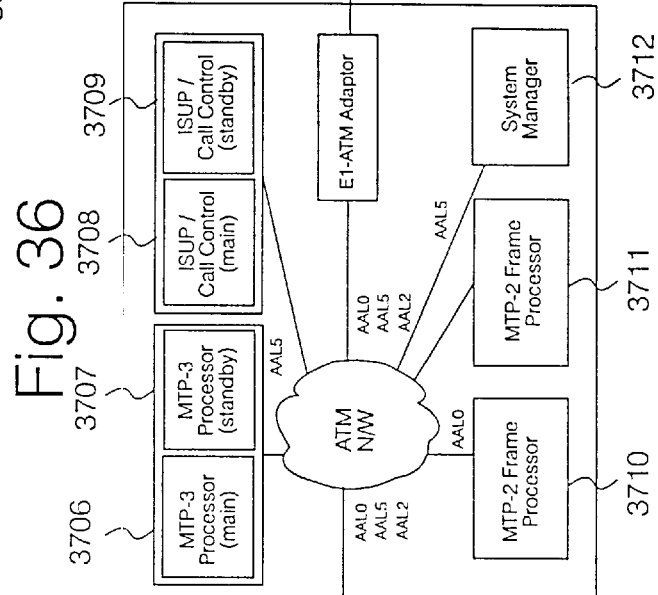
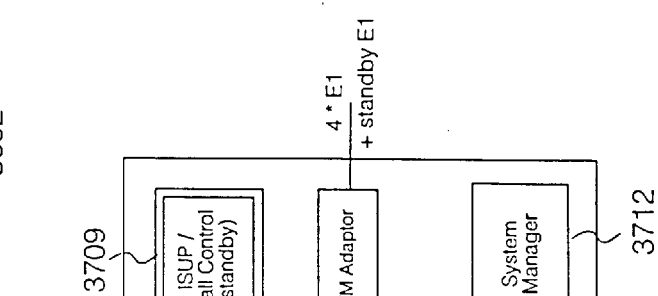
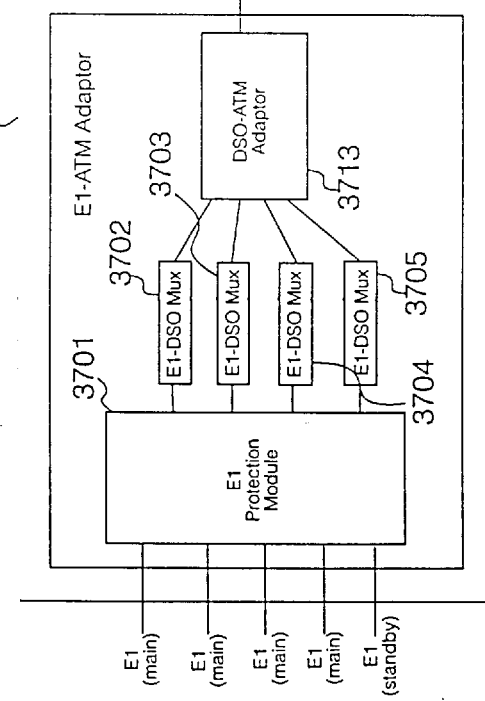
Fig. 35
Fig. 36
Fig. 37

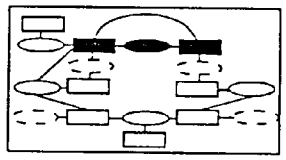
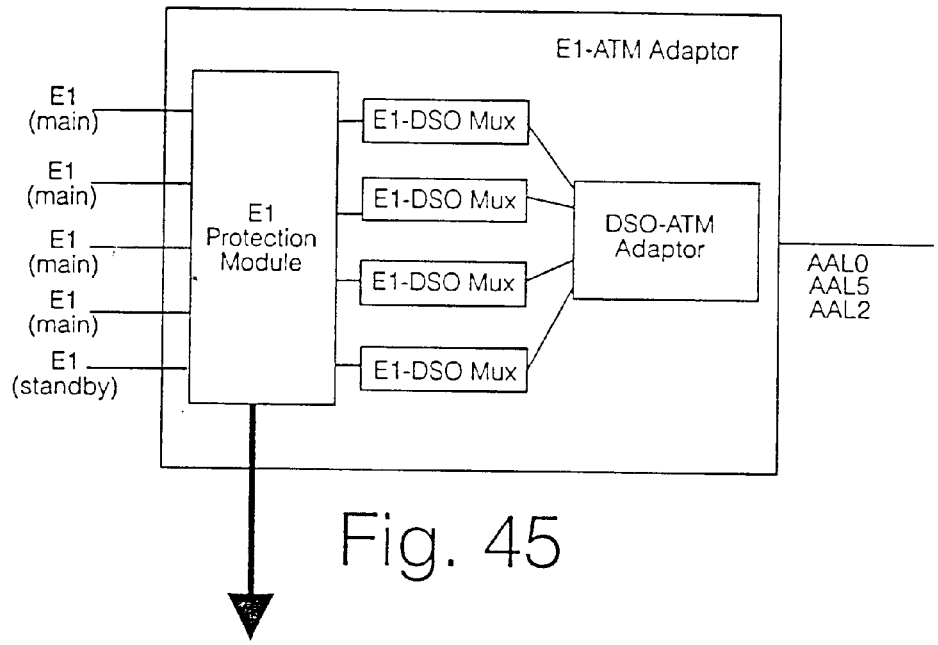
Fig. 45
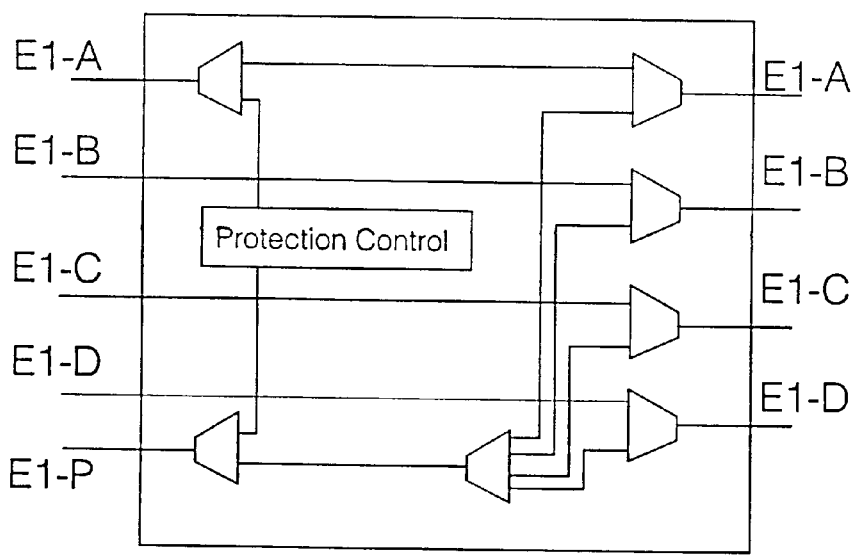
Fig. 46

MANAGEMENT SYSTEM ARCHITECTURE AND DESIGN METHOD TO SUPPORT REUSE

FIELD OF THE INVENTION

The present invention relates to the management of communications networks.

BACKGROUND TO THE INVENTION

Conventional communications networks, for example particularly broadband communications networks, are a result of continuous evolution of technologies over a number of past decades. A conventional communications network comprises a plurality of network elements, such as switches, cross-connects, repeaters and terminals. Persons designing new communications networks, or modifications to existing communications networks have a large selection of hardware based equipment items available from different manufacturers, different equipment having different performances, and operating different transmission protocols according to different standards. Even the network equipment products available from a single manufacturer can vary considerably in functionality, capability and mode of operation due to the historical development of the products, and due to takeovers, mergers and alliances between different manufacturers within the telecommunications industry. There exists a large inventory of such available "legacy" equipment, both as products currently available from manufacturers, and as existing items of network equipment currently installed and in use in communications networks. On the other hand, there exists a considerable number of standards bodies and alliances of manufacturers, concerned with steering the evolution of new communications technologies and protocols with a view to standardization and interoperability of equipment from different manufacturers. Many of the current standards and evolving technologies will form the legacy equipment and systems of the future, thereby adding to the volume of "legacy" equipment in use.

Modern broadband communications networks are required to carry an increasing volume of communications data traffic, having a mixture of traffic characteristics driven by a variety of applications. Such applications include video on demand, voice communication, and computer to computer data transfer. Operators and users of networks need to be able to manage their network resources to make the most cost effective use of communications networks, and to provide adequate services to their customers. Management of a network is involves management of operations, administration, maintenance, and provisioning of network resources (OAMP). Briefly, these elements involve the following:

Operations involves the day-to-day and often minute-to-minute care and feeding of the communications network in order to ensure that it is fulfilling its designed purpose. Examples of operations include monitoring of the network by watching for faults and invoking corrective commands and/or maintenance actions to repair them, comparing measured network performance against objectives and taking corrective action and/or invoking maintenance. Taking corrective action involves operators issuing controls to correct a fault or performance problem or to resolve a customer complaint.

Administration involves a set of activities involved with designing the network, processing orders, assigning addresses, tracking usage, and billing users of the network.

Maintenance involves circumstances that arise when a network does not work as planned, or it is necessary to diagnose and repair system faults.

Provisioning involves installing equipment, setting parameters, verifying that a service is operational and deinstallation of equipment or services.

Conventionally, such network management may be achieved through a network controller apparatus. As illustrated schematically in FIG. 1 herein, a conventional communications network comprises a plurality of heterogeneous network elements NE, controlled and operated by one or more network controllers NC. The network elements may be of different manufacturers', and having different capabilities and protocols. A network controller NC typically comprises a workstation capable of accessing an operation, administration and management (OAM) channel communicating with each of the network elements. The network controller receives and sends messages over the operation and management channel in the form of control signals in accordance with standard and/or proprietary protocols. Examples of widely used protocols include the simple network management protocol (SNMP) which is defined in EITF Standards. Another standard network management protocol is the known common management information protocol (CMIP) of the Open System Interconnect (OSI) Committee of the International Telecommunications Union (ITU-T). Other network management protocols in use include TL1 and a variety of proprietary management protocols. Currently, the two prevailing protocols used to convey management information in communications systems are SNMP and CMIP. There is general agreement that SNMP and its successor SNMP v2 are more suitable for customer premises equipment and private networks, whilst the common management information protocol, and the associated common management information service elements (CMISE) are more appropriate for carrier interconnection. For some devices, such as early asynchronous transfer mode (ATM) switches, it is simpler and easier to achieve interoperability with SNMP than it is with CMIP.

Although SNMP was developed with the intention of later intercepting the International Standard Organization Standards such as CMIP, there are fundamental differences between the SNMP and CMIP protocols which have traditionally inhibited inter-working of the two protocols. Differences between the SNMP and CMIP protocols are illustrated in table 1 herein.

TABLE 1

| CMIP (paradigm - object | SNMP (paradigm - relational) oriented) |
|---|---|
| Management Information | Management Information |
| Complex object classes with attributes, events and actions | Simple object types (simple variables without attributes, plus tables of simple variables) No actions or events (SNMP traps are not associated with objects |
| Separate hierarchies for registration (naming), containment and inheritance Identification of instances based on containment plus distinguished attributes | A single hierarchy which is used for both naming and containment. No inheritance Identification of instances based on position in hierarchy plus, for table entries, a simple index value |

Several attempts have been made to align the SNMP and CMIP protocols and models. However, many of these approaches are flawed. Such approaches include:

CMOT (Abbreviation of CMIP over TCP/IP)

The internet community have proposed how to use the CMIP protocol to manage transmission and control protocol/internet protocol (TCP/IP). CMOT fails because it requires significant changes to internet equipment. CMOT has survived only as a definition of an alternative transport layer protocol for CMIP.

IIMC (abbreviation of ISO/CCITT Internet Management Coexistence)

The Network Management Forum (NMF) has endorsed a scheme for translation between CMIP and SNMP management information bases (MIBS). This approach is undesirable because it merely provides a syntactic translation between SNMP and CMIP MIB formats.

In the Network Management Forum (NMF) approach, there is proposed a "Proxy" mechanism which translates between functionally equivalent service, protocol and management information base differences. SNMP object types are mapped to "equivalent" ISO/CCITT object classes and attributes as illustrated schematically in FIG. 2 herein. No attempt is made to modify the basic shape of the SNMP management information base, so classes normally seen in GDMO management information bases such as the connection object from ITU-T Recommendation G.803 do not appear. The structure of the management information base and the access mechanisms having protocol specific views of the management information base are cleanly separated in the NMF model. The NMF concept enables a network-wide model to be constructed which is independent of the various "views" upon it. Neither of the above approaches addresses the key issue of how to manage systems composed of multiple heterogeneous network elements.

Independent proposals made within the International Community for development of management models for communications networks include.

IBM (International Business Machines) have proposed how to organize a single management information base such that it can be independently accessed by either CMIP or SNMP protocols.

The network management forum has specified a protocol independent management information base format and is encouraging the development of commercial tools to provide protocol specific access.

The ATM Forum has used a protocol independent notation to model requirements for ATM network and element management.

Referring to FIG. 3 herein in the IBM scheme, a protocol independent management information base 300 is provided with a generic interface 301. The generic interface 301 is accessed via an SNMP protocol object 302, and/or CMIP protocol object 303, comprising respectively an SNMP interface 304 and a CMIP interface 305.

However, despite these proposals, current management systems for telecommunications networks are constructed on an ad hoc basis. Once system designers have designed a new communications network, or a modification to an existing communications network, the network manager system is created, reflecting the structure, connections and services present in the new network. The conventional management system comprises a management information base, in the form of a data storage device storing electronic data signals describing each of the network elements of the network, their interconnections, and the services and protocols supported by those network elements.

Problems which occur with the conventional approach network management include:

Each time a new network is designed, a new custom-made management information base needs to be created.

Conventional methods of management information base creation involve considering the design of a management information base as a whole whenever a new type of network element is created, or whenever a new network element is added to an existing network. For example when a new network element is added to an existing network, changes to the data stored in the management information base must be added to reflect the addition of the new network element. In conventional management information bases, the changes to the management information base required on addition of a new network element are difficult to contain due to the cross-references between data items stored in the MIB.

Conventional management systems are not easily scaleable. As the complexity of the network increases, so does the complexity of the management information base required. For networks having more than a few hundred nodes, a plurality of network management systems are used. This results in architectural complexity of management systems in order to compensate for lack of scaleability in the inherent design of the management system.

SUMMARY OF THE INVENTION

One object of the present invention is provide a process which enables faster construction of a network management system for a communications network, by supporting re-usability of network management system constructions.

Another object of the present invention is to provide a process for constructing a network management system in which containment of changes to the management system is achieved, on addition of new hardware and software item types to a communications network.

Another object of the present invention is to introduce readily scaleable architectures into a network management system with a view to reducing time to market.

A further object of the present invention is to provide a way of constructing a network management system which is adaptable to being distributed across a communications network.

In the specific methods and embodiments of the proposed approach herein, a network is considered to comprise a plurality of components, a component being a replaceable unit of manufacture which lends itself to duplication throughout a network and which is manageable by a discrete unit of management functionality. A plurality of components are assembled, or co-operate with each other to form a composite of components, which provides functionality based on the functionality of individual components comprising the composites.

By providing a network management apparatus which is structured in a way which reflects the assemblies of components, composites and systems of a network, independently of their functionality, there may be created a management platform which supports management control of internal features of network systems and composites of network components in a graded manner, in which management access can be achieved throughout a plurality of levels of a network.

According to a first aspect of the present invention, there is provided a method of constructing a management base of a communications network, said communications network comprising:

a plurality of components, each component comprising a unit of manufacture providing a functionality within said network, and which is capable of being managed individually as a discrete entity;

said plurality of components arranged into a plurality of assemblies of components, each said assembly arranged to co-operate with other said assemblies, and each said assembly capable of being managed as a whole;

said method comprising the steps of:

representing an overall functionality of said network by an application model, in which each said function of said network is modeled independently of its implementation within said network;

decomposing said application model into an implementation model, in which every function represented by said application model is represented in said implementation model;

representing said application model as a first plurality of objects;

representing said implementation model as a second plurality of objects;

connecting said first plurality of objects with said second plurality of objects to obtain a combined object model; and constructing said management base in accordance with said combined object model.

A management system is constructed from a plurality of managed objects according to a model which reflects both the pure functionality of composites, at an application level and the implementation of those functions by the composites and components, at an implementation level. Functionality at the application levels and implementation levels is represented in the arrangement of managed objects comprising the network management system, which are separated into application level models and implementation level models, which are used to construct a management information base.

This may allow separation of a network application functionality, for example system, which is being managed from management of an item of equipment such as a component or a composite.

Preferably, said step of representing said application model as a first plurality of objects comprises modeling a connectivity layering between individual modeled functions within said application model.

Preferably, said step of representing said implementation model as a second plurality of objects comprises modeling connectivities between assemblies of components at a first layer and assemblies of components at a second layer.

Preferably, the method comprises the step of optimizing said application class model by identifying symmetrical portions of said application class model; and folding said symmetrical portions to obtain a folded application class model.

Preferably said method comprises the step of optimizing said implementation class model by identifying symmetrical portions of said implementation class model; and folding said symmetrical portions of said implementation class model to obtain a folded implementation class model.

Suitably, individual portions of said implementation model representing duplicated components or assemblies of components are re-used within said implementation model.

Suitably, individual elements of said application model representing a duplicated said component, or a duplicated said assembly of components is re-used within said application model.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 15 illustrates a "black box" application view of a composite according to the method of FIG. 14;

FIG. 16 illustrates an implementation view internal layout of a composite according to the method of FIG. 14;

FIG. 27 illustrates a simplified block diagram of the E1 1/0 cross-connect architecture;

FIG. 28 illustrates a layered implementation representation of the E1 1/0 cross-connect over ATM system;

FIG. 35 illustrates a "black box" view of an ATM transit exchange application;

FIG. 36 illustrates a clock diagram architecture for the transit exchange of FIG. 35;

FIG. 37 illustrates a block diagram for an implementation of the transit exchange as a set of connected components, some of which eg DS0-ATM adaptor) are reused from the E1 1/0 cross connect system;

FIG. 45 illustrates a block diagram architecture for an E1-ATM adapter;

FIG. 46 illustrates an intermediate step between the block diagram of FIG. 45 and an implementation class model of the E1-ATM adapter;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
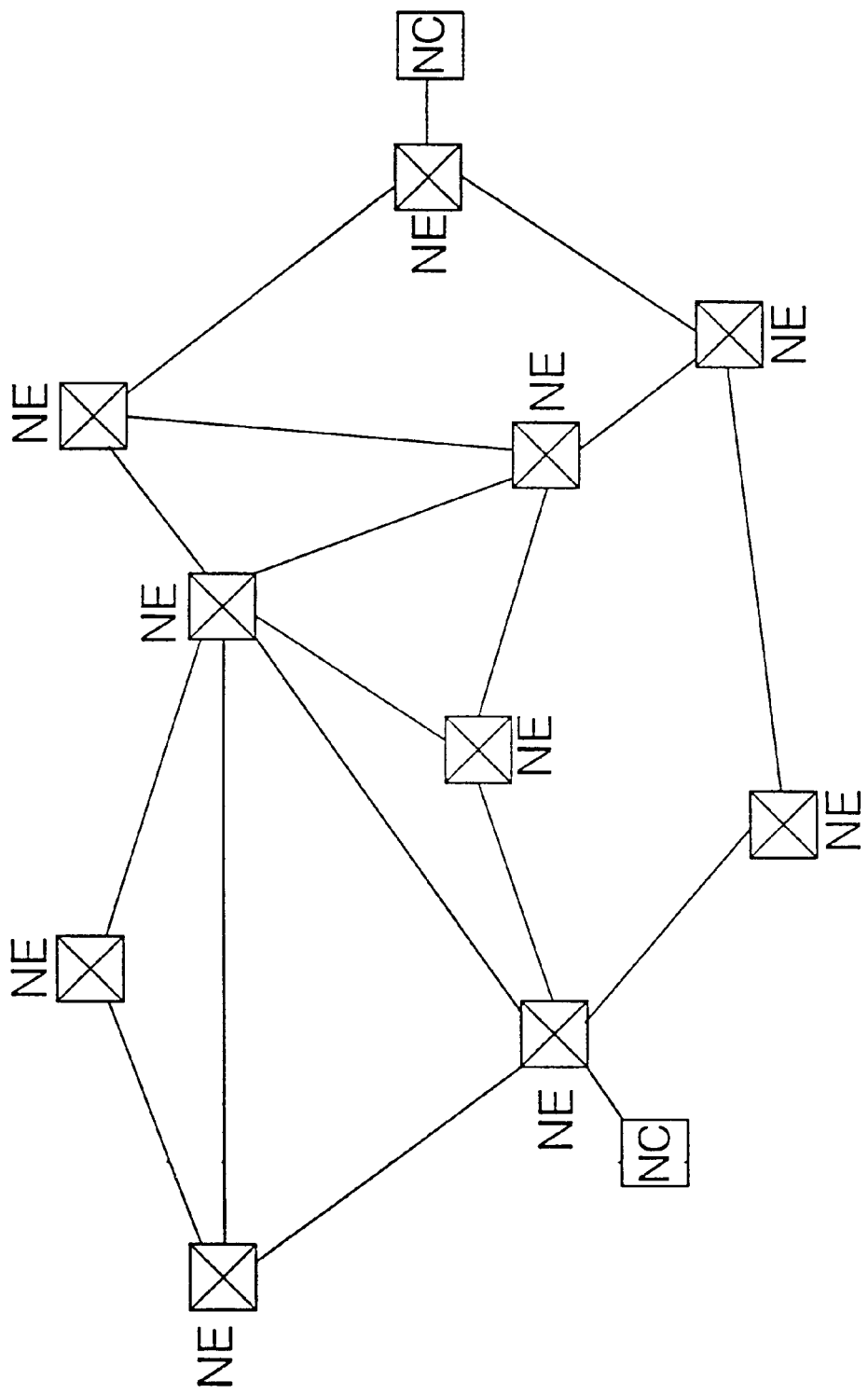
FIG. 1 illustrates a plurality of network elements and network controllers in a conventional communications network.
Figure 2:
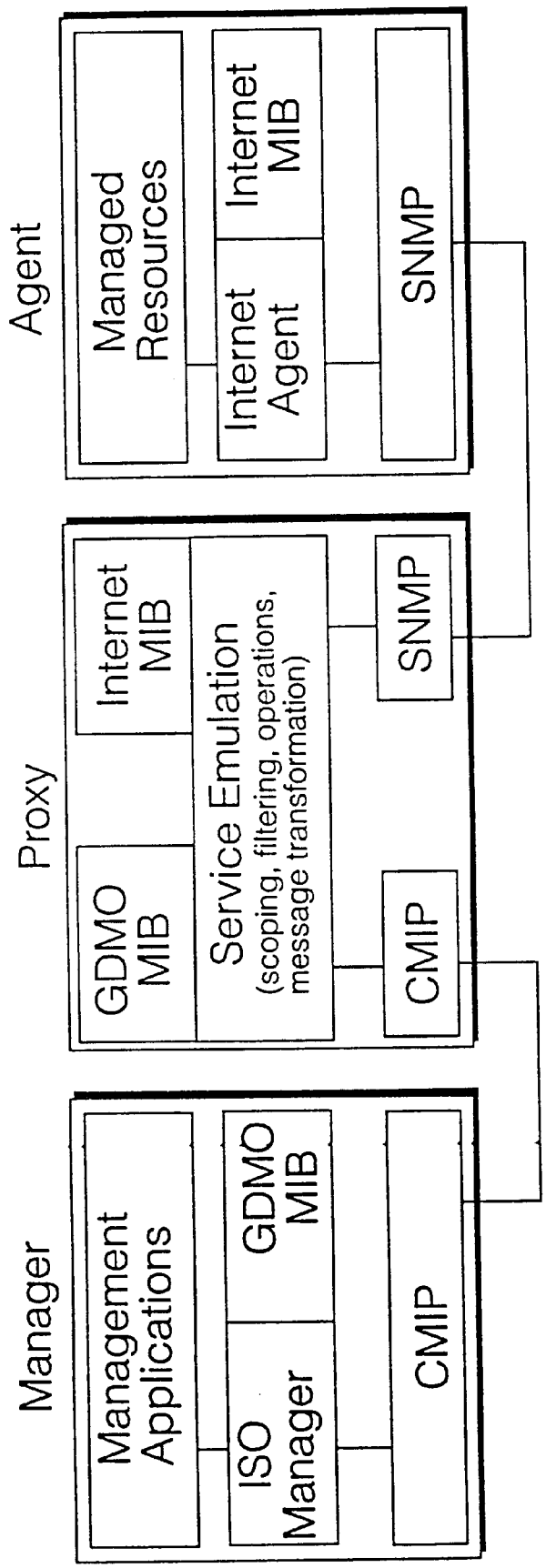
FIG. 2 illustrates a proxy mechanism for translating between SNMP objects to equivalent ISO/CCITT objects.
Figure 3:
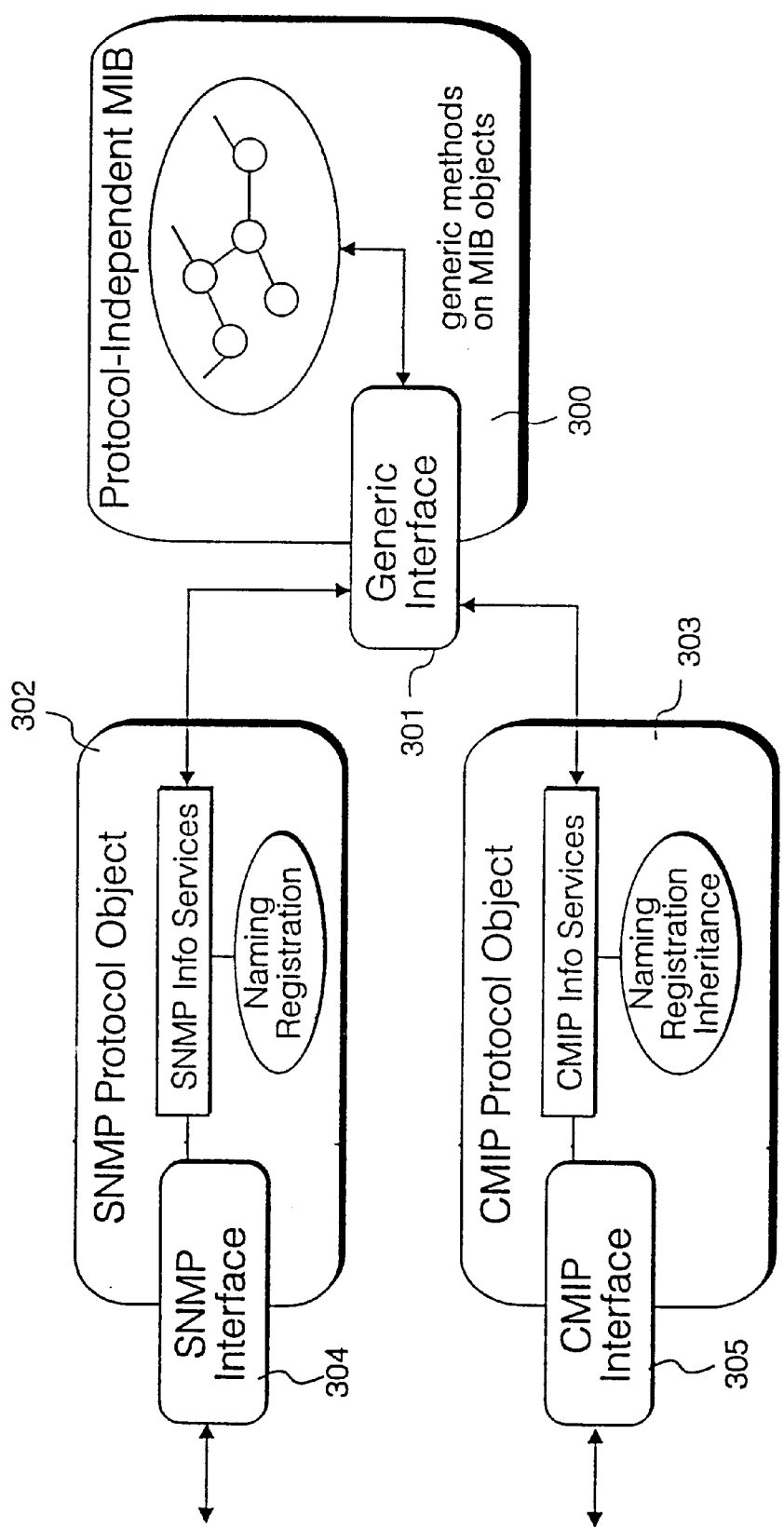
FIG. 3 illustrates a protocal independent management base with a generic interface for interfacing between an SNMP protocal object and a CMIP protocal object.
Figure 4:
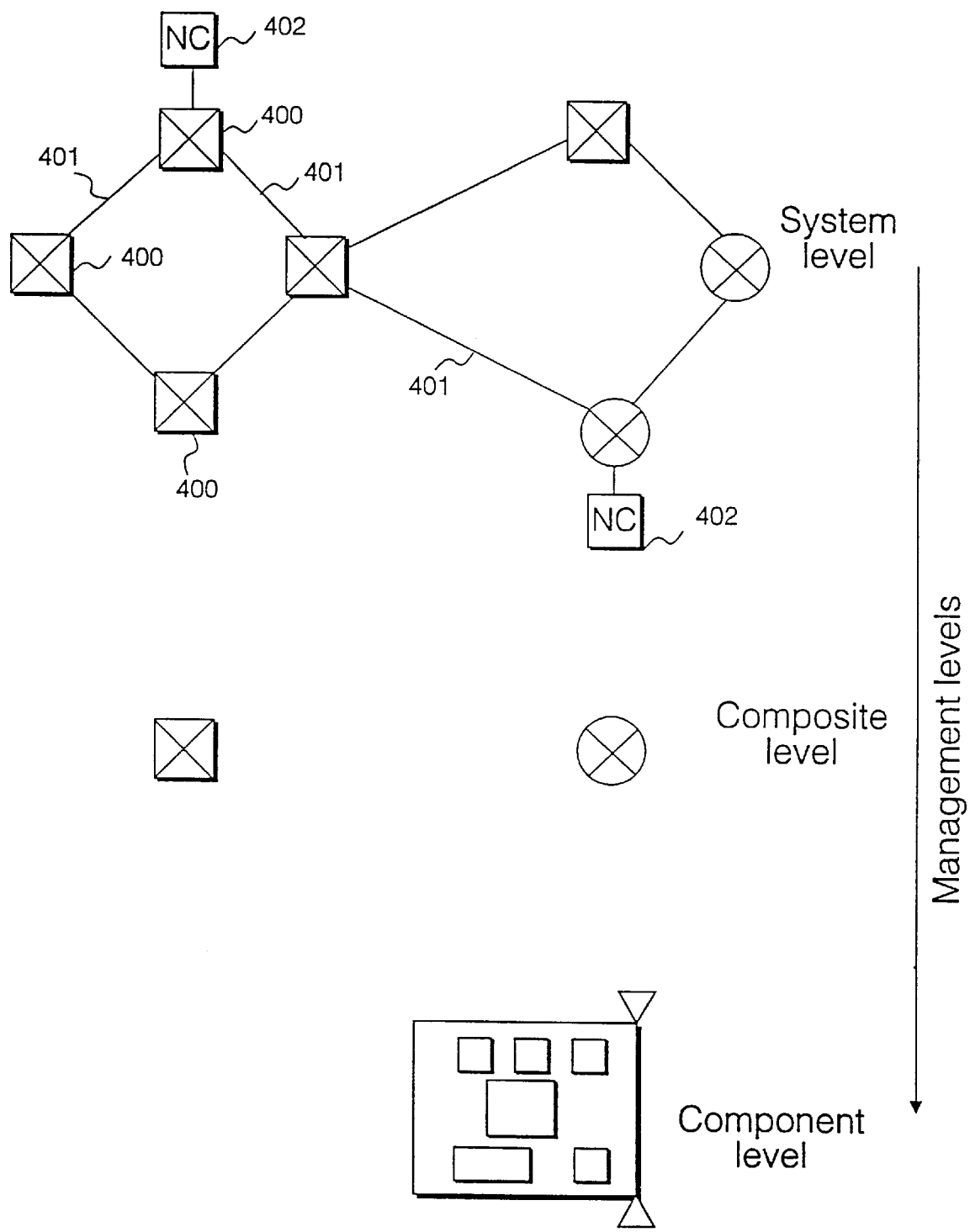
FIG. 4 illustrates an example of a communications network comprising a plurality of node elements linked together by a plurality of links, and illustrating different levels of management of the network.

Referring to FIG. 4 herein, there is shown an example of a communications network comprising a plurality of nodes 400, and a plurality of links 401, the communications network being managed by a network management system comprising one or a plurality of network controllers 402. Whereas in the conventional network shown previously in FIG. 1 herein, network elements NE which occupy nodes, comprise monolithic devices which are heterogenous from node to node, which may be of different proprietary manufacture and which are separately managed accordingly by a plurality of separate management systems, in the network of FIG. 4 herein, nodes are occupied by a plurality of components which are capable of being replicated from node to node and which support functions which may be distributed across the network in their implementation. Composite assemblies of components are created, which provide composite functionality provided by a plurality of individual components, and from the composites and components are created complete systems within the network, which provide system functionality within the network. Examples of such systems include GSM and ISDN functions realized through distributed network elements.

The network is managed at different levels of management. At a lowest level of management, termed a component level, components of equipment are managed. In this specification the term "component" is used to represent a replaceable unit of manufacture which lends itself to duplication throughout a network and which is manageable by a discrete unit of management functionality. A component comprises a lowest level of managed hardware or software which is replaceable as a unit, or which is reusable as a unit across different areas of the network, providing a reusable functionality within the network. A component may comprise for example a line card in a switch device, a port card, or a signal processing card. The component may typically comprise a replaceable card which slots into a backplane of an equipment rack module which provides power supply and means for communicating with other components. A component may comprise a unit of software for controlling one or a plurality of general purpose processor cards to perform a specific function within the network. Another example of a component may comprise a card performing a E1-DS0 multiplexor function. Another example of a component may include a passive link device, eg a fiber cable. A component, particularly a hardware component, may generally reside at a single node, but where the component comprises a unit of programming, the component may reside at a single node or be distributed across a plurality of nodes. The components each comprise a plurality of sub-components such as processor chips, buffer chips, minor hardware items or cables; however by themselves such sub-components do not provide reusable modules in a network but are used within a re-usable component.

At a composite management level, assemblies of components which are connected together to provide composite functionality are managed. In this specification, the term "composite" is used to represent an assembly of components which are arranged to co-operate with each other to provide a composite functionality which utilizes a plurality of functions provided by a plurality of components, and which are managed as a whole. An example of a composite may include a node device such as a switch or cross-connect.

At a system management level, a plurality of composites and/or components interacting with each other to provide a network system functionality are managed. In this specification the term "system" is used to represent an assembly of composites and/or components which co-operate together to perform a highest level of function which is managed as a whole within the network. A system forms a highest level of composite. A system may comprise two or more composites or components which operate to provide a self contained function, eg a service, within a network. Managed systems may be centralized at one node or may be distributed across the network. In general, composites and systems may be distributed across a plurality of nodes of the network, or may reside at a single node. The network management system may be centralized at one network controller apparatus 402, or may be distributed across a plurality of network controllers or devices, or even components, in which latter case the management system itself is managed as a special type of system composite.

A difference between a component and a composite in terms of hardware is illustrated by the following example: whereas a replaceable card device having specific functionality, eg a port card, which is managed as a whole comprises a component, on the other hand a device which is capable of carrying out a plurality of different functions, eg a general purpose processor card running a plurality of software packages, each software package being managed separately would be an example of a composite, where each software package is a component, being replaceable and reusable over different processors.

Figure 5:
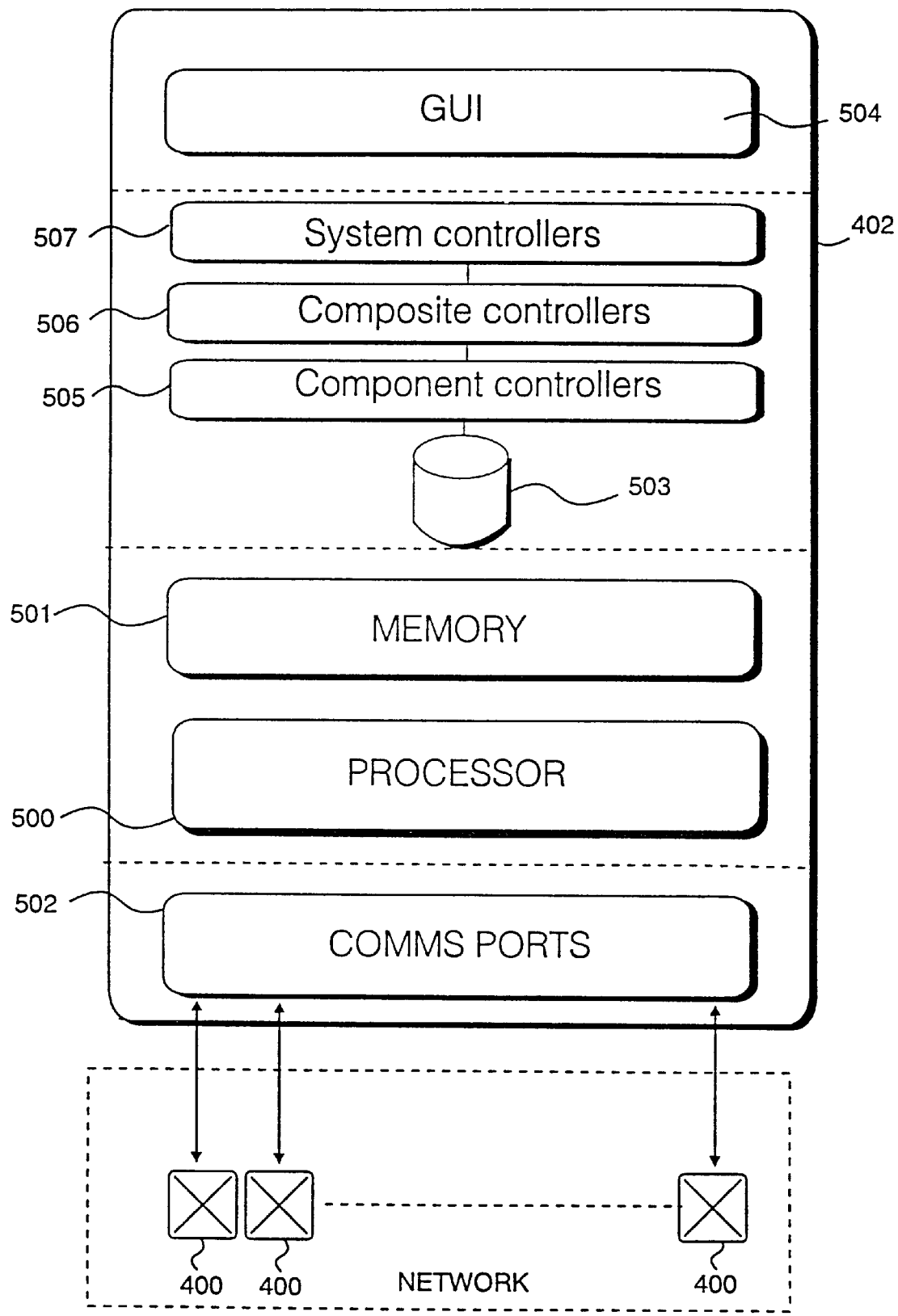
FIG. 5 illustrates a network controller apparatus comprising network management system according to a specific embodiment of the present invention.

Referring to FIG. 5 herein, there is shown schematically a network management base for managing a plurality of interconnected components, composites and systems of a communications network. The plurality of components typically comprise a multitude of heterogeneous hardware based equipment items, which may be of different proprietary manufacture, different specification and differing functionality. Individual components may be replicated across the network as part of the different composites and individual composites may be replicated across the network as different systems. The network management base comprises one or a plurality of network controller apparatus 402 each having: a processor 500 with associated memory 501; a plurality of communications ports 502 for communicating with the components, composites and systems; a data storage device 503, for example a hard disc of relatively high capacity eg 5 Gigabits; a graphical user interface 504 comprising one or plurality of video monitors, a keyboard for manual data entry, one or more data entry ports, eg floppy disc drive, CD ROM drive, and a pointing device, eg a mouse or trackball device; a plurality of component controllers 505 for providing management control signals to control management of individual components, said component controllers being arranged into a plurality of composite controllers 506 for providing management control signals to control management of composites of components, and said plurality of component controllers and/or composite controllers arranged into one or more system controllers 507 for providing management control signals to one or more corresponding respective systems of the network.

Herein, the term "component controller" is used to represent a unit of manufacture of management functionality in a management apparatus, which is capable of implementing management functions of a component by controlling that component, either directly, or by interfacing with an interface or agent of the component.

Herein, the term "composite controller" is used to represent a unit of manufacture of management functionality in a management apparatus which is capable of implementing management functions of a composite of components by controlling that composite.

Herein, the term "system controller" is used to represent a unit of manufacture of management apparatus which is capable of implementing management functions of a system.

The management base may be used by a human operator to manage a flow of communications traffic data over the network, and for performing other operation, administration and maintenance (OAM) functions including the following:
fault management
performance management
configuration management
accounting management
security management In order to perform management functions, the network controller stores, in the data storage medium 503, data describing the OAM functions which the network can perform, as well as data describing the structure of the network. Examples of functions may include basic transport functions eg cross-connect functions, frame processing etc, as well as higher level functions, such as service functions.

The collection of system controllers, composite controllers and component controllers provide an information base for use by the graphical user interface, which may comprise a number of separate applications operating to sending control signals to the controllers, for performing various management functions across the network corresponding to a control of services, and other management functions on a network-wide basis at the system level as shown in FIG. 4 herein.

Figure 6:
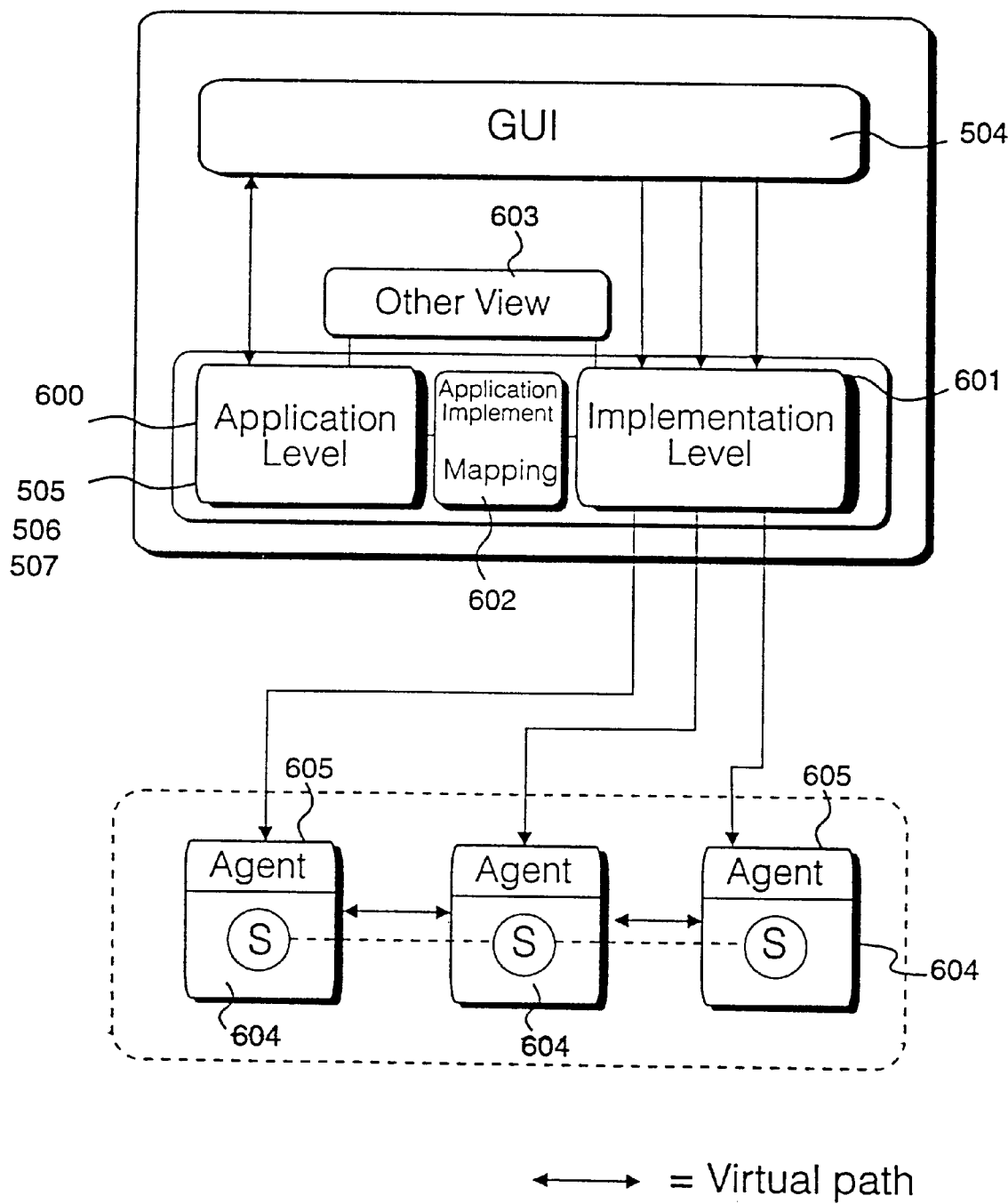
FIG. 6 illustrates an internal architecture of a network controller comprising a management system having an application controller and an implementation controller.

Referring to FIG. 6 herein, there is illustrated a logical layout and architecture of the network management base. Logically, the system controller, composite controllers and component controllers are arranged into application level elements which control systems, composites and components at an application level 600 and implementation level elements which control systems, composites and components at an implementation level 601.

In this specification, the term "application level element" is used to describe an element of a management system relating to a component, composite or system in which a functionality of said component, composite or system is represented independently of an internal structure of said component, composite or system.

An application level element may be capable of providing management signals relating to all aspects of managing a functionality of a component, composite or system independently of internal structure, for example providing signals describing a status or performance of a component, composite or system in terms of functionality, independently of internal structure or providing control of a component, composite or system independently of internal structure of the component, composite or system.

In this specification, the term "implementation level element" is used to describe an element of a management system relating to a component, composite or system, in which an internal structure of said component, composite or system is represented.

An implementation level element may be capable of providing management signals relating to all aspects of management of a component, composite or system, for example providing data signals describing status or performance of the component, composite or system, or providing management control signals for controlling internal physical resources of the component, composite or system.

The application level elements and implementation level elements communicate with each other by the sending and receiving of control and data signals according to a set of mappings 602 between the implementation level and the application level. In FIG. 6, graphical user interface 504 can retrieve from both the application level elements and the implementation level elements data concerning the functionality supported by each component, composite or system, and how they are interconnected. A user operating the graphical user interface 504 can perform management operations on the network by selecting menus, and options presented on a screen of the graphical user interface, based on data describing the systems, composites and components and their interconnection retrieved from the application level elements and the implementation level elements. The data describing the systems, composites and components may be read by other devices which may be distributed elsewhere over the network. The other devices may comprise graphical user interfaces of other network controllers which can read the data held by the application and implementation level elements on the network controller remotely via the operation, administration and maintenance channels connecting the nodes, and which may provide various management views 603 of the network, eg a Q3 interface, ISO or TCP/IP, or X.25 or ATM.

A plurality of physical components and composites 604 are managed by the management base. Each component operates to perform a specific function or functions in a communications environment. For example, an ATM switch may comprise a plurality of switch fabric cards which receive cells of data signals and switch them to various destinations. The individual cards are components; the ATM switch is a composite.

Operation of a physical component or composite is typically effected by local control mechanisms of the component or composite. The local controls may comprise one or a set of processors, driven by application software items S specific to the component or composite and which may support a service, based upon connection and transmission of signals over physical links connecting the nodes.

The internal software of components provides their functionality. The internal software of physical composites provides access to the functionality of their embedded components. A physical component or composite may comprise an agent interface 605 which interfaces between the local control mechanism of the component or composite and its component or composite controller within the management system. The local control mechanisms may comprise dedicated coded instructions which directly control the component or composite and may be proprietary and differ from device to device.

A physical component or composite receives OAM signals via its corresponding respective agent interface or directly to its local controller. The agent 605 decodes the received OAM signals and implements control of the individual component(s) to effect a management operation described by the OAM signals. For example, as shown in FIG. 6, each device may be implementing a connection service such as an ATM virtual path. On receipt of OAM signals from a corresponding respective plurality of component or composite controllers, one per device, the devices may co-operate to reconfigure the service, eg. by routing the virtual path, creating or releasing connections.

Figure 7:
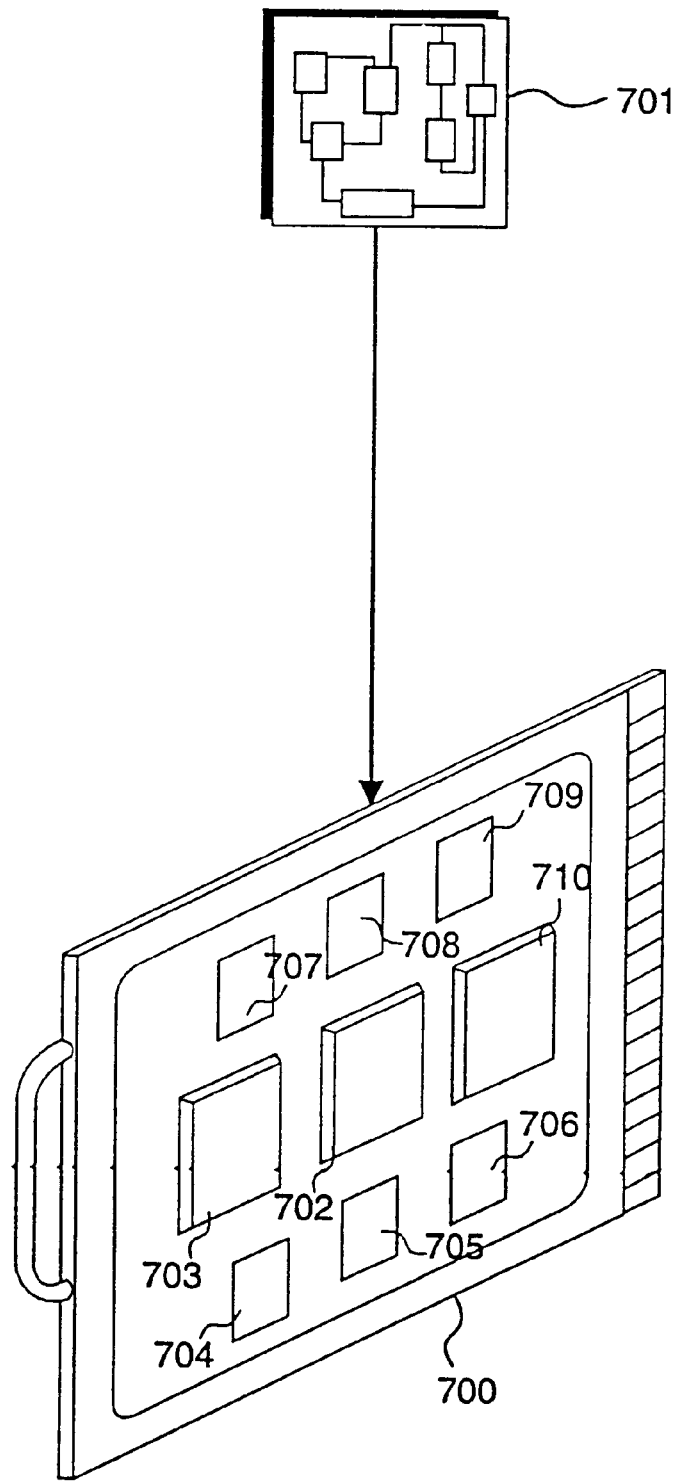
FIG. 7 illustrates a replaceable component of a communications network, together with a component controller for controlling functionality of the component.

Referring to FIG. 7 herein there is illustrated an example of a managed component 700, for example a line card, switch fabric card or a signal processing card or the like together with a component controller 701 for managing the component. The component 700 comprises a plurality of sub-components 702–710 each of which carry out a function within an overall functionality of the component. The component, being modularized in the form of a card which fits into an equipment rack having a back plane for communicating with other card components, and a power supply for powering the card component, can be used in a range of product lines. Component controller 701 controls the component. The component controller is specific to the reusable component, and generates control signals which are used to manage the functionality of the component, and receives data signals generated by the component which describe a status or condition of the component, eg data signals describing cell discard rate, path utilization, or bit error rate.

Figure 8:
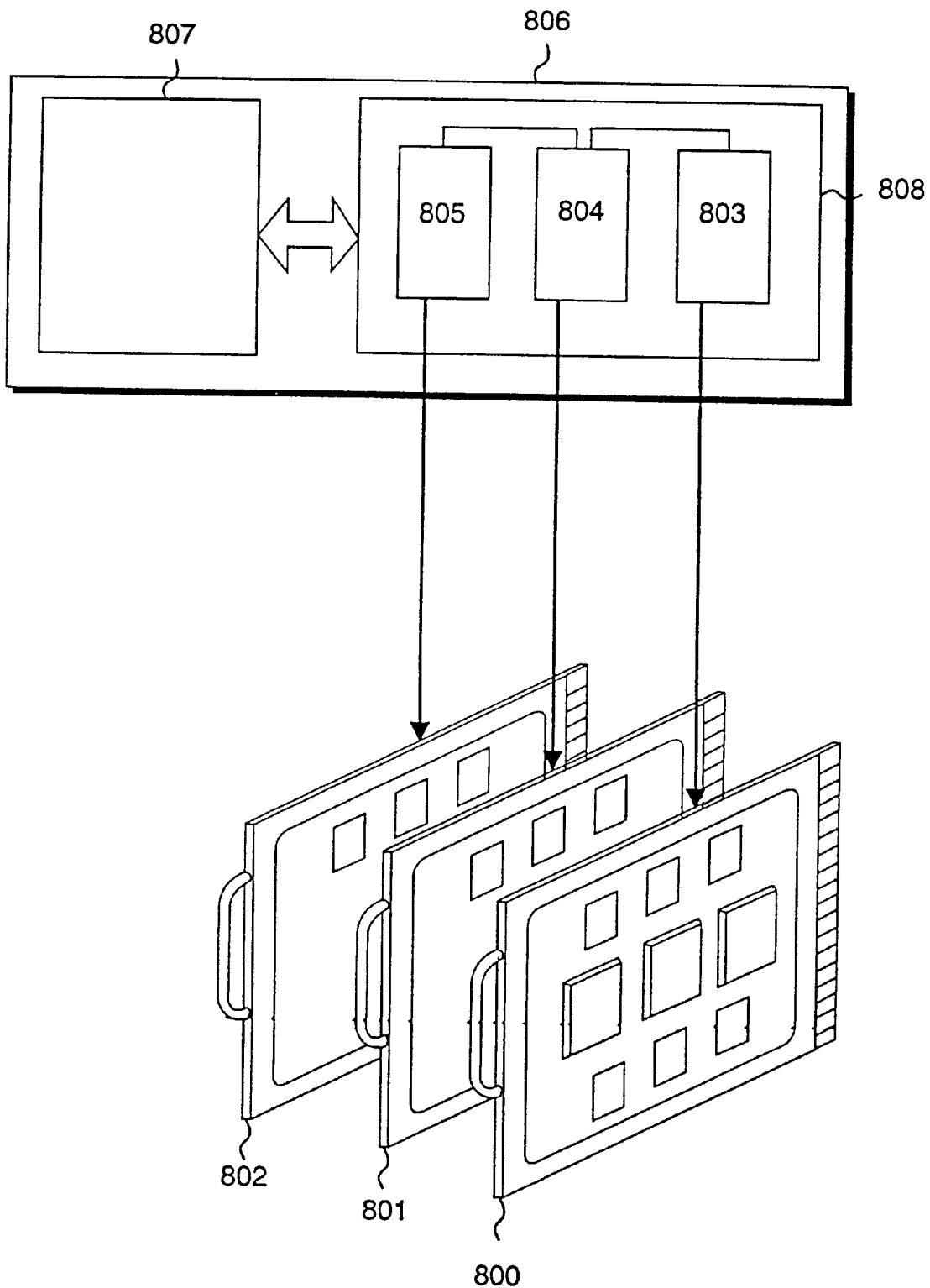
FIG. 8 illustrates a composite assembly of components, comprising a network element, together with a composition of component controllers for implementing control of the components, and a function controller representing functionality of the network element.

Referring to FIG. 8 herein, there is illustrated a composite device comprising a plurality of card components 800–802, each of which is supported for the purposes of network management by a respective corresponding component controller 803–805 in the network management base. Each component controller 803–805 implements management control of its corresponding respective component, and each component controller is designed specific to the component which it controls. A composite controller 806 controls the composite assembly of components 800–802. The composite controller comprises a function controller 807 being an application level element, which represents the functionality of the composite and an implementation level element 808 which comprises the component controllers which are assembled in a manner which reflects the composition and connectivity of the components in the composite device. The implementation level element is specific to that composite, and is constructed in a manner which is specific to and reflects an internal structure of the composite. The application level element is constructed in a manner which reflects a functionality of the composite independently of an internal structure of the composite.

A component controller comprises is lowest form of element of the management base and is not decomposable. A component controller is treated as a "black box" element. A component controller forms an application level element.

A composite controller comprises a function controller and one or more component controllers, or a function controller and one or more composite controllers or a function controller and a hybrid assembly of composite controllers and component controllers. The function controller comprises an application level element, being a "black box" element, and the assembly of component controllers and/or composite controllers comprises an implementation level element, being a "white box" element in which the internal structure of the assembly of composites and components is represented by the structure of the assembly of composite controllers/component controllers.

A composite controller as a whole may form an implementation level element of a higher order composite controller or of a system controller.

Composite assemblies of components exist at various levels of complexity within the network. A first composite of a higher order may comprise a plurality of components of lower order. A composite controller within the management base comprises a function controller and one or more composite controllers of lower order and/or one or more components.

A system controller comprises a function controller and an implementation level element comprising a plurality of composite controllers and/or component controllers. A function controller of a system controller comprises a highest order of application level element.

The internal structure of the application level element is independent of the architecture and construction of the individual components, and represents only functionality of the composite device, not the implementation of that functionality. This may have a significant advantage in network management system design, since the components 800–802 may be collectively or individually replaced by equivalent new components having different internal architecture and sub-components but providing the same overall functionality, and corresponding respective new component controllers may replace existing component controllers 803–805 as appropriate, without needing to replace the whole composite controller or the application level element 807 or other component controllers. Each existing component is replaceable by an equivalent new component having equivalent functionality, and its corresponding existing component controller is replaceable by a new component controller, independently of the other existing component controllers without requiring re-configuration of existing component controllers to accommodate the new component controller. The arrangement of FIG. 8 enables management of an assembly of components, at a composite level as described with reference to FIG. 4 herein.

Figure 9:
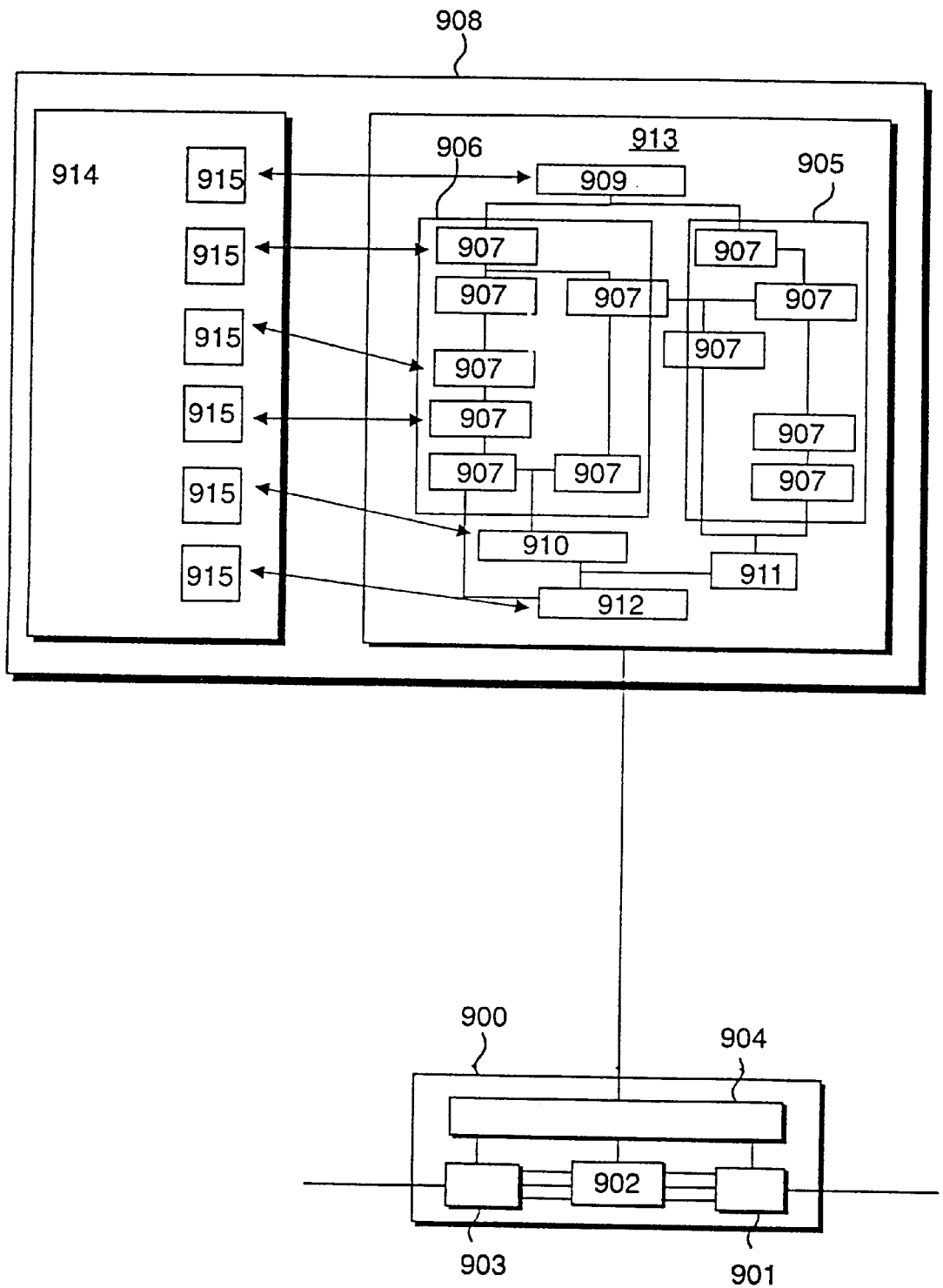
FIG. 9 illustrates an example of internal structure of a function controller and an element controller of the network controller of FIG. 5.

Referring to FIG. 9 herein, there is illustrated a second example of a composite device 900 comprising a plurality of components 901–903 and a control agent 904; and a composite controller 908. Control of the composite device 900 is carried out by composite controller 908. The composite controller comprises first and second component controllers 905, 906 which are connected together by connecting managed objects 909–912 to form an implementation level element 913, and an application level element 914. Each function type carried out by the composite device 900 is represented by a corresponding respective managed object 915 in the application level element 914. In the case of FIG. 9, individual first components 901 and 903 are identical to each other and duplicate each other, and are managed by first component controller 905 whereas second component 902 is managed by second component controller 906. Each component controller comprises a plurality of managed objects 907. Each managed object relates to a function carried out by the component.

In general, in a network comprising a plurality of composites, each individual composite controller controls an individual composite. Each composite controller is subdivided into one or a plurality of component controllers. Each component controller controls one or more corresponding components of the same type. Each component controller comprises one or a plurality of managed objects. A composite controller comprises a plurality of such managed objects, some of which are connected together to form said component controllers, and some of which may interconnect the component controllers. Typically a composite controller may comprise a plurality of component controllers, as well as a number of individual managed objects connecting the component controllers within the composite controller. The arrangement of managed objects within a component controller reflects the separate functions within a component. The arrangement of component controllers within a composite controller reflects the arrangement of components within a composite.

The application level comprises the plurality of application level elements. Each application level element comprises a plurality of managed objects. Each application level element of the application level is associated with a function provided by at least one corresponding respective component or composite at the implementation level, and can control functionality of a composite associated with a composite controller by sending function signals to the composite controller which implements control of that composite. Each individual managed object of an application level element is connected with at least one corresponding respective managed object of an implementation level element, to which it sends function control signals. A managed object of an implementation level element receiving the function control signal can signal internally within the composite controller to component controllers, and the plurality component controllers comprising the composite controller generate operation, administration and maintenance (OAM) signals which are sent across the network to the components comprising the composite, for their management.

A relationship between various apparatus and software parts in a network, and the corresponding controllers in the network controller is described in table 2 herein.

TABLE 2

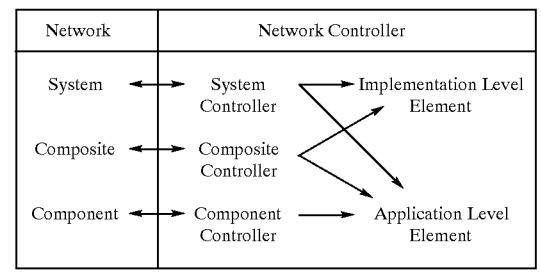

The application level and the implementation level have architectures which are structured to reflect both the functions and the internal structures of the plurality of composites. The structuring of the application level and implementation level are aimed at enabling reuse of composites and their constituent components in a communications network, without the need for complete reconfiguration of the application level and implementation level. Composite controllers and component controllers can be reused across the network.

Each physical hardware item comprising a composite comprises a plurality of components arranged in a predetermined order. This predetermined order is reflected in the arrangement of a plurality of component controllers in the implementation level element. The functionality of a composite is reflected in the provision of a plurality of managed objects in an application level element.

A management system can be assembled from assemblies of controllers in the same way that a network as a whole can be assembled from a plurality of composites and components. Once a plurality of component controllers have been assembled into a composite controller for a corresponding composite, the composite can be reused along with the corresponding composite controller. By assembling a plurality of component controllers into a composite controller corresponding to a legacy network element, encapsulation of management system structure of a legacy equipment is enabled even where new methods of network management are applied. Management functions are encapsulated in the application level elements of controllers, and implementation of those functions as specific to particular network elements and components is encapsulated in the implementation level elements of composites, and component controllers.

In the best mode herein, as a communications network is constructed or modified by addition of new composites or components, a management system develops along with the network, as each composite contributes its own composite controller(s) to the application level and implementation level respectively. Interoperability of the management system is achieved by ensuring that the assemblage of managed objects within a controller represent every aspect of functionality of the device in a modular manner, and every significant component is represented by a corresponding component controller.

In the best mode herein each of the managed objects in the application level comprises a means for storing data signals describing a function of a composite or a system, the data storage means being readable by the graphical user interface 504 and other devices, and a means for generating a set of function control signals for sending to the corresponding one or more managed objects in a component controller or implementation level element which actually implement control over the corresponding components.

Figure 10:
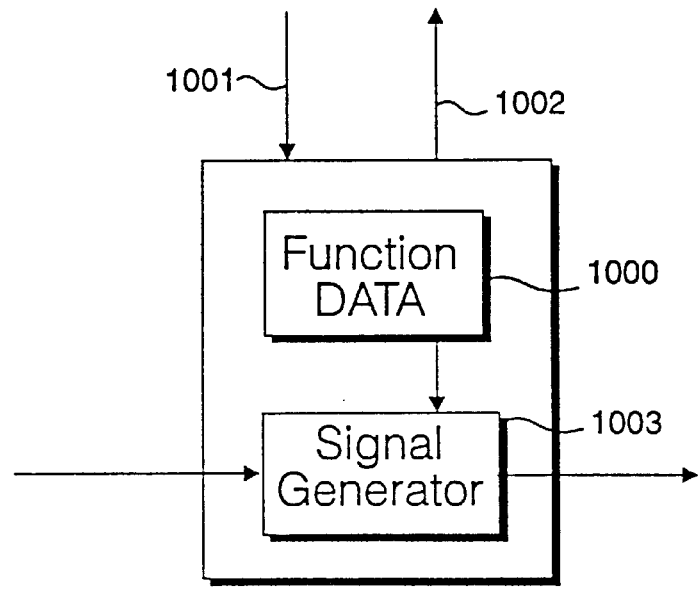
FIG. 10 illustrates a sub-function controller of the function controller of FIG. 9.

Referring to FIG. 10 herein, there is illustrated schematically an architecture of a managed object in an application level element. The object comprises a data storage means 1000 containing function data and a signal generator 1003. The function data is addressable and readable by external devices, and the graphical user interface 504, as illustrated graphically by arrows 1001, 1002. The signal generator 1003 generates signals, utilizing the function data, and optionally, in response to signals received from an external source or from the graphical user interface.

Each managed object of a component controller or an implementation level element comprises data storage means for storing data describing the physical structure and connectivity of a device, including the inter-connection of and internal structure of components of the device, and a means for generating operation, administration and maintenance (OAM) signals for sending to the composite or component for controlling operation of that device, the OAM signal generating means being responsive to instructions received in the form of signals from the graphical user interface 504, or in the form of function control signals from a managed object of the application level element.

Figure 11:
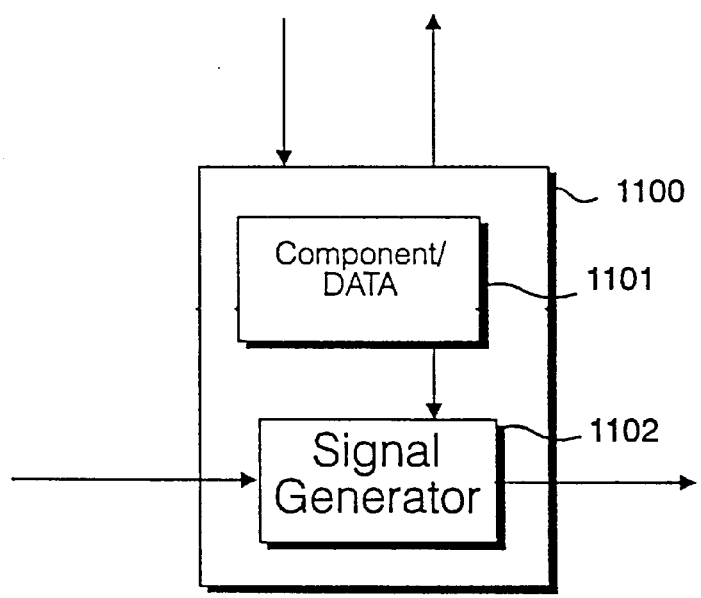
FIG. 11 illustrates a sub-component controller of the composite controller of FIG. 9.

Referring to FIG. 11 herein, there is shown an internal architecture of a managed object of an implementation level element 1100. The object comprises a data storage means 1101 storing data describing a composite, a component or sub-component, and a signal generator 1102 for generating control signals for controlling a composite or a component.

Referring again to FIG. 6, the graphical user interface reads data representing the available services supported by individual composites from the application level, and can read data such as for example performance data from the implementation level concerning performance of the various network elements and their individual components. The graphical user interface may send instructions to the implementation level for controlling various OAM functions for the network elements. The implementation level converts these instructions to corresponding OAM control signals to the individual composites for implementing the OAM functions.

Figure 12:
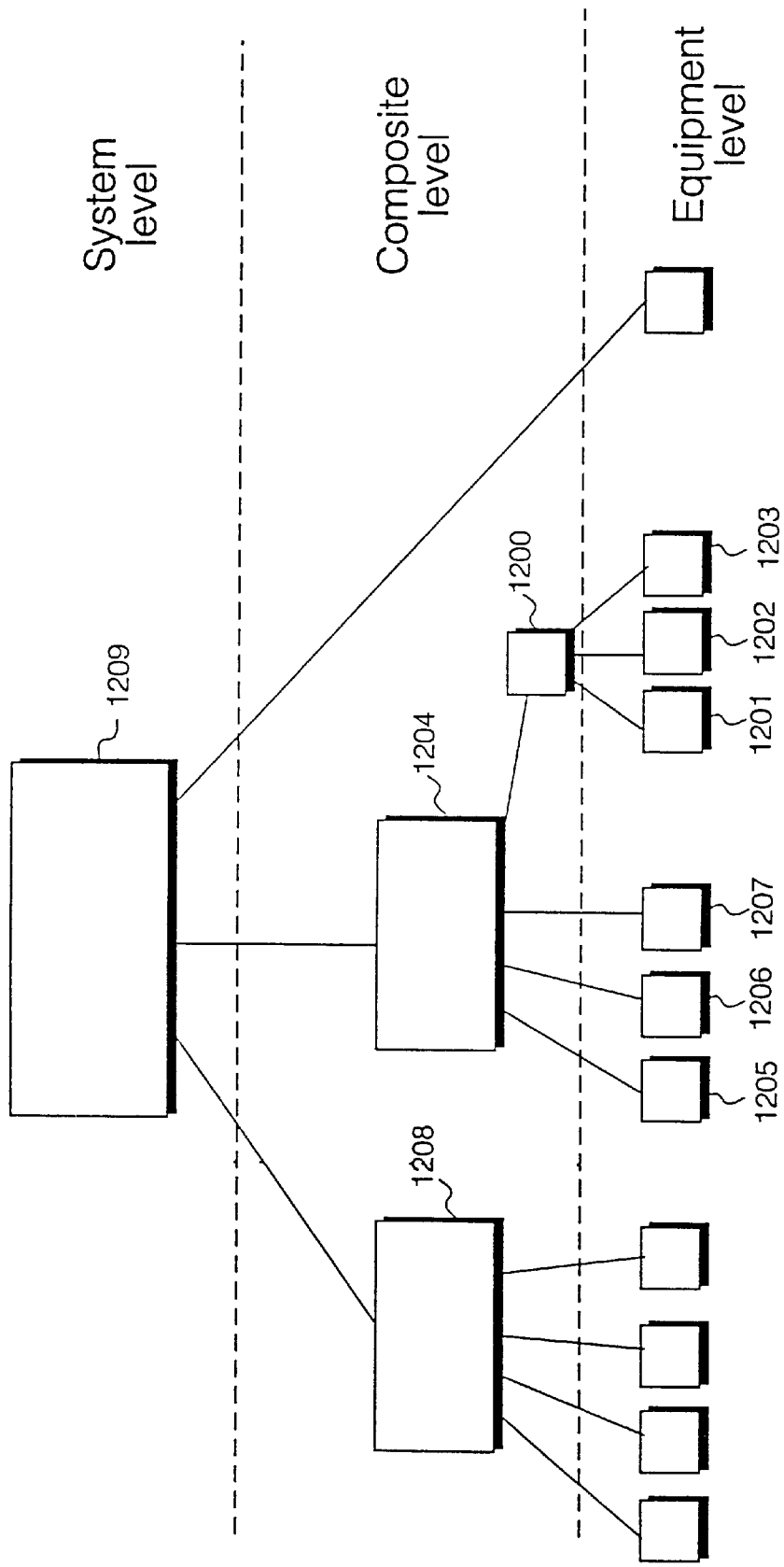
FIG. 12 illustrates an architectural structure of the network management system.

Referring to FIG. 12 herein, there is illustrated schematically an internal architecture of the network management system described in terms of management levels. The network management system operates to manage composites and components at a system level, a composite level and a component level. At the composite level, composite controllers can be nested within each other. For example, a composite controller 1200 controlling a composite including components controlled by first to third component controllers 1201–1203 may be nested within a composite controller 1204 controlling a composite comprising components controlled by first to third component controllers 1201–1203 and fourth to sixth component controllers 1205–1207. The composite controlled by a composite controller 1204 may form part of a system including other composites, controlled by another composite controller 1208, the system being controlled by system controller 1209. The management levels resemble a tree structure having branches and leaves. At the leaf level, are component controllers, this being the type of control unit which controls the minimum level of replaceable product.

The management system is constructed using specific methods as will now be described.

Figure 13:
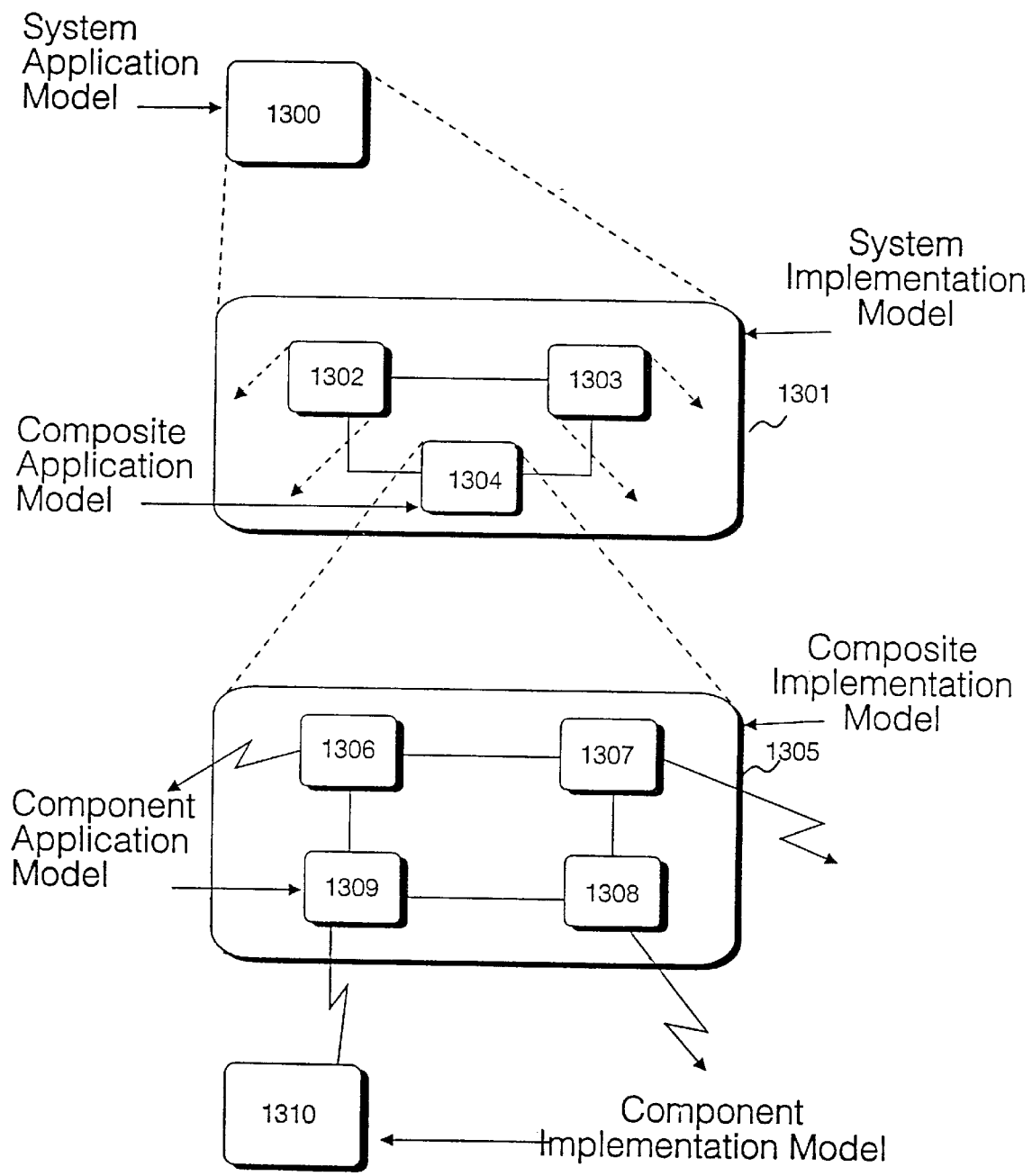
FIG. 13 illustrates a general method of construction of a network management system.

Referring to FIG. 13 herein, there is illustrated a general method for constructing a network management system by assembling a plurality of component controllers, composite controllers and system controllers. The method of construction can be approached via a "top down" route, wherein the management system is constructed from a consideration of overall system functionality, or alternatively from a "bottom up" route wherein construction of the management system is approached from a consideration of assembling individual components and composites which comprise the communications network. The construction method is flexible and adaptive to accommodate changes to the network management system once the system has been designed and constructed, by substitution of composite controllers, and component controllers as composites and components are upgraded with newer equipment or as components are added or subtracted in order to alter the functionality of systems supported by the communications network.

Steps carried out in a "top down" construction method may be as follows: firstly, an overall functionality of a system supported by the network may be represented by creating an application model 1300 of a system. In the application model, each major function supported by the system is modeled. The application model of the system is used as a design plan to create an application level element of a system controller. Each function represented in the application model of the system is carried out by a composite or a component. Each composite is controlled by a composite controller forming part of an implementation level element of the system controller. The implementation level element of the system controller is constructed as a plurality of application level elements 1302–1304 of corresponding respective composite controllers which are specified in an implementation model describing the implementation level element 1301 of the system controller. For the purposes of clarity, an implementation model describing an implementation level element of only one such composite controller is illustrated in FIG. 13. Construction of a plurality of components comprising the composite controller having application level element 1304 is formed according to an implementation model 1305 which is used as a design plan for constructing an implementation level element of the composite controller. The implementation level element is constructed according to a implementation model 1305 of the composite controller. The implementation model 1305 comprises a plurality of application models 1306–1309, each of which describes functionality of an individual component comprising the composite. The component controllers are each constructed individually according to a corresponding respective application model, one per component. The implementation models of the components eg 1310, are constructed as part of the actual components.

In the following description there are created assemblies of objects at the application level, each of which describe an aspect of the functionality of a composite or system and which are directly manufactured into corresponding respective application level elements of composite or system controllers. Similarly, there are created interconnected assemblies of managed objects at the implementation level which describe the structure of a system, composite or component, and the implementation of functionality within that system, composite or component, and which are manufactured as component controllers and implementation level elements of composite controllers and system controllers.

Figure 14:
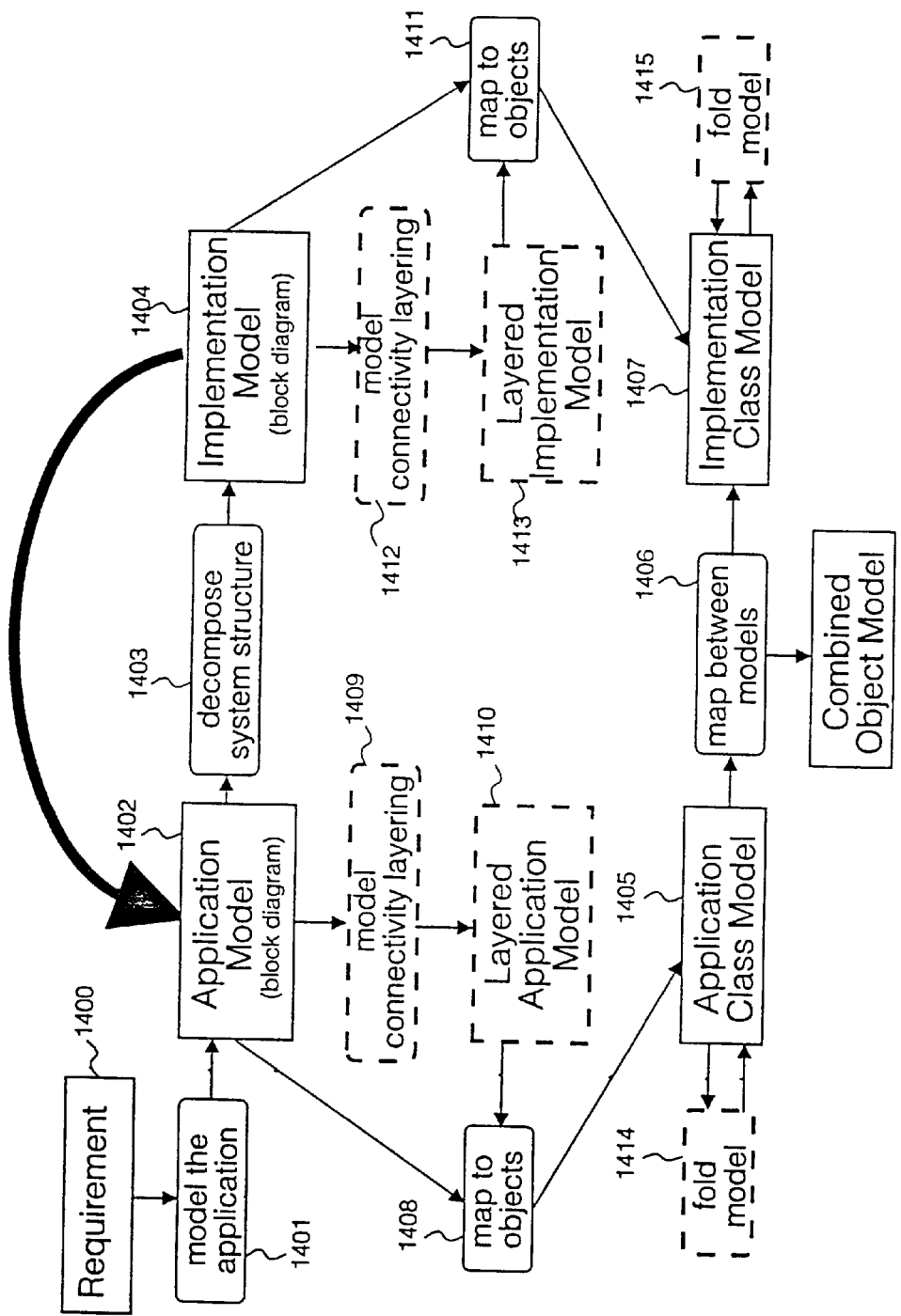
FIG. 14 illustrates in overview a method for constructing an application level and an implementation level of the management system.

Referring to FIG. 14 herein, there is illustrated an overview of a general method for constructing a network controller apparatus for a communications network.

In step 1400, design of the network controller commences with a specification requirement for a new network, or for an addition to an existing network. The requirement may comprise details such as required bandwidth, required call traffic capacity, types of service to be carried, types of management information to be accessed, eg quality of service data, cell discard rate. In step 1401, the requirements are modeled in terms of managed functions, resulting in an application model 1402 describing the functions to be performed by the network. In parallel with creating the application model 1402, the system structure is decomposed in step 1403 to obtain an implementation model 1404. The implementation model comprises a specification for the network in terms of individual network elements and internal components of those devices. The application model 1402 and implementation model 1404 comprise a "top level" design of the network and the network management system. Each of the application model and implementation model are then broken down in layers to achieve an application class model 1405, a mapping model 1406 and an implementation class model 1407 which then form the basis for construction of the network management system and construction of the network controller. The application class model, mapping model and implementation class model are used as a detailed plan for assembling the application level and implementation level of the network controller. In the best mode, the managed objects may be built into the application level elements and implementation level elements as code in an object oriented programming language such as SmallTalk or C++, and input into the data storage means of the network controller. Once established for a particular composite or component the assemblies of application level elements, implementation level elements, and component controller are reusable in other network management systems. Classes in the application class model 1405 are constructed to comprise the managed objects of the controllers.

The application class model 1405 is determined from the application model 1402 as follows: In step 1408, each function in the application model 1402 is mapped to an object of the application class model 1405. Where the functionality described in the application model 1402 is complex, mapping to objects in step 1408 may comprise a sub-step 1409 of modeling the connectivity layering, to obtain a layer application model 1408 which is mapped to objects in steps 1408 resulting in the application class model 1405.

The implementation class model 1407 is determined from the implementation model 1404 as follows. Each structural feature included in the implementation model 1404 is mapped to an object in step 1401 resulting in the implementation class model 1407. Step 1401 can be sub-divided into the sub-step of modeling connectivity layering 1402 to achieve a layered implementation model 1403 which is mapped to objects in steps 1401 resulting in the implementation class model 1407. Where there is symmetry in the required functionality as represented by the application class model 1405, the application class model 1405 may be optimized by folding in step 1404 as a form of concisely obtaining the application class model 1405. Similarly, where there is symmetry in the hardware items comprising the composites and components represented by the implementation class model 1407, the implementation class model may be folded in step 1415 for the purposes of concise construction.

The method described with reference to FIG. 14 herein comprises a "top down" approach for configuring and constructing a network management system and communications network to achieve desired functionality, using modular components and controller structures, each module comprising a managed item, eg of hardware, such as a composite or component, means for generating a set of control signal instructions, means for storing data signals comprising application level elements, and implementation level elements in the implementation level and application level.

Opportunities for reuse of application level elements and implementation level elements and controllers exist at several levels.

Models of management system components, ie application models and implementation models, can be reused as the components themselves are reused.

Aggregations of components and their corresponding component controllers, composite controllers, and system controllers can be reuse candidates.

Individual component controllers can be reused across management systems.

Referring to FIGS. 15 to 22 herein there will now be described a first example according to a specific method of the present invention for integrating a simple one-zero (1/0) cross-connect composite into a communications network, and incorporating management control in the form of an application level element and an implementation level element into a management system operated by the network controller 402 for managing the communications network. The 1/0 cross-connect, its associated management agent, and a corresponding composite controller for managing the 1/0 cross-connect comprise a reusable module in a communications network, the composite controller providing modularization of network management functionality within the network controller apparatus. Using the methods described herein, a complete network management system residing in the network controller apparatus can be constructed along with construction of the network itself, with the advantage that changes to the management system resulting from the addition of the 1/0 cross-connect may be limited to the changes introduced by the corresponding composite controller, and changes to controllers of other network elements can be contained.

There will now be described an example of operation of the method of FIG. 14 with respect to a 1/0 cross-connect apparatus. For ease of reference, and to facilitate greater understanding of the invention, an outline plan of FIG. 14 herein is included adjacent to FIGS. 15 to 22, with the relevant steps of the method of FIG. 14 indicated by dark shading. In FIG. 15 there is illustrated a representation of a 1/0 cross-connect 1500 which inputs an E1 stream, comprising up to 32 communications channels, of which 30 may be telephone channels, and outputs the 32 channels via a second E1 stream. The cross-connect 1500 enables rearrangement of the 32 channels of the incoming E1 stream in a different order in the outgoing E1 stream. In FIG. 15, the 1/0 cross-connect is represented in a "black box" view as a function, in this case the 1/0 cross-connect function.

Referring to FIG. 16 herein, in the implementation model 1404 the 1/0 cross-connect device is represented by its constituent components. The constituent components comprise a de-multiplexer 1601 for receiving the E1 data stream and separating out the plurality of 32 channels; a cross-connect component 1602 for cross-connecting the 32 input channels onto 32 output channels; a multiplexer 1603 for multiplexing the 32 output channels back into an output E1 data stream; a local controller 1604 for controlling operation of the de-multiplexer 1601, cross-connect component and multiplexer component; and an agent interface 1605 comprising control instructions stored within the 1/0 cross-connect for interfacing the local controller 1604 with an operation and management (OAM) channel for receiving management instructions signals from a network controller apparatus. The local controller sets up and removes DS0 cross-connections and received OAM data from traffic modules.

Figure 17:
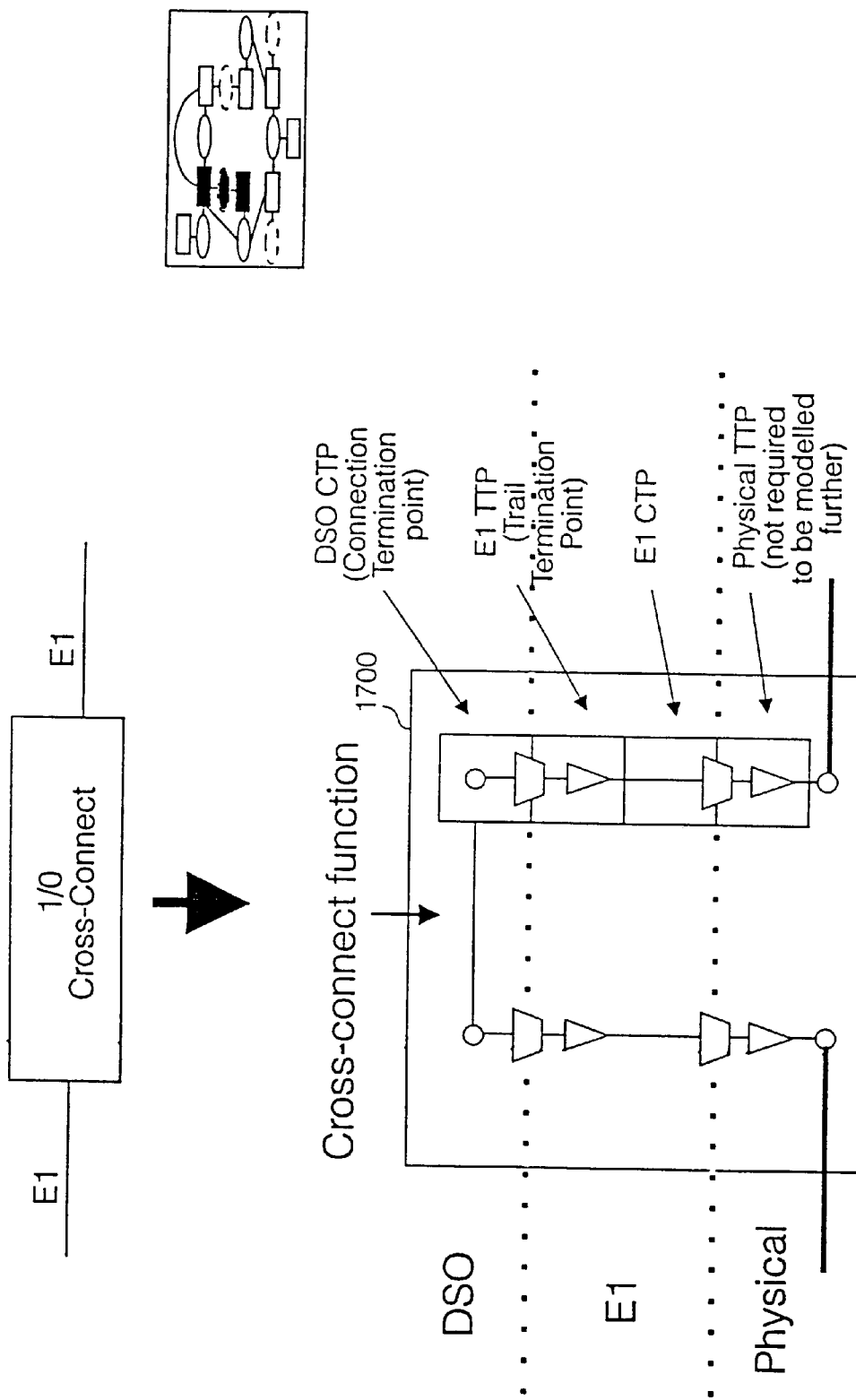
FIG. 17 illustrates a layered connection representation of a composite according to the method of FIG. 14.

In FIG. 17, There is shown a result of modeling connectivity layering in step 1409 to obtain a layered connection model 1700 of the application model 1402. The layered connection model is an intermediate step between the application model 1402 and the application class model 1405. In some instances, it may be possible to go directly to the application class model 1405 from the application model 1402 via step 1408 of mapping the application model to objects.

Figure 18:
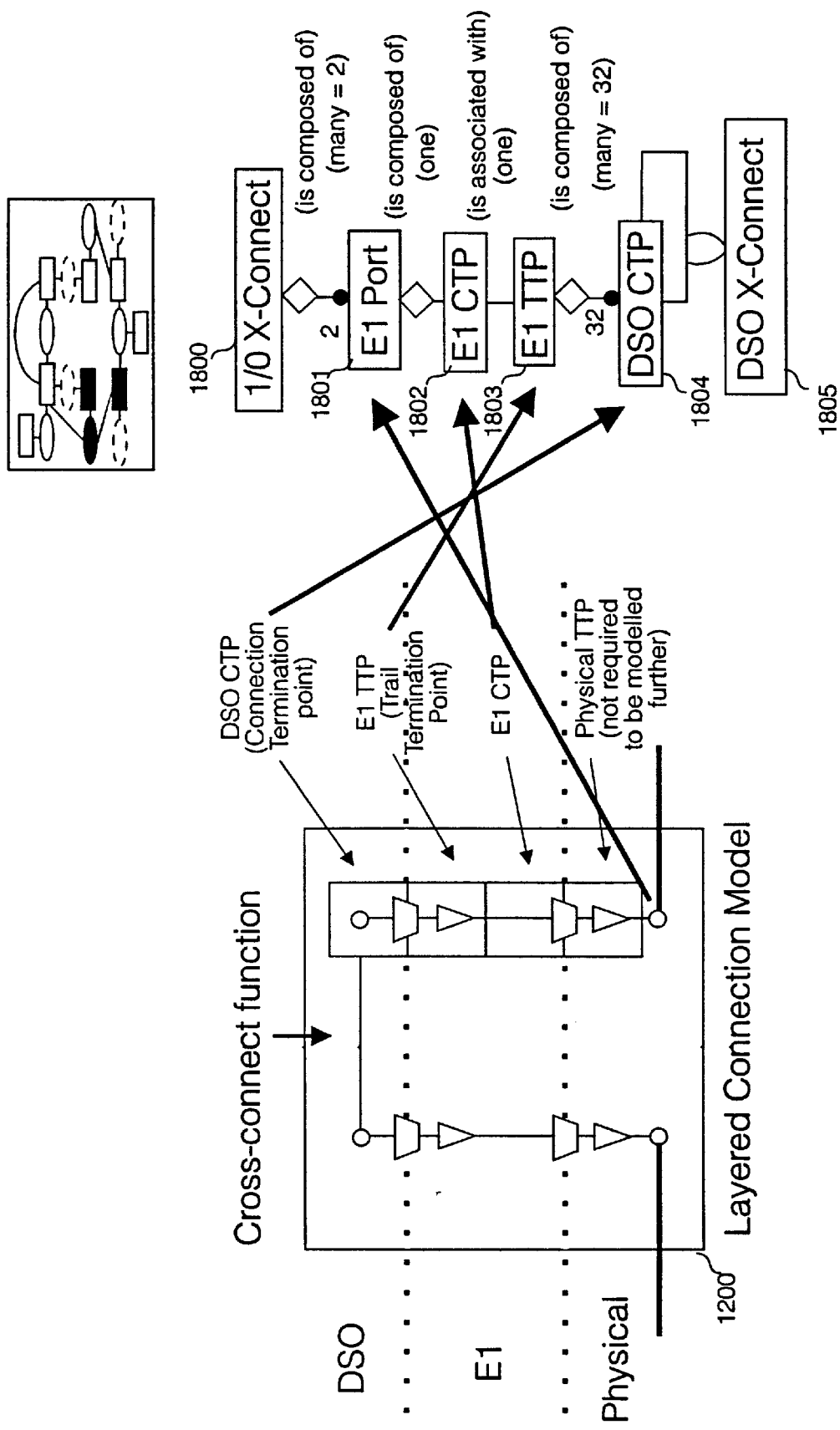
FIG. 18 illustrates an application class representation of a composite according to the method of FIG. 14.

In FIG. 18 herein, there is shown an application class model corresponding to the application model 1402 of the 1/0 cross-connect. The application class model of the 1/0 cross-connect shown in FIG. 18 describes the necessary objects required to manage the 1/0 cross-connect, without giving any indication of how the 1/0 cross-connect is actually structured; the application class model of the 1/0 cross-connect is purely functional. By object it is meant a piece of functionality within the management controller which reflects some aspect of the managed network, in this case the 1/0 cross-connect, for management purposes. In the notation of FIG. 18 herein, a 1/0 cross-connect is composed of many (in this case 2) E1 ports 1801, each of which is composed of one E1 connection termination point 1802, which is associated with one E1 trail termination point 1803, which is composed of many DS0 connection termination points 1804. The derived object structure of the application class model is described as a top down decomposition, ie an inverse orientation. This produces a diagram with the object which represents the systems context at the top. In this case, the 1/0 cross-connect object 1800 represents the system context for a system comprising a 1/0 cross-connect.

For example, an E1 CTP object 1802 represents the fact that the input E1 stream has to be terminated. Similarly, E1 port object 1801 represents the fact that there is a physical link termination and the E1 stream is terminated within that physical link. Thus, the application class model structure of FIG. 18 represents that for 1/0 cross-connect, in order to manage this cross-connect the management system must be aware that there are physical E1 ports, which are terminating E1 streams and within the E1 streams there are a number of DS0 connection termination points which are individual telephone circuits which are being terminated and the individual telephone circuits can be related back to each other using a cross-connect function represented by DS0 cross-connect object 1805. Within the DS0 x-connect object 1805, there is represented that, for example incoming channel number one can be connected to outgoing channel number seventeen, and so for management purposes circuit one entering the 1/0 cross-connect exits on for example circuit seventeen output from the 1/0 cross-connect.

Figure 19:
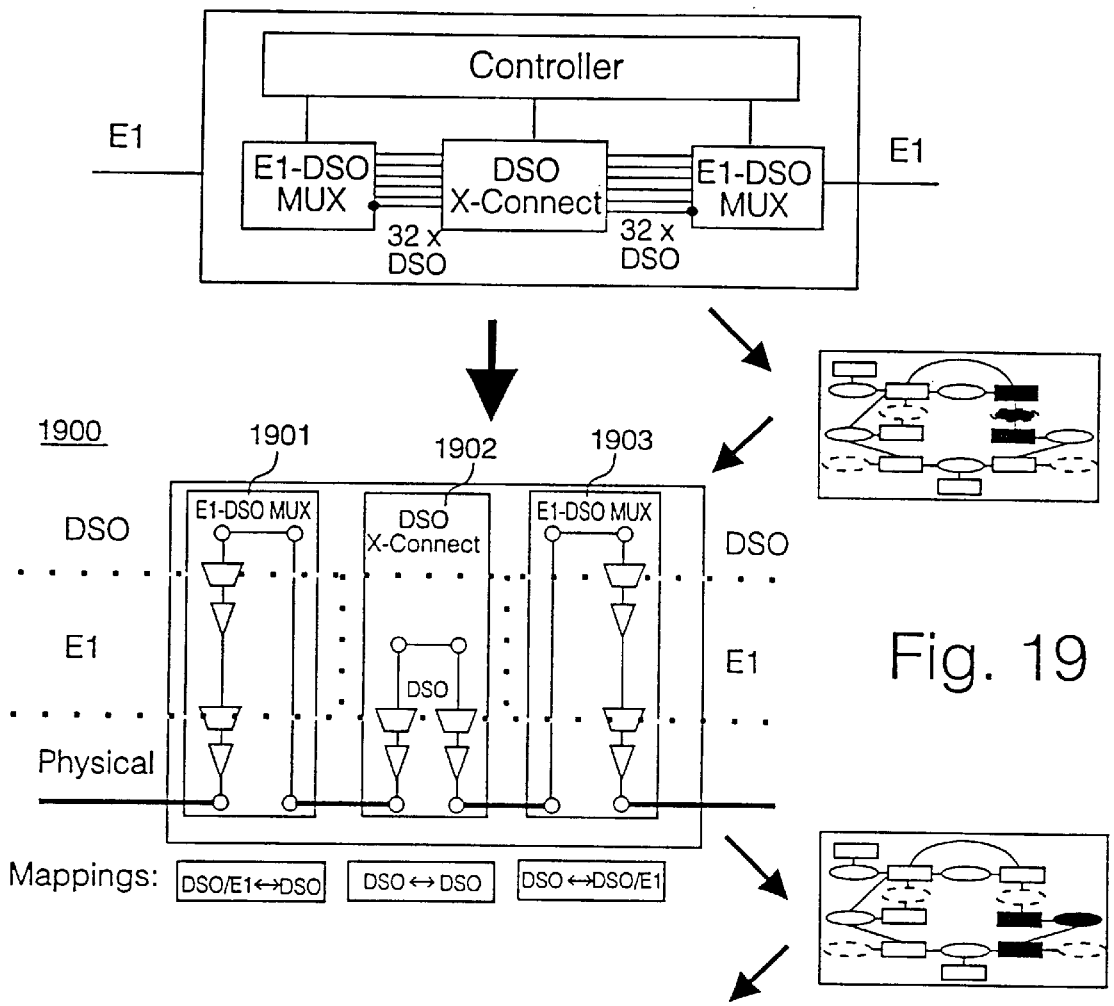
FIG. 19 illustrates a layered implementation representation of a composite according to the method of FIG. 14.

Referring to FIG. 19 herein, the implementation model 1404 of the 1/0 cross-connect is broken down in step 1412 to obtain a layered implementation model 1900 as shown in FIG. 19. In this case, the layered implementation model comprises three elements, an E1-DS0 multiplexer 1901, a DS0 cross-connect 1902, and a second E1-DS0 multiplexer 1903. In FIG. 19, connections to and from the function controller have not been modeled.

Figure 20:
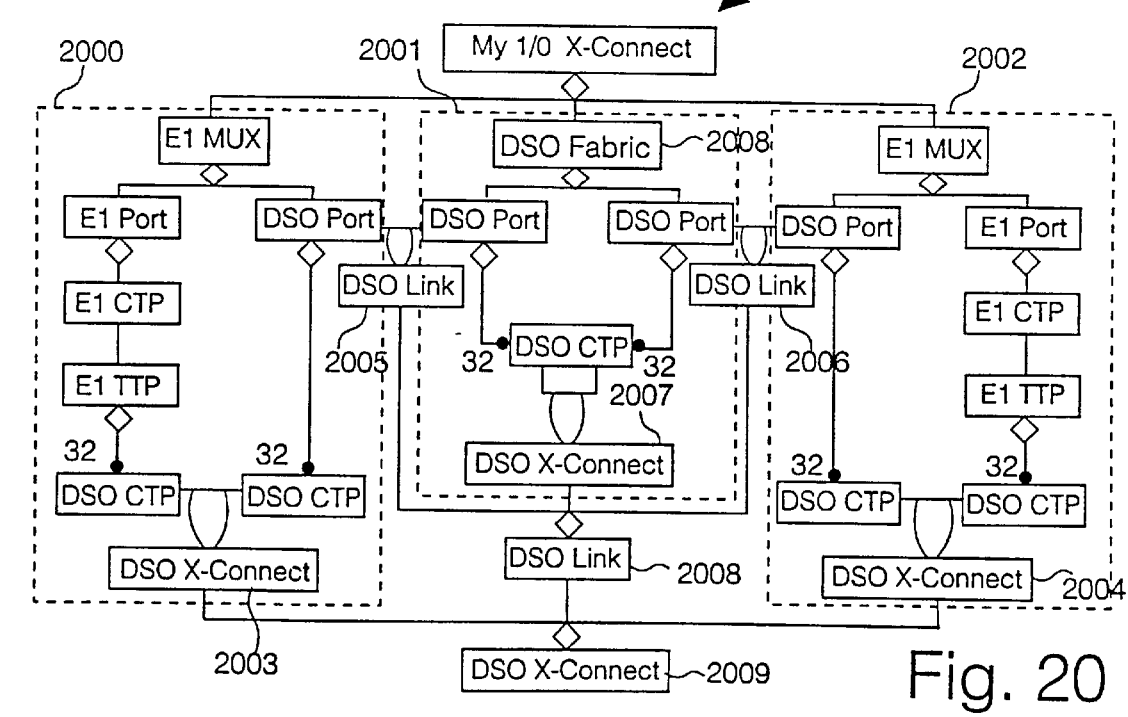
FIG. 20 illustrates an implementation class representation of a composite according to the method of FIG. 14.

In step 1411, there is derived an implementation class model as shown in FIG. 20 herein from the layered implementation model of FIG. 19. In FIG. 20, the required cross-connect function has been modeled as a composition, and hence a concatenation of:

Two DS0 cross-connections 2003, 2004 (within each of two E1 multiplexers)

A composite DS0 link 2008 between the two E1 multiplexers, the composite DS0 link itself composed of two physical DS0 links 2005, 2006 and an internal DS0 cross-connection 2007 within a DS0 fabric 2008.

The implementation class model of FIG. 20 has the following characteristics:

The E1 multiplexer has been modeled twice. This mirrors the functions described in the layered application model. Both the E1 multiplexer model copies are identical, and therefore represent reusable class behavior.

The ability to "loop back" a cross-connection to the same physical E1 port has been accommodated within the DS0 fabric by looping back the DS0 cross-connect association to the solitary defined DS0 connection termination point (CTP).

In FIG. 20, the composition and connectivity of a physical hardware item, (a 1/0 cross-connect) has been represented in terms of its component parts. The complete 1/0 cross-connect can be constructed out of two E1 Mux connect components 2000, 2002, a DS0 fabric component 2008 and two DS0 links 2005, 1006, each of which connects an E1 Mux component to the DS0 fabric component.

Figure 21:
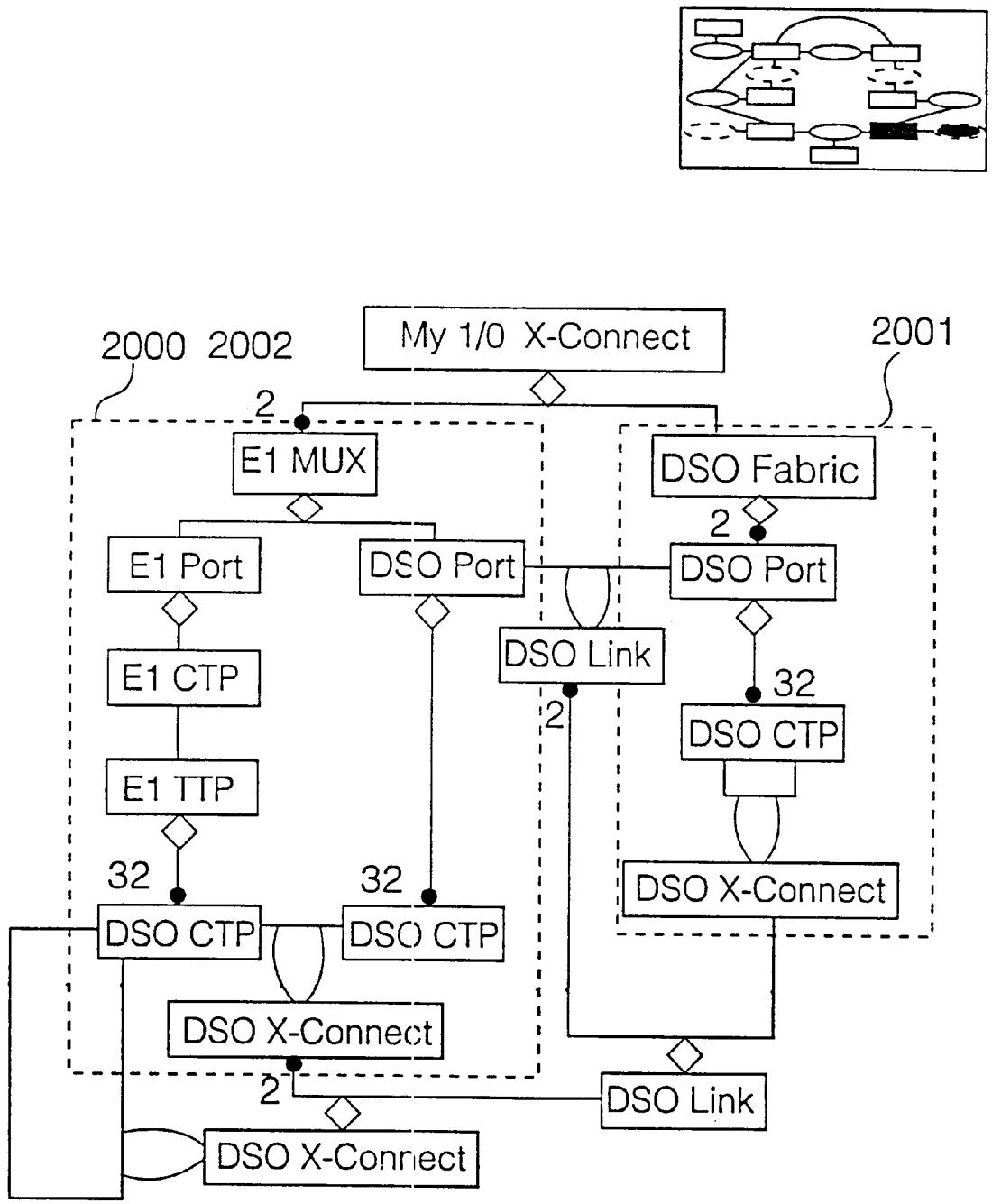
FIG. 21 illustrates a folded implementation class representation for constructing a composite controller of a composite, according to the method of FIG. 13.

Thus, as shown in FIG. 18 there has been derived an application class model and in FIG. 20 there has been derived the corresponding implementation class model. According to the specific method described herein, the application class model and the implementation class model are related to each other as follows: Optionally, in step 1415 the implementation class model may be folded upon itself. This is possible because of the symmetry within the implementation class model. In the example of FIG. 20, the implementation class model comprises first and second E1-DS0 multiplexers 2000, 2002 respectively, each having the same structure. The implementation class model of FIG. 20 may be "folded" upon itself resulting in the folded implementation class model shown in FIG. 21 herein. The implementation class model of FIG. 20 provides a clear definition of managed objects and associations. The folded implementation class model of FIG. 21 is more succinct. In each of the implementation class models of FIGS. 20 and 21, the E1 multiplexer and DS0 fabric have been modeled as reusable models which are used to construct a corresponding respective composite controller. Each composite controller exports a set of management capabilities equivalent to the externally visible functionality of the physical component. These capabilities are then imported by the composite object "my 1/0 cross-connect" and are used to provide a desired system level behavior. The objects "DS0 cross-connect" and DS0 link which do not form part of the multiplexer or DS0 fabric are associated with "my 1/0 cross-connect".

Figure 22:
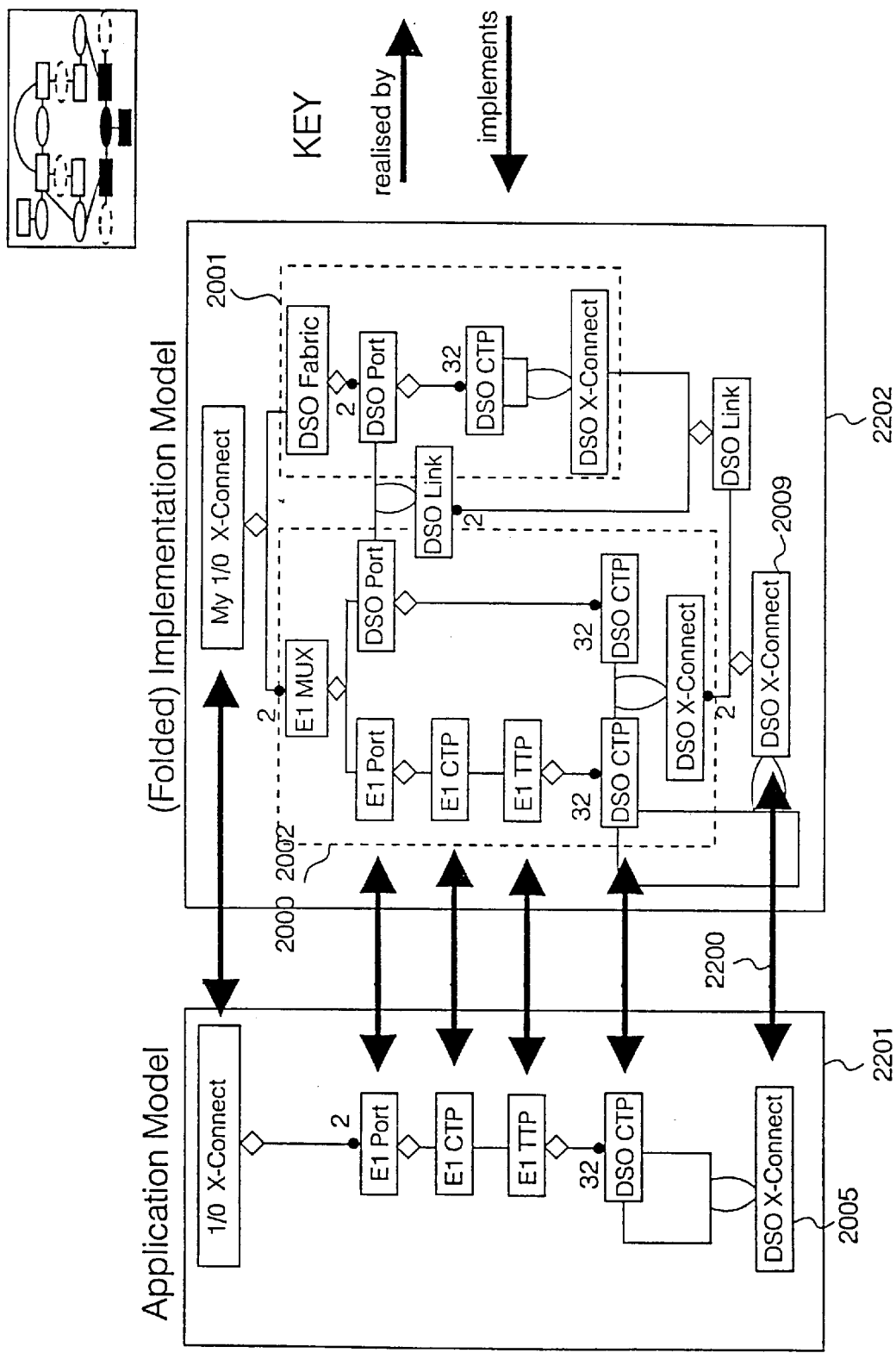
FIG. 22 illustrates a combined application class model and implementation class model representation for connecting a function controller and a composite controller of a network management system, according to the method of FIG. 9.

In step 1414 the application class model of FIG. 18 is mapped onto the folded implementation class model of FIG. 21 such that each object in the application class model is realized by a corresponding object in the implementation class model, as shown in FIG. 22 herein. The implementation class model contains further information compared to the application model, because the implementation class model comprises a plurality of objects each of which relate directly to a corresponding sub-component within the 1/0 cross-connect hardware. The application class model provides an abstract, implementation independent view of the managed system, whereas the implementation class model describes managed system behavior and structure as it is implemented. In order to perform the specific method described herein, both the application model view and the implementation model view are required.

When a user requires a specific cross-connect to be established, a mapping 2200 is followed between the DS0 cross-connect object 2005 of the application class model and the DS0 cross-connect object 2009 of the implementation class model. The DS0 cross-connect in the implementation model is then used via an agent within local controller component of the physical 1/0 cross-connect to setup, monitor and manage the three internal cross-connections within the physical hardware 1/0 cross-connect. Thus, a function element of the application model (the DS0 cross-connect object 1805) is realized by a structure element (the DS0 cross-connect object 2009 in the implementation class model) which is used to control via an agent within the local controller component 1604 of the 1/0 physical cross-connect, to setup, monitor and manage the three internal physical cross-connections of the 1/0 cross-connect.

In the network management apparatus, in the example of FIGS. 15 to 22, the application class model 2201 and the implementation class model are each constructed as the application level element and implementation level element respectively. Further, the E1-DS0 multiplexers are represented by component controllers and DS0 fabric is represented by a component controller. Both the implementation class model and the component controllers comprise reusable modules within the network management system. Although the application class model and implementation class model in FIG. 22 have been described as being constructed as controllers in a single network management controller apparatus, in principle the controllers can be distributed over different network controller apparatus in a communications network.

Further, the architecture shown in FIG. 22 has built-in reusability. For example if the physical hardware item comprising the 1/0 cross-connect is later redesigned or upgraded using different components, the application class model 2201 can be reused, although it may be necessary to modify the implementation class model 2202 to correspond with the structure of the redesigned hardware item. For example if a new DS0 fabric were designed having slightly different functionality, the DS0 component controller may need to be modified to reflect the new physical hardware structure of the new cross-connect, and any changes in functionality introduced by the new DS0 fabric. Thus, changes required to the management system, on substitution of an upgraded cross-connect hardware item can be contained in the component controller, without needing to modify other composite or system controllers.

Secondly, when constructing a new management system for a new network, a reusable module may comprise a physical hardware item, together with its corresponding system controller, composite controller or component controller. For example in the case of a reusable DS0 fabric card module, the module may comprise the physical DS0 fabric card hardware item itself, and additionally the component controller for managing that physical fabric card.

Figure 23:
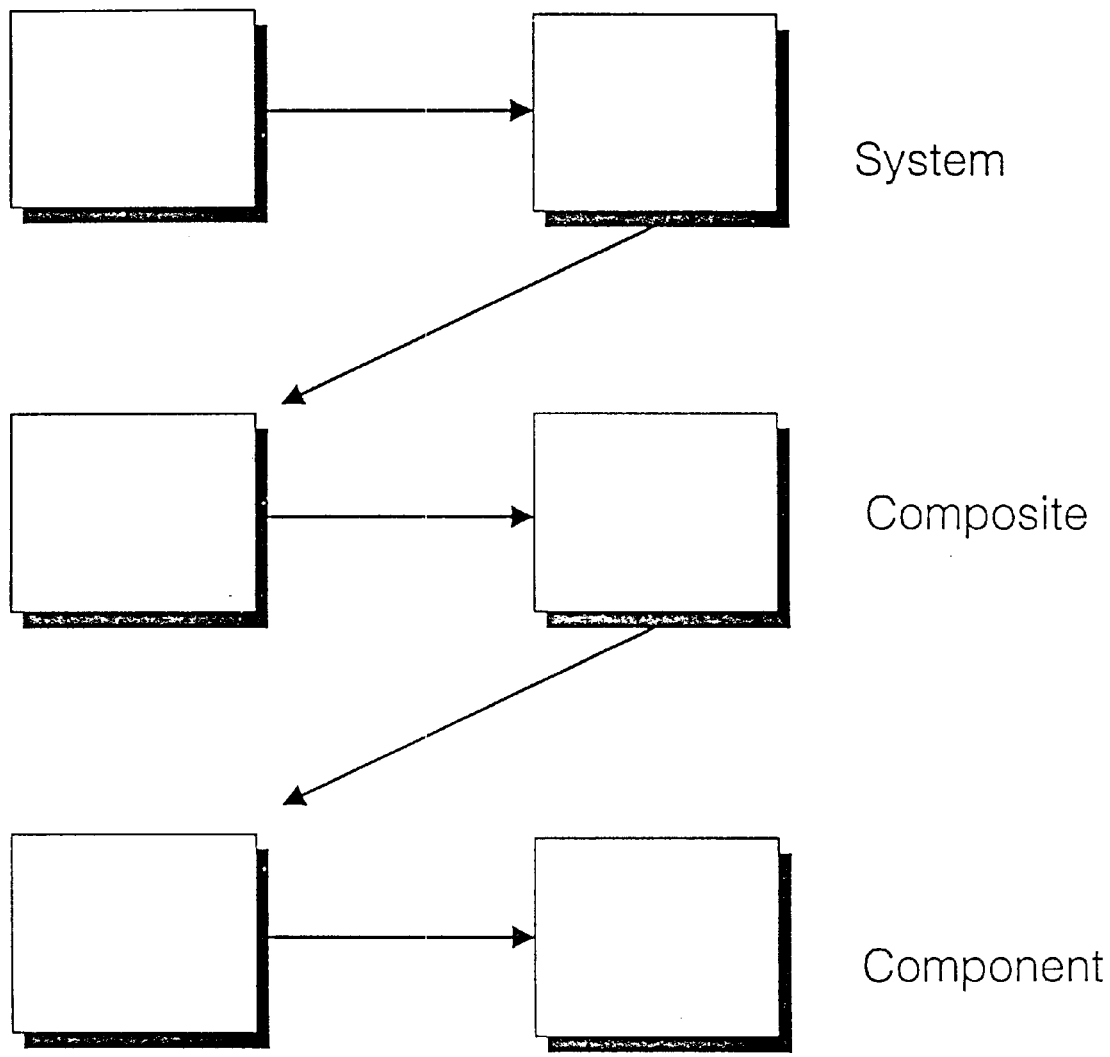
FIG. 23 illustrates a relationship between application models and implementation models at different levels of system management.

To integrate the system controllers, composite controllers and component controllers, at the system, composite and component levels, the method described with reference to FIG. 14 herein operates recursively as illustrated schematically in FIG. 23 herein. An implementation model at the component level corresponds to an application model at the component level. At the composite level, an application model at the component level may be contained within an implementation model at the composite level. That is to say, an application level element controlling functionality at the composite level, for example one controlling a composite controller, controls component controllers at the component level. Similarly, an application model at the system level may rely on an application model at the composite level in order to implement control of network functions at the system level.

As another example of a reusable module, a 1/0 cross-connect composite may comprise the physical hardware item 1/0 cross-connect itself, comprising two E1 multiplexer components and a DS0 fabric card component plus associated controller component, as well as a composite controller constructed in accordance with folded implementation class model of FIG. 21 and application class model of FIG. 18.

Thus, when constructing a new communications network from reusable modules, as the physical system itself is constructed, the management system can be built-up through the corresponding component controllers of the physical hardware items as the physical network is constructed. This may enable reduced time in producing network management systems when constructing new communications networks, or modifying existing communications networks.

There now follows a second example according to a specific method of the present invention in which the same application as described in FIGS. 15 to 22, of an E1 1/0 cross-connect function is distributed over an ATM network.

Figure 24:
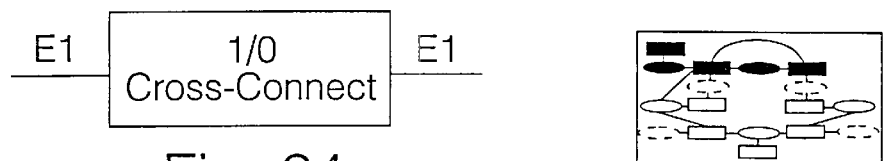
FIG. 24 illustrates a "black box" view of an E1 1/0 cross-connect over ATM application.

In FIG. 24, the E1 1/0 cross-connect is shown in "black box" application model view, representing the E1 1/0 cross-connect function.

Figure 25:
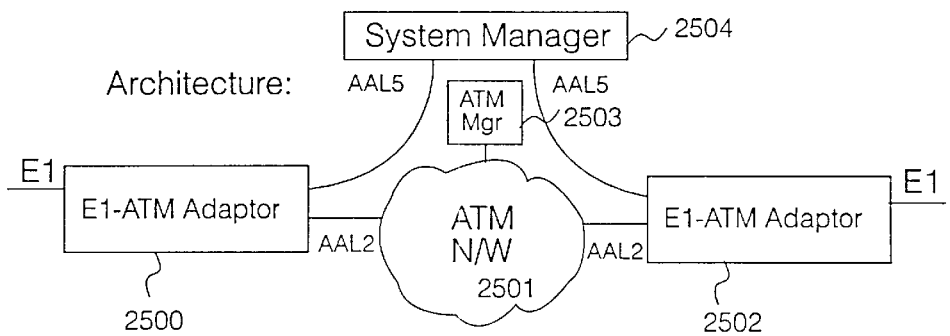
FIG. 25 illustrates a block diagram architecture for an E1 1/0 cross-connect over ATM system architecture.

Physically, the architecture of the E1 1/0 cross-connect is shown in FIG. 25 as comprising a first E1-ATM adapter 2500 which converts the E1 stream into ATM format signals which are then transmitted over an ATM network 2501 in ATM adaptation layer 2 (AAL-2); and a second E1-ATM adapter 2502 for adapting the ATM stream back to an E1 stream. ATM transport is controlled by an ATM manager 2503. The E1-1/0 cross connect is controlled by a system manager 2504.

Figure 26:
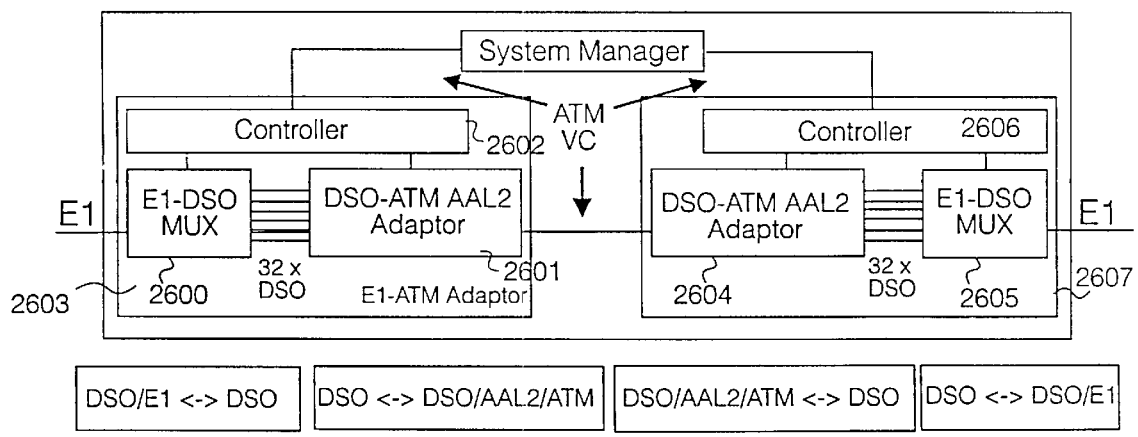
FIG. 26 illustrates schematically an implementation model representation of the E1 1/0 cross-connect over ATM as a set of connected components.

Referring to FIG. 26 herein, there is shown an implementation model of the E1 1/0 cross-connect over ATM. An E1 signal is received by E1-DS0 multiplexer component 2600 which outputs 32 DS0 outputs into a DS0-ATM AAL-2 adapter component 2601. The multiplexer 2600 and adapter 2601, together with local controller 2602 comprises an E1-ATM adapter 2603. Similarly, the second E1-ATM adapter 2502 is modeled as a DS0-ATM AAL-2 adapter 2604 feeding 32 DS0 channels into an E1-DS0 multiplexer 2605 under the control of a second local controller 2606, the adapter 2604, multiplexer 2605 and local controller 2606 comprise a second E1-ATM adapter 2607. The E1-DS0 multiplexer model 2600, which is the same as E1-DS0 multiplexer model 2605 in the implementation model is reusable, and is the same as the E1-DS0 multiplexer model 1601 or 1603 in FIG. 16 herein. This is an example of reusable portions of the implementation model.

In FIG. 27 herein, there is illustrated a simplified architectural view of the 1/0 cross-connect over ATM.

In FIG. 28 herein, there is shown a layered implementation model of the E1 1/0 cross-connect over ATM. The layered application model describes functions of conversion from E1 to DS0, and conversion of DS0 to ML-2 ATM in the E1-ATM adapters. The ATM network is modeled as a black box.

Figure 29:
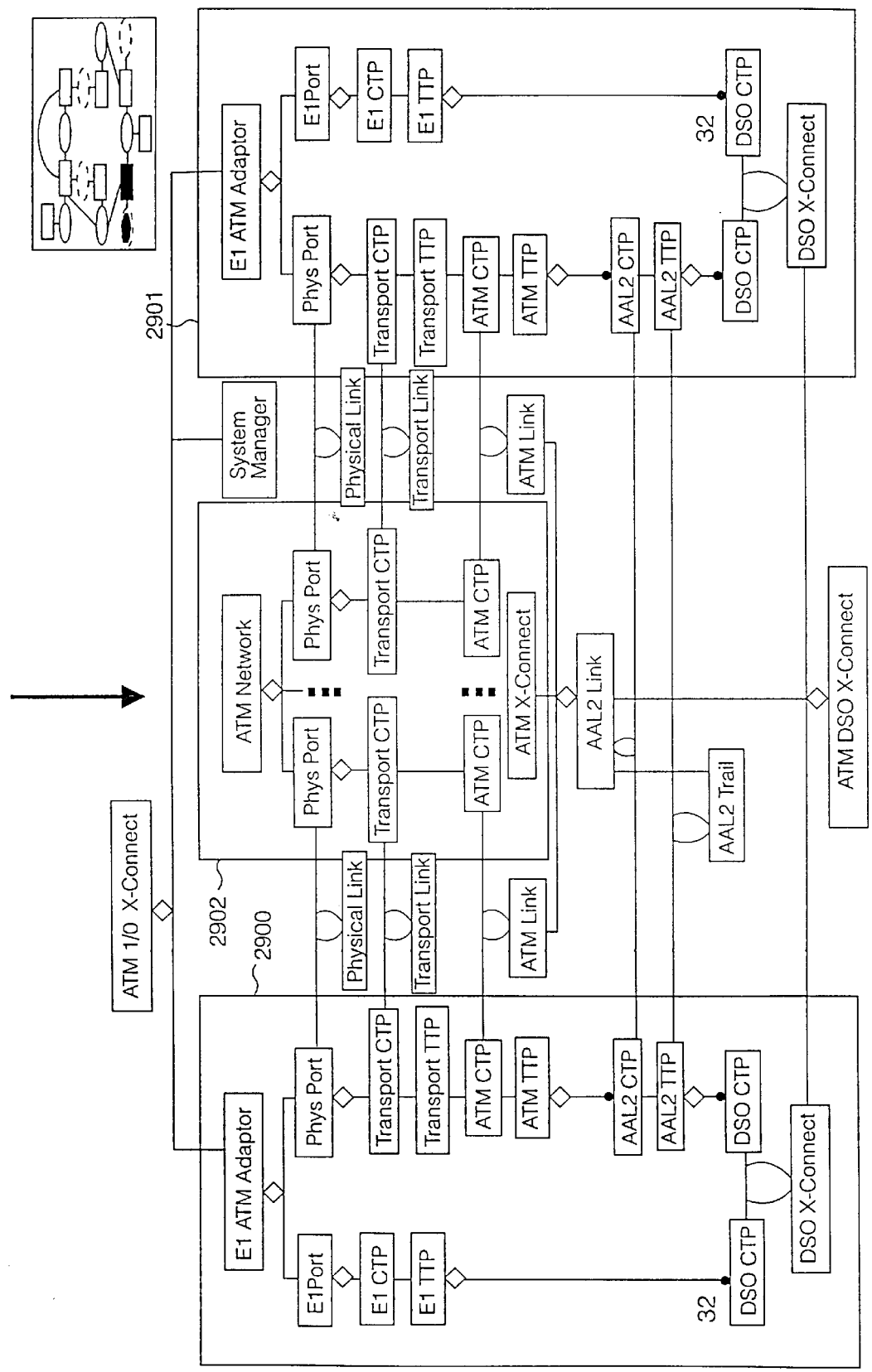
FIG. 29 illustrates an implementation class model of the E1 1/0 cross-connect over ATM.

Referring to FIG. 29 herein, there is illustrated a corresponding implementation class model in which each individual object represents an aspect of functionality of the cross-connect. The objects can be divided into groups comprising designs for application level elements 2900, 2901, 2902 for the E1-ATM adapters and the ATM network.

In this example, the ATM network is not modeled in detail, but only up to the first connection termination point of an ATM virtual circuit. In order to fully implement the management system corresponding to the network element there is a need to distinguish between ATM virtual circuits and virtual path layers, and to model all transport containers, for example VC12, TUG's AU's, if synchronous digital hierarchy (SDH) is to be used as the transport layer. Details of how to model the virtual containers in SDH, is given in International Telecommunications Union ITU-T Standards G.803. The ATM network has been exemplified by modeling a virtual circuit/virtual path switch, however setting up and managing these ATM connections is outside the scope of the cross-connect, as the network management system interacts with an ATM manager for this purpose. However, to enable interaction with an ATM network, the ATM and transport trails between boxes—the ATM adaptation layer 2 trail is illustrated. Connections to and from the network manager system have not been modeled.

Figure 30:
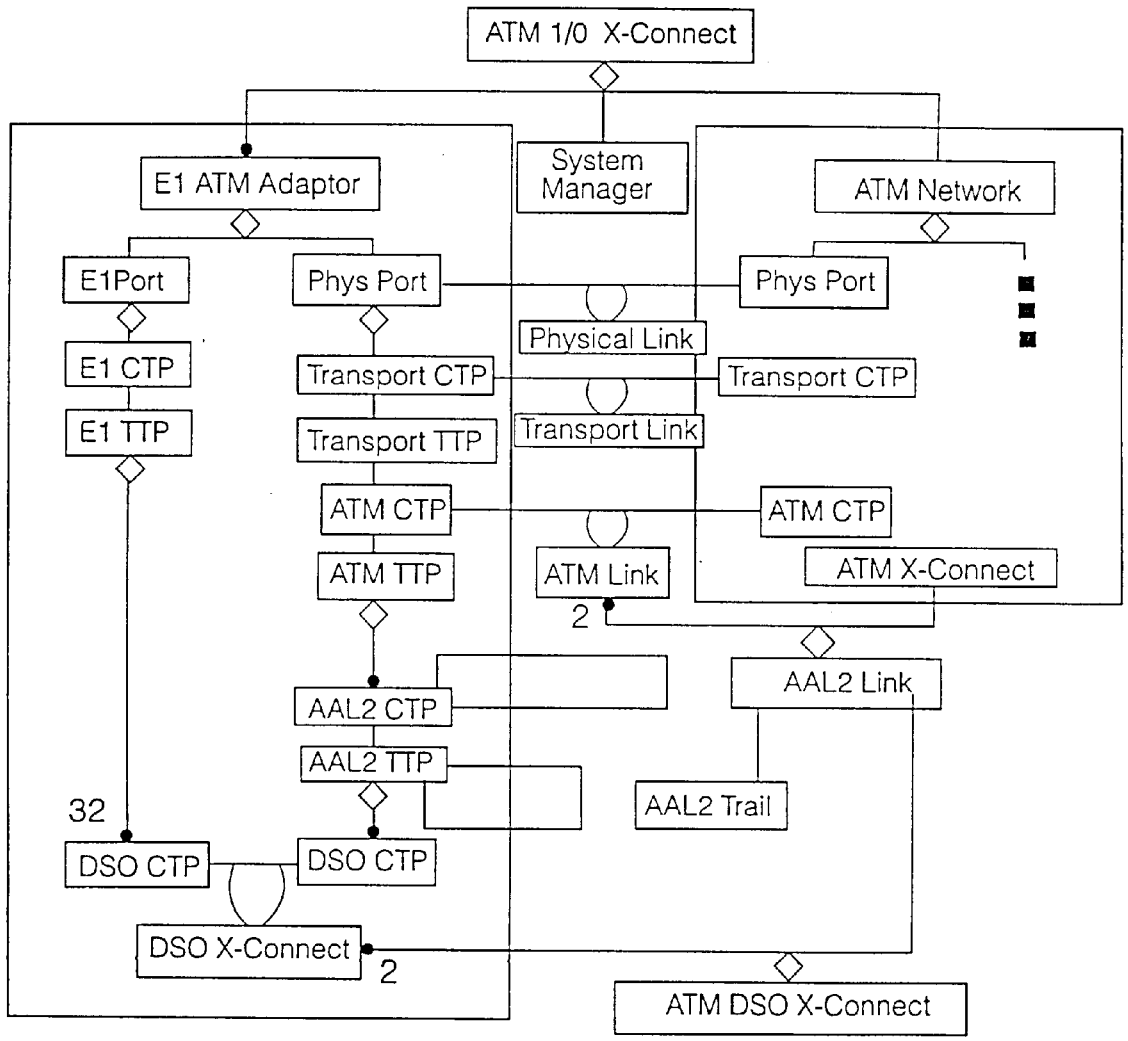
FIG. 30 illustrates an optimized, folded implementation class model of the E1 1/0 cross-connect.

Referring to FIG. 30 herein there is illustrated an optimized implementation class model comprising a plan for an implementation level element for controlling the 1/0 cross-connect. The optimized implementation class model is folded upon itself, taking advantage of the symmetry within the implementation class model. In this case, in FIG. 29 there is duplication of the groups of objects 2900, 2901, and the group of objects 2902 is symmetrical. The optimized (folded) implementation class model of FIG. 30 comprises an implementation level element for the composite controller of the 1/0 cross-connect over the E1 1/0 cross-connect over ATM. The required 1/0 cross-connect has been modeled as:

two DS0-cross-connects which are internal to an E1-ATM adapter an AAL-2 link across the ATM network, which itself consists of:

two ATM links (from each E1-ATM adapter to the nearest ATM switch)

an ATM cross-connect (the end to end connection across the ATM network)

In this case the system manager has not been modeled. This requires an ATM connection to each E1-ATM adapter. The best way to achieve this is to specialize the ATM adaptation layer into two sub-types: AAL-2 for traffic and AAL-5 for control. The controller connection can then be modeled in the same way as for AAL-2.

Figure 31:
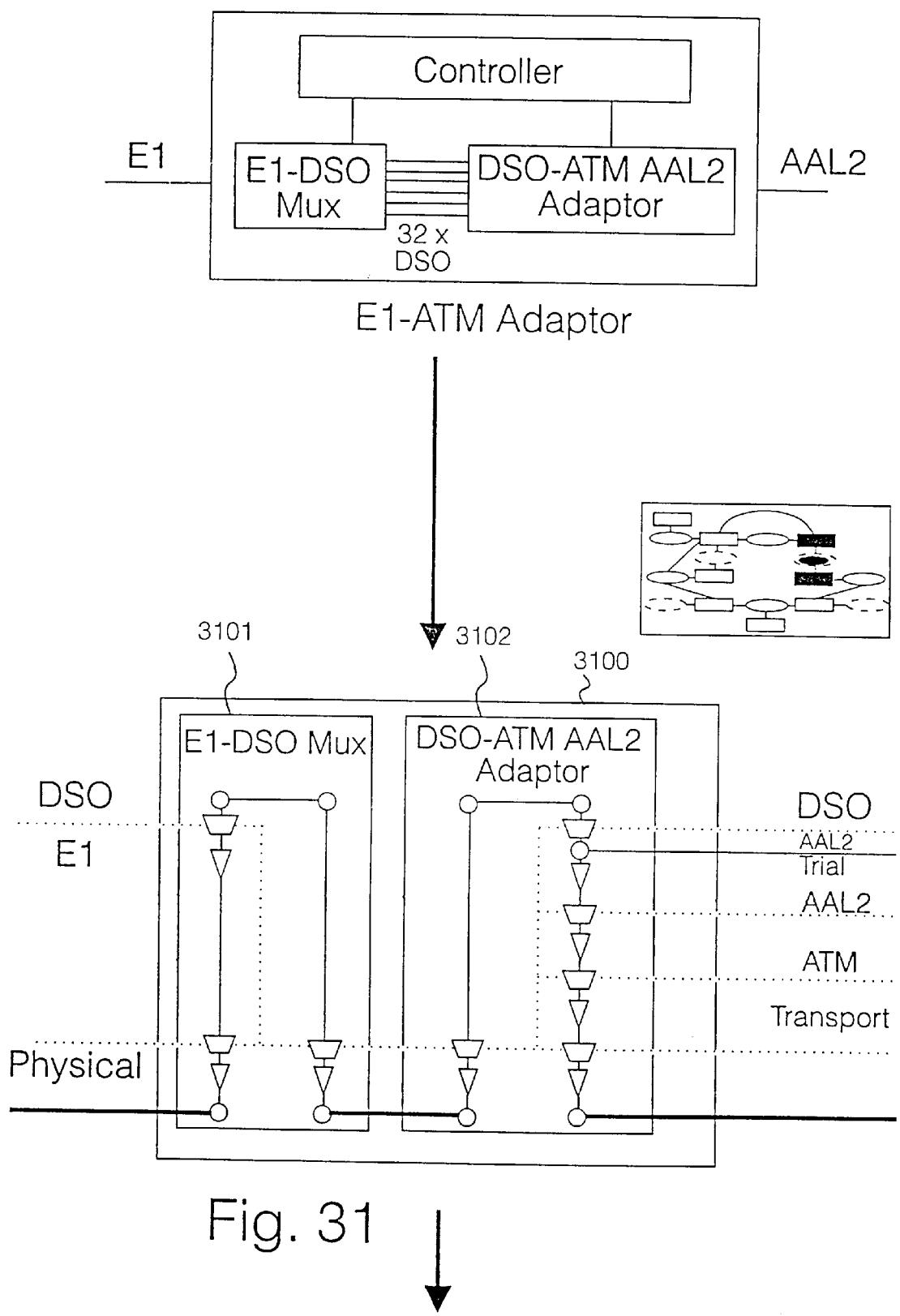
FIG. 31 illustrates a layered implementation class model of an E1-ATM adapter composite of the E1 1/0 cross-connect.

Referring to FIG. 31 herein, there is illustrated a result of modeling the connectivity layering of an E1-ATM adapter to produce a layered implementation model 3100. The implementation model comprises constituent components of a DS0-ATM adapter, an E1-DS0 multiplexer and a controller. In this instance, the layered implementation model for the E1 multiplexer comprises an E1-DS0 adapter model, and DS0-AAL-2 adapter 3002 (the controller has been omitted for simplicity).

Figure 32:
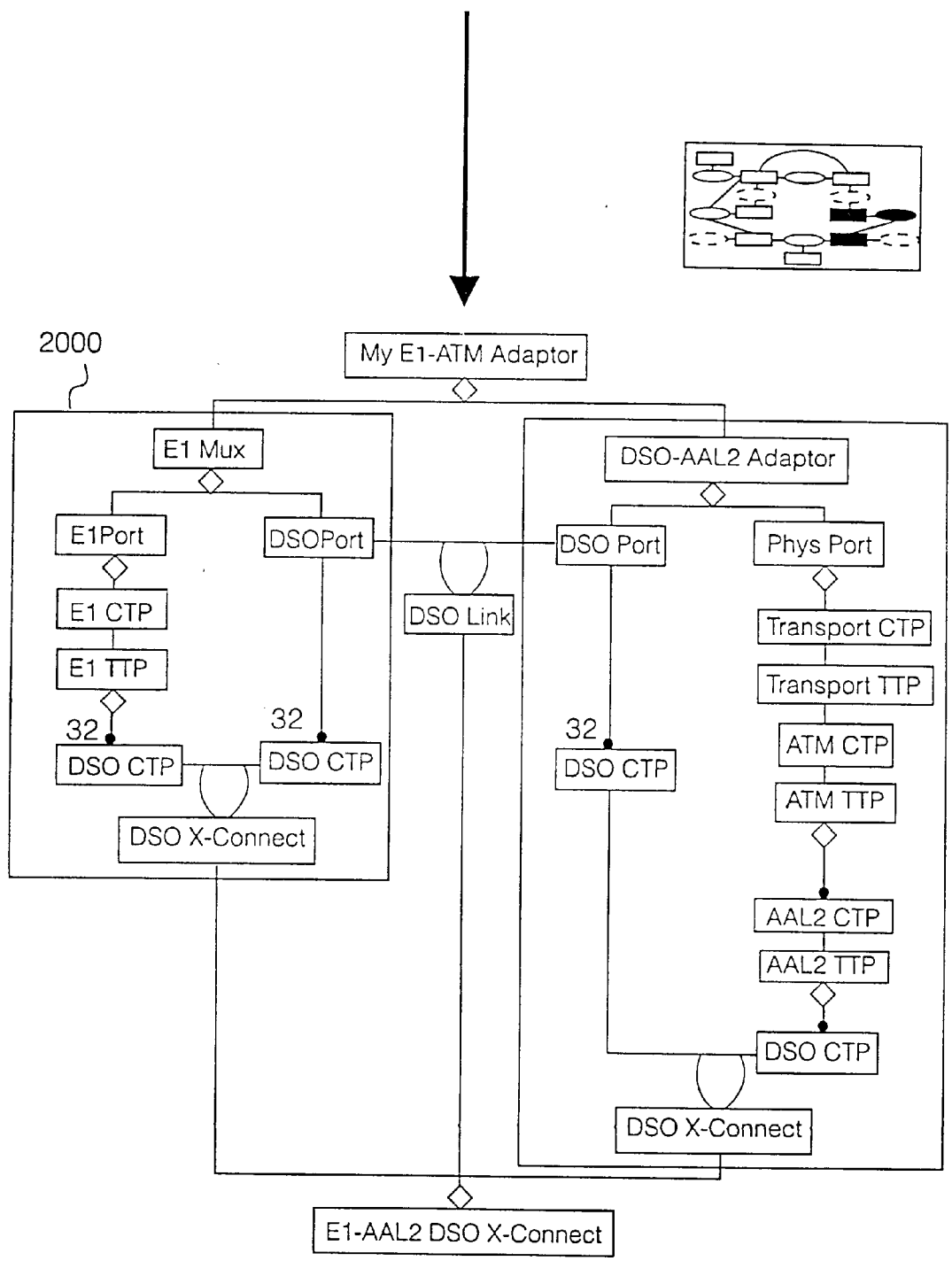
FIG. 32 illustrates a folded implementation class model of the E1-ATM adapter composite of FIG. 31.

In FIG. 32 herein there is illustrated an implementation class model of the E1-ATM adapter. The implementation class model comprises a plurality of objects arranged to reflect the structure of the individual hardware components of the E1-ATM adapter. In particular, a group of objects 2000 representing an E1 multiplexer component has been able to be reused in its entirety from the previous implementation class model of FIG. 20 herein. Much of the ATM cross-connect application model has been reused to construct the DS0-AAL-2 adapter model. The required E1-ATM AAL-2 cross-connect function has been constructed from:

The reused E1-DS0 cross-connect

The DS0 cross-connect within the DS0-AAL-2 adapter

The link between the two components.

The model does not lend itself to further optimization by folding.

Figure 33:
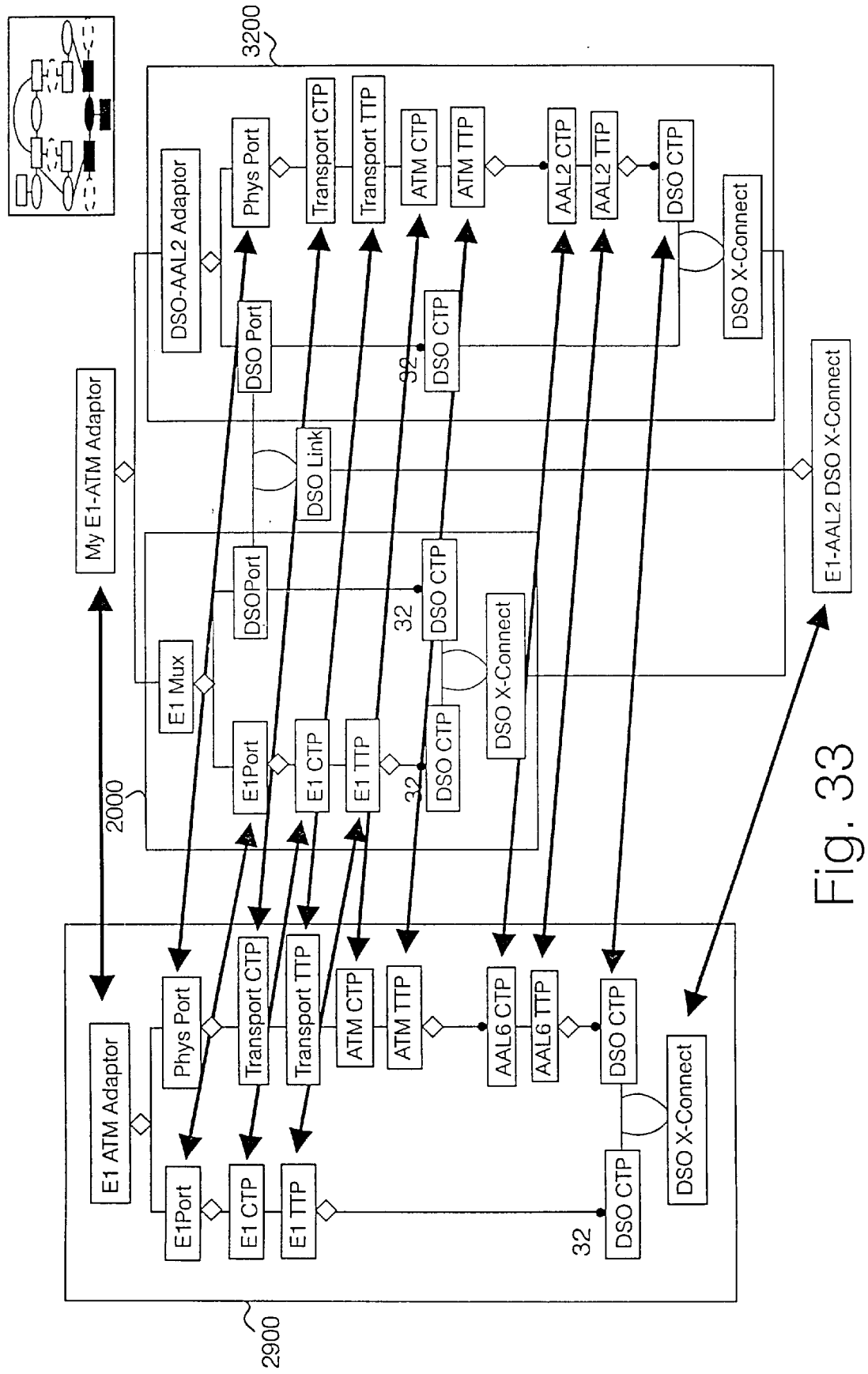
FIG. 33 illustrates a mapping between an application class model and an implementation class model of the E1 1/0 cross-connect over ATM.
Figure 34:
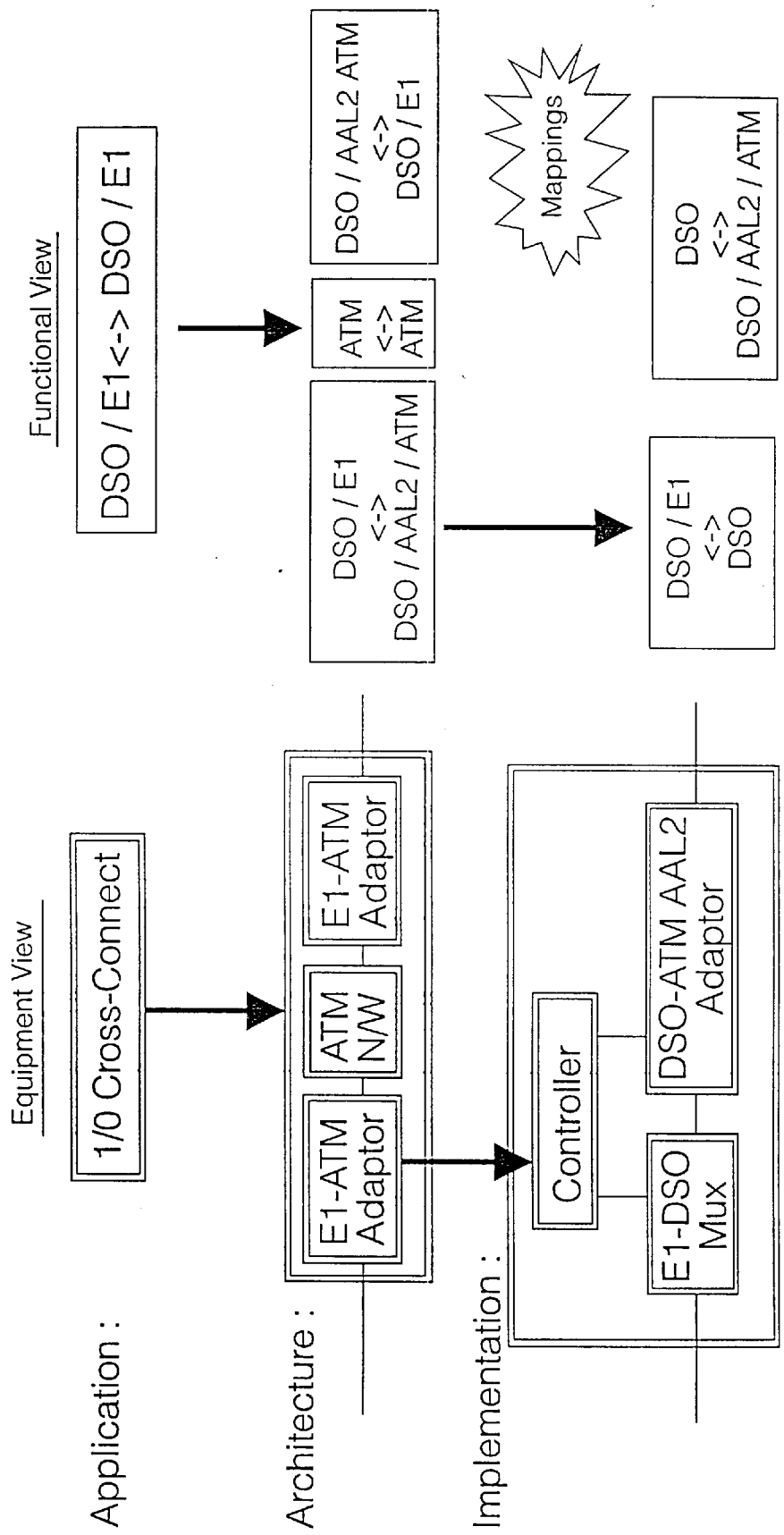
FIG. 34 illustrates in general overview stages in developing an application model through an architecture model to an implementation model for a 1/0 cross-connect.

In FIG. 33 herein, there is illustrated the application class model of an E1-ATM adapter 2900 on the left hand side and the corresponding implementation class model on the right hand side, the implementation class model comprising groups of objects representing an E1 multiplexer 2000 and an DS0-ATM AAL-2 adapter 3300. Each object in the application class model maps to a corresponding respective object in the implementation class model. The implementation class model comprises additional objects representing detailed structure of the physical E1-ATM adapter device. The above example demonstrates how a top-down system decomposition produces a linked set of management object models as shown in general overview in FIG. 34 herein. The linked models developed by the top-down method system decomposition in the ATM 1/0 cross-connect example have some notable features:

Internal implementation details within the module level models are hidden within these modules and are not exported to higher level systems and application models.

The DS0 ports within the E1 multiplexer and the DS0-AAL-2 adapter unit are needed within the E1-ATM adapter system model, but are irrelevant at the application model level.

The hierarchy of models provides a set of system abstractions at various levels.

Given that the ATM 1/0 cross-connect architecture could be implemented as a multi-vendor network system, the models indicate what must be modeled within each TMN layer and what must be exported across the network element management layer boundary.

The composition of the system in terms of a system manager, an ATM network and several E1-ATM adapter units is held at the network manager level: the E1-ATM adapter object provides a linkage down to the EM level.

The ATM DS0 cross-connect, AAL-2 link and trail, ATM cross-connect and link, transport and physical link object appear on the network management level and are mapped down to the EM level via the corresponding connection termination point and trail termination point objects.

Referring to FIGS. 35 to 47 herein there will now be described a third example according to a specific method of the present invention. FIG. 35 illustrates an application model "black box" view for the transit exchange. In FIG. 36 herein, there is illustrated an architecture for a voice-over ATM transit exchange, the exchange comprises a call processing and system management 3600, a first E1-ATM adapter 3601, and a second E1-ATM adapter 3602 communicating over an ATM network 3603.

FIG. 37 illustrates an implementation model for the transit exchange. Each major component of the hardware items implementing the transit exchange is modeled in the implementation model 3700. For example first E1-ATM adapter 3601 comprises an E1 protection module 3701, first to fourth E1-DS0 multiplexers 3702–3705 and a DS0-ATM adapter 3713. The call processing and system management 3600 is represented as main and standby MTP-3 processors 3706, 3707; main and standby ISUP/call controls, 3708, 3709; first and second MTP-2 frame processors 3710, 3711 and an ATM system manager 3712, and E1-ATM adapter 3602 is represented similarly as the first E1-ATM adapter 3601. The voice-over ATM transit exchange of FIG. 37 as illustrated exhibits some additional management modeling aspects which exemplify a carrier strength application. In the application model, managed objects for SS7 signaling and for the transit switching function are modeled. In the architecture model, management of the ATM AAL2 pipes between E1-ATM adapter units, known as virtual trunk groups (VTGs) are modeled. In the implementation model, a model of processor plus software load; 1+1 protection of call processing modules; 1:M protection of the E1 trunks, as implemented by the E1 protection module; and internal connections between call control, frame processor (MTP-2) and signaling links are modeled.

Figure 38:
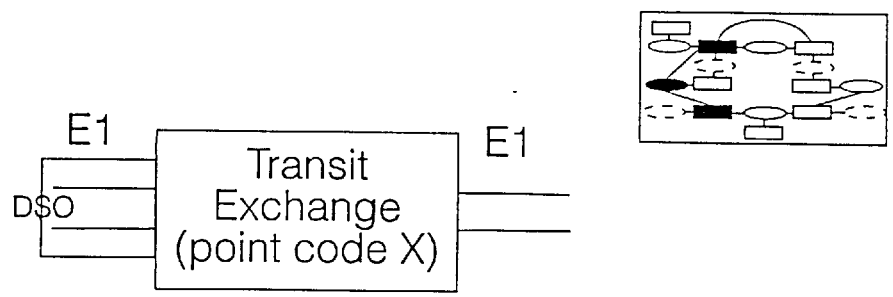
FIG. 38 illustrates an intermediate step between a black box view and an application class model for the ATM transit exchange.
Figure 39:
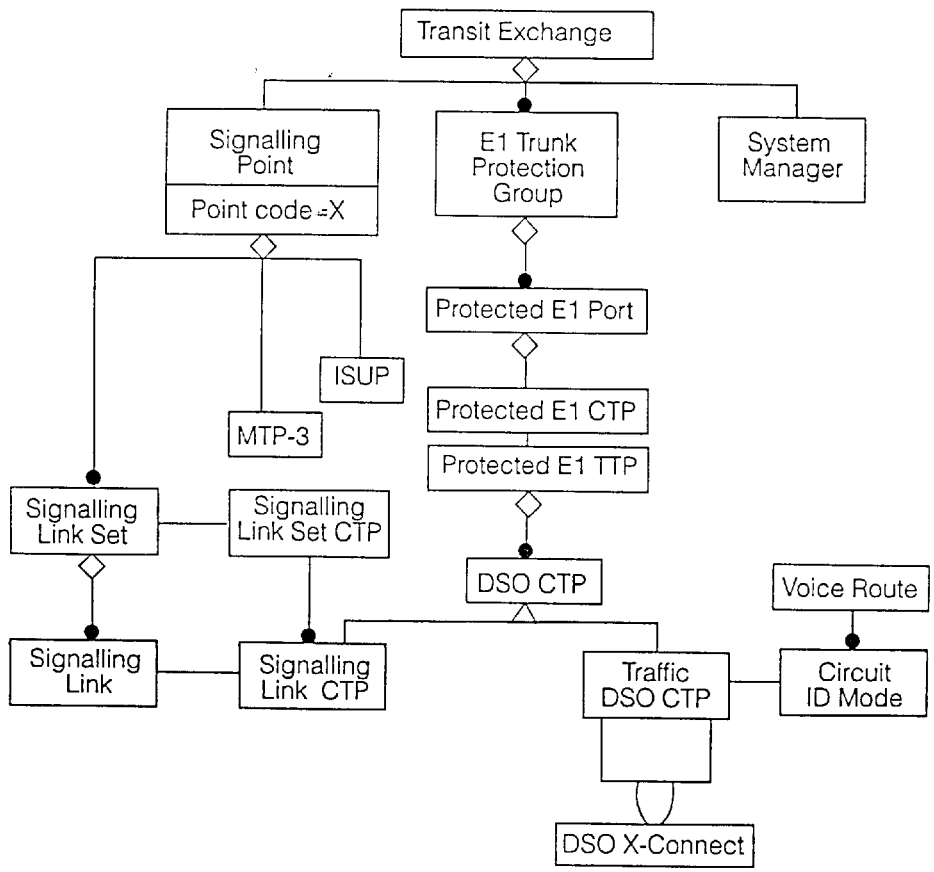
FIG. 39 illustrates a simplified application class model, for a function controller for controlling an ATM transit exchange apparatus.

Referring to FIG. 38 herein, the application model is a "black box" view of a simple transit exchange with protected E-1 trunks (there is no signal transfer point capability and no advanced features), where attached DS0 circuits carry either traffic or signaling links. Traffic channels are aggregated into voice routes which aggregate the traffic carried between adjacent exchanges. Signaling links are aggregated into signaling link sets, which carry signaling information between adjacent exchanges. Within the exchange, signaling information terminates at a signaling point. MTP-3 provides reliable transport of messages between signaling points. ISUP is a user part which interprets signaling messages and sets up and tears down calls. FIG. 39 herein illustrates an application class model of the transit exchange of FIGS. 35 and 38, where each function carried out by the transit exchange is represented by a corresponding function element.

Figure 40:
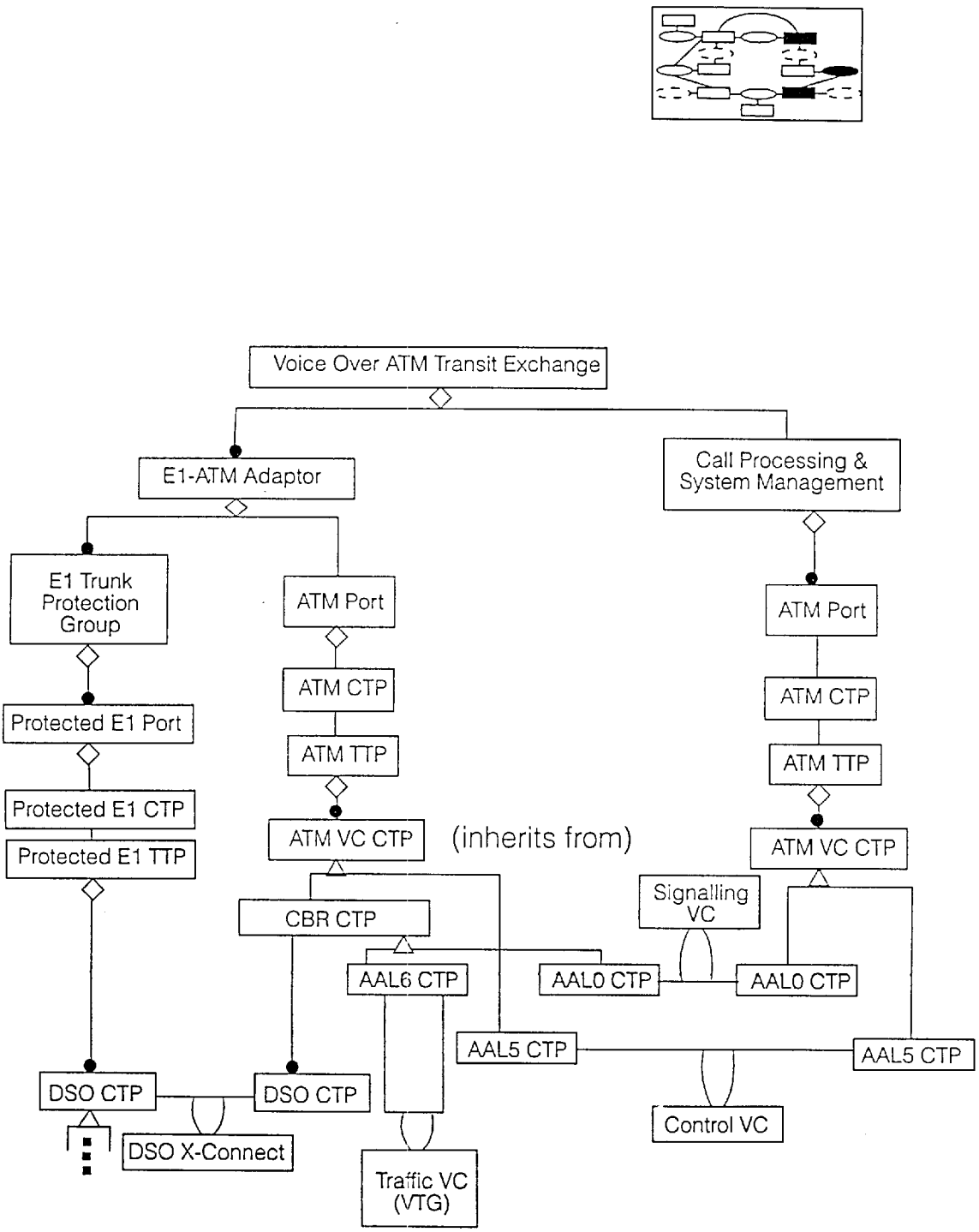
FIG. 40 illustrates an implementation class model of the voice over ATM transit exchange.

Referring to FIG. 40 herein, specific features of the ATM transit exchange architecture which must be modeled in the implementation model are:

call processing and system management (initially as a black box functional entity, to be decomposed into its constituent parts as modeling progresses).

The E1 -ATM adapter and its ability to provide protection of E1 trunks.

Cross-ATM virtual circuits used for:
control paths
signaling paths (to/from call processing)
traffic
virtual trunk groups (VTGs)

There is shown in FIG. 40 herein a folded implementation class model for the transit exchange in which first and second E1-ATM adapters are modeled by a single assembly of objects, and the call processing and system management are modeled as an assembly of objects.

Figure 41:
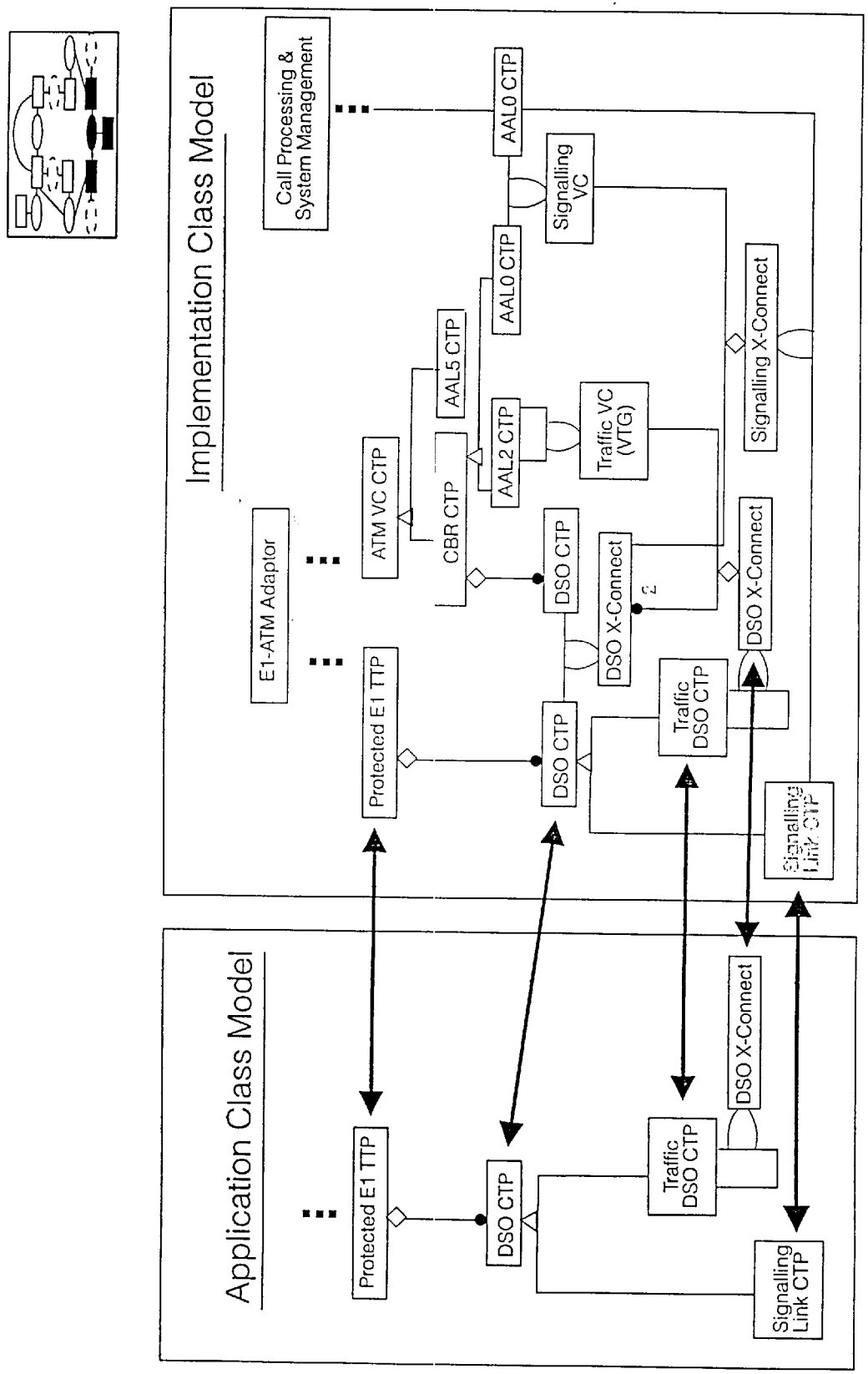
FIG. 41 illustrates a combination of a portion of an application class model and a portion of an implementation class model for the ATM transit exchange with mappings between managed object classes in the two models.

In FIG. 41 there is illustrated the application class model and the implementation class model in which each class in the application class model is implemented by a corresponding class of the implementation class model in this case, a small portion of the application class model and the corresponding portion of the implementation class model are shown. Each cross exchange traffic connection has been modeled as two DS0-ATM adaptation cross-connections plus a cross-ATM VTG link. Each terminating signaling link has been modeled as a DS0-ATM adaptation cross-connection plus a cross-ATM signaling VC between a DS0-ATM adaptation unit and a call processing entity.

Figure 43:
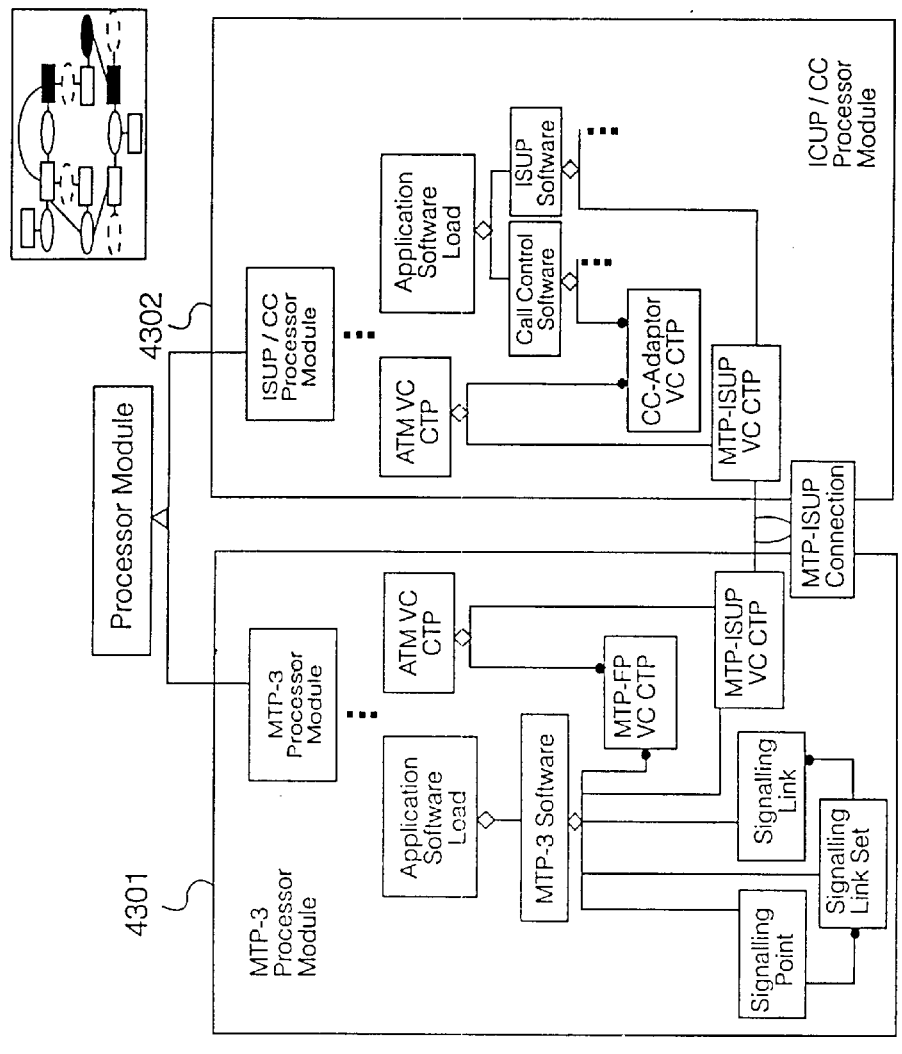
FIG. 43 illustrates an implementation class model of a processor module of the ATM transit exchange, comprising an MTP-3 processor module and an ISUP/CC processor module.
Figure 42:
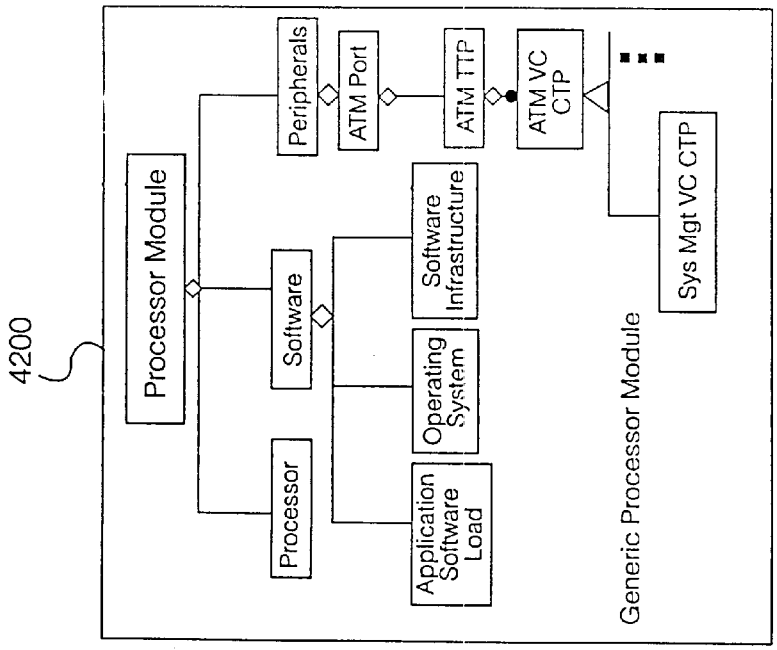
FIG. 42 illustrates an intermediate step in the development of an implementation class model for a call processing module of the ATM transit exchange.

Referring to FIGS. 42 and 43 herein there is illustrated how a call processing feature of the ATM transit exchange is modeled. A template implementation model 4200 for a processor module is used to construct a set of structure elements representing an MTP-3 processor module 4301, and an ISUP/CC processor module 4302 in an implementation class model of the processor module. The ATM transit exchange call processing is split across two processors, one with MTP-software and one with ISUP and call control software. The object model for the generic processor module 4200 is a framework which is specialized and extended for specific processor load types. The ATM VC CTP has in each case been further specialized to model the various connections which have terminations in them at the software level. Generic processors with non-ATM ports may be similarly modeled.

Figure 44:
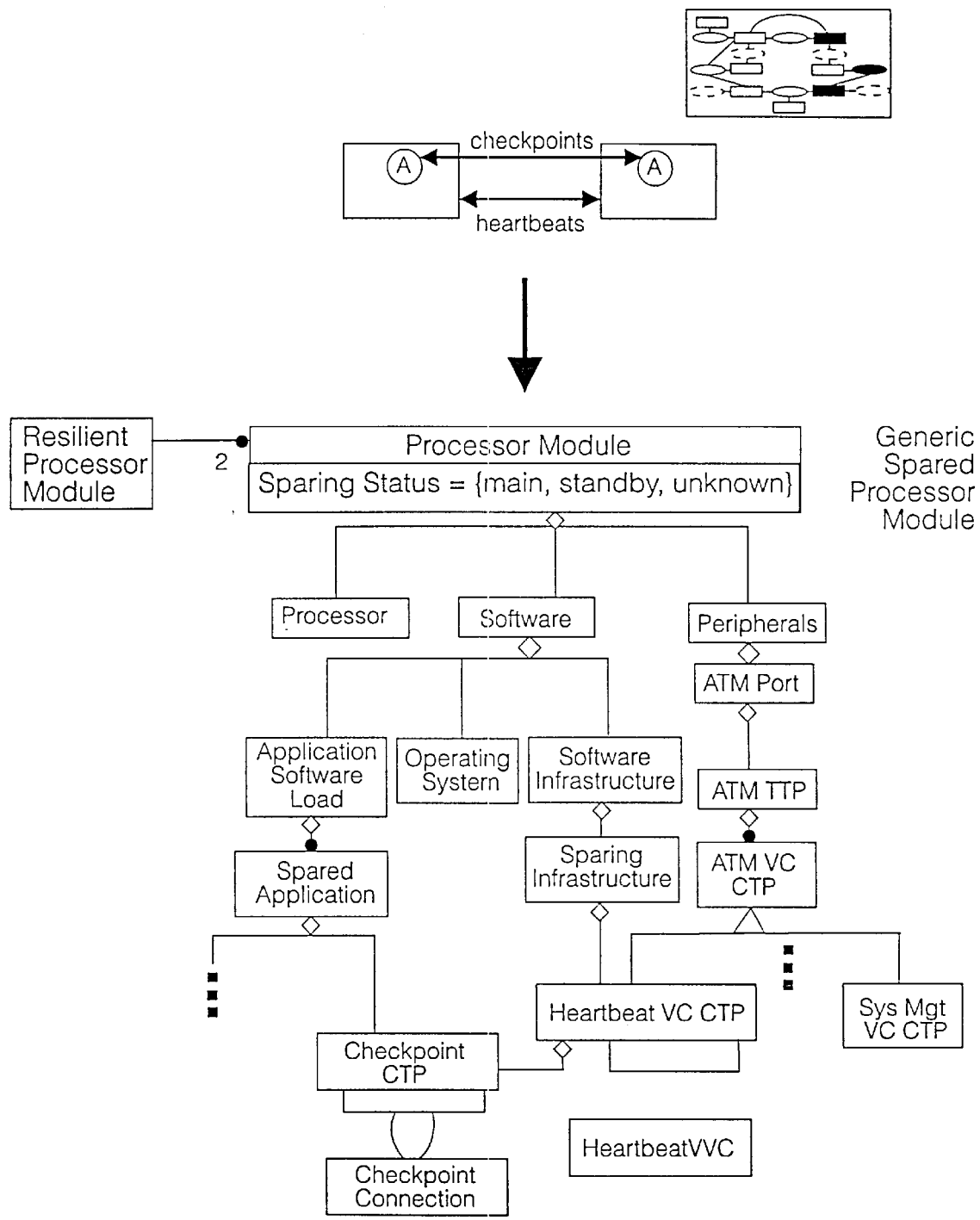
FIG. 44 illustrates an implementation class model of a generic spared processor module of the ATM transit exchange.

Referring to FIG. 44, there is illustrated how each processor in the ATM transit exchange implementation model has been duplicated to provide resilience against most cases of software or processor failure. The model in FIG. 44 presumes that sparing has been realized on a per processor basis (finer grain sparing is possible on a per application basis and would be modeled in similar fashion).

A resilient processor module is constructed from two non-resilient processor modules which have been configured with a sparing capability. This capability is implemented by:

a virtual channel between a pair of processors which provides a heartbeat between the processors and checkpoints in between spared applications on the processors.

additional software within the infrastructure to control sparing.

The system manager can provision sparing or can force switch over between processor modules by operating upon the resilient processor module object.

Referring to FIG. 45 there is illustrated an application model and in FIG. 46 there is illustrated an implementation model of E1 trunk protection. The E1 trunk protection model within the E1-ATM adapter unit provides 1:M protection of E1 information. Time slot 0 is used to control protection. To support continued operation in the case that the spare E1 trunk fails, the signaling information is duplicated in one of the main E1 trunks. The spare E1 trunk is able to substitute for any of the main E1 trunks in case of failure. The block diagram in FIG. 46 describes an internal structure of an E1 protection module.

Figure 47:
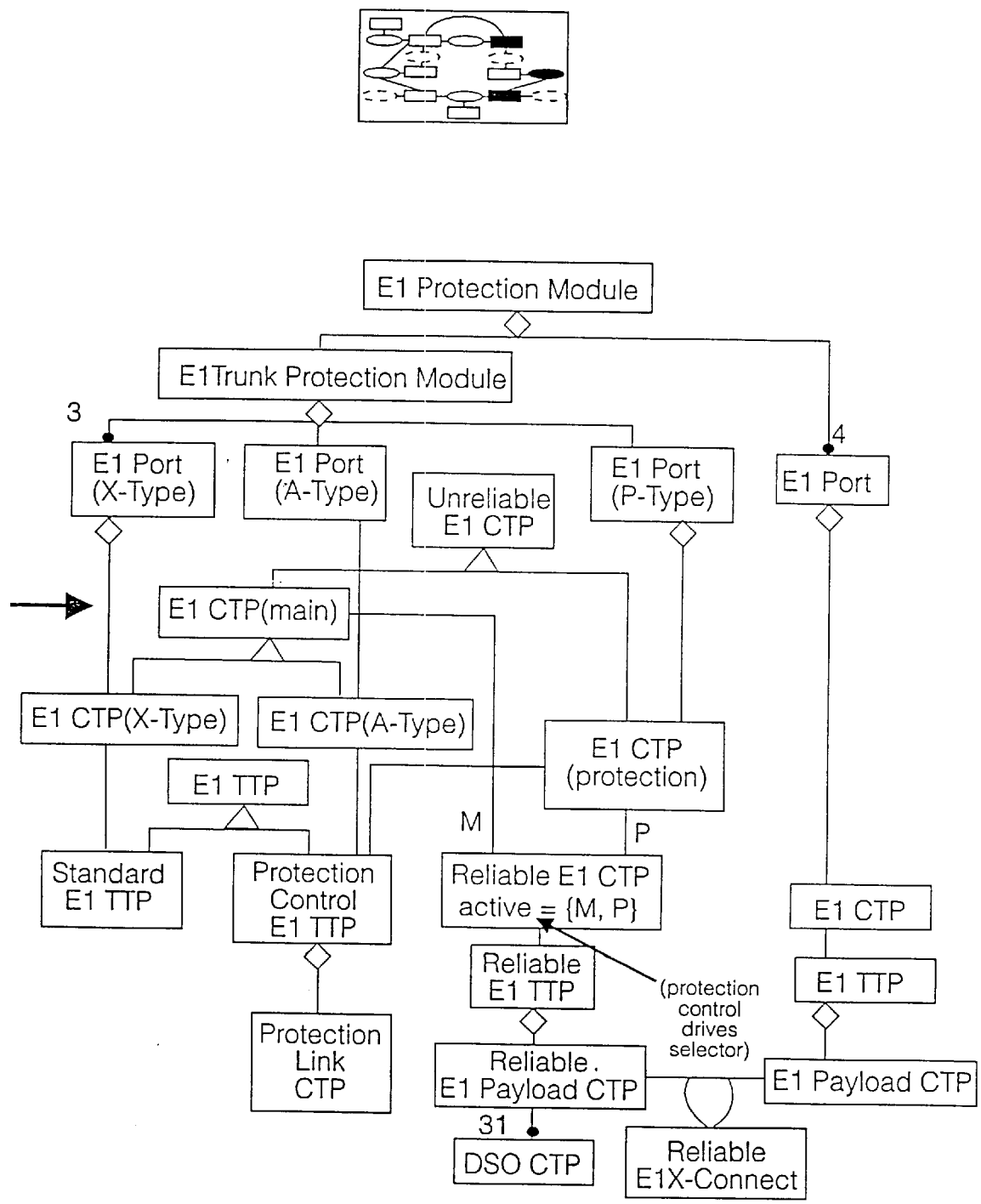
FIG. 47 illustrates an implementation class model of an E1 protection module portion of the E1-ATM adapter implementation model of FIG. 45.

In FIG. 47 herein, the E1 protection module implementation model is converted into an implementation class model which specifies that a protection control information in time slot 0 is part of an E1 trail. The E1 payload, ie the E1 data stream is the part that is actually cross connected within the module.

Figure 48:
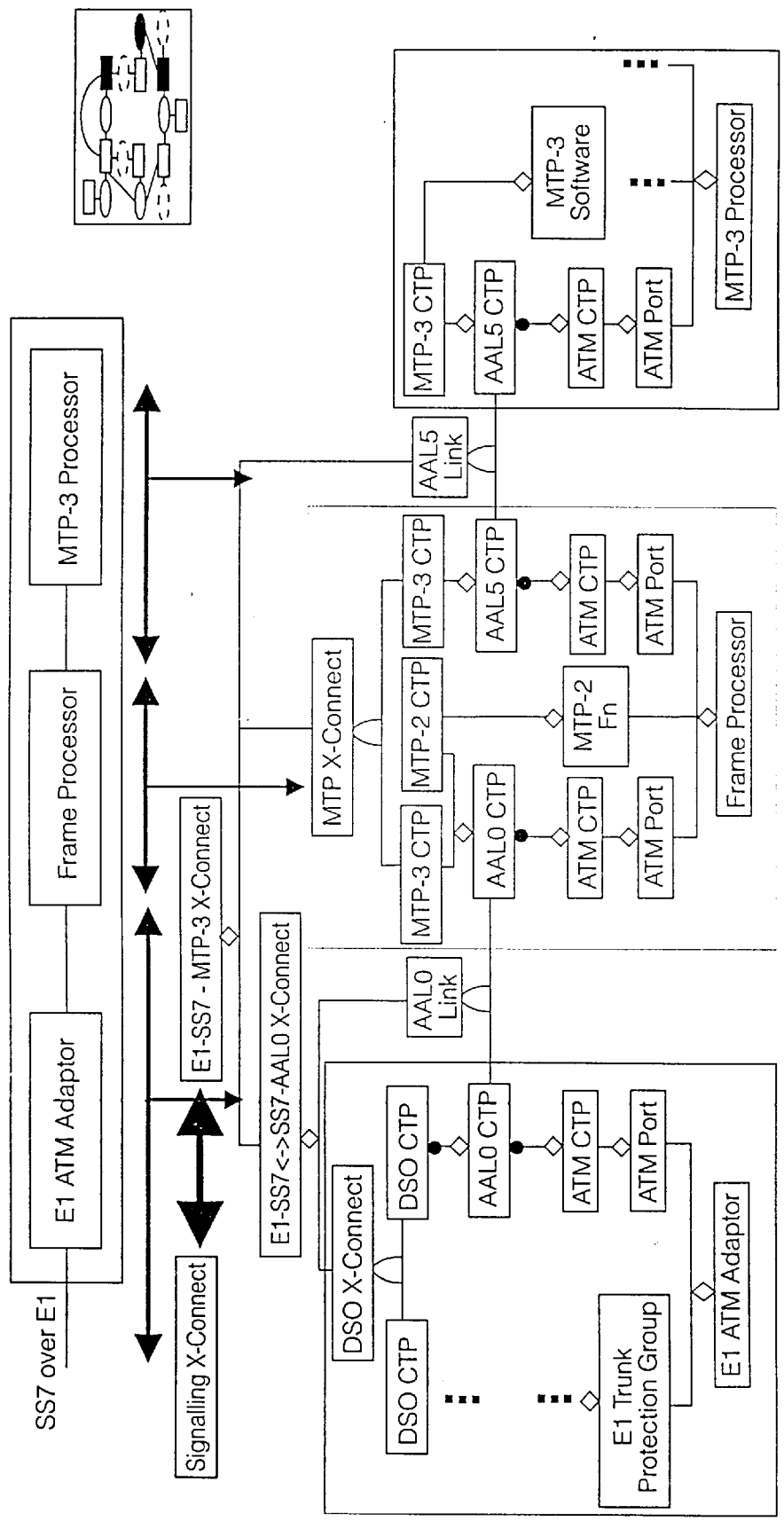
FIG. 48 illustrates an implementation class model fragment of an ATM transit exchange, showing how a signalling link is switched internally through the E1 ATM adaptor and frame processor components to its termination within the MTP-3 processor component.

In FIG. 48 herein, there are illustrated how to depict internal control connections needed to reach the MTP-3 application via a signaling link. Other internal control and management connections can be modeled in a similar way. For simplicity, TTP objects have been omitted in FIG. 48.

Figure 49:
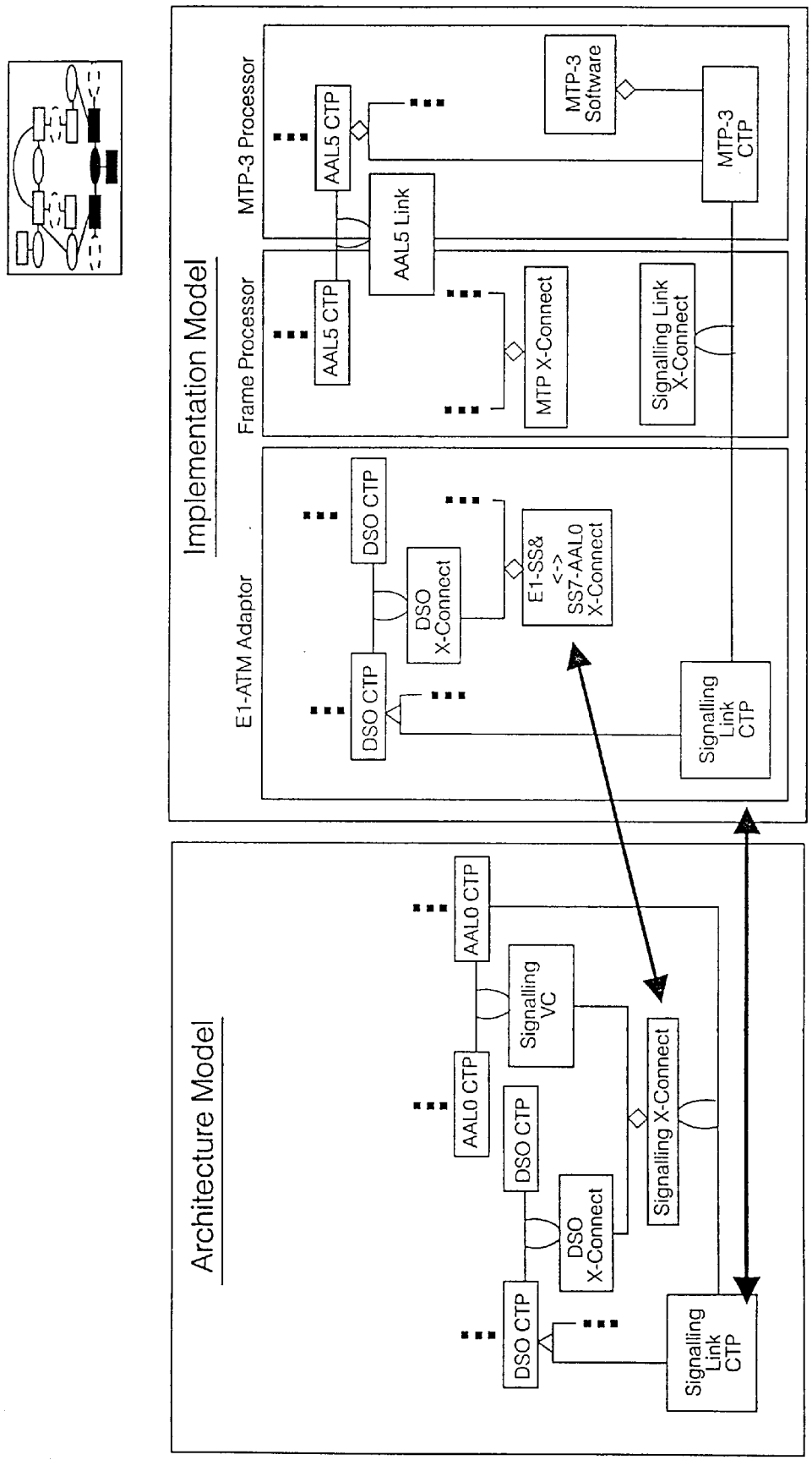
FIG. 49 illustrates a combined class model including application class model and implementation class model portions for a section of an ATM transit exchange, including an E1-ATM adaptor implementation class model, a frame processor implementation class model and an MTP-3 processor implementation class model connected with a signaling cross-connect between signaling link connection termination point elements, one of which is mapped to an application class model within the combined class model.

In FIG. 49, there is illustrated an application class model and an implementation class model comprising a plurality of classes which in practice are realized as a corresponding set of application level elements and implementation level elements in a network controller, the mappings between the application class model and the implementation class model shown by dark arrows are implemented in practice as embedded signaling between the application level elements and implementation level elements in the network controller. Having modeled the internal connections required to support a signaling link, this can now be mapped back onto the application class model for the ATM transit exchange.

Using the above method of constructing a management system, there may be enabled more efficient construction of the management system in reduced time through the following features which are inherent in the above described methods:

Separation of application models describing functionality of network elements from implementation models describing design of composite controllers for implementing control of those composites, and the explicit mappings between the implementation models and application models, enables implementations, for example implementations of specific equipment configurations, or whatever the implementation model represents, to be reused across different applications. Conversely, as an application model evolves, different component models may be substituted in the implementation model.

When developing new hardware equipment for composites, the equipment may be constructed in terms of components which have a common architecture and common framework for instantiating a functionality. Specific functionality may be added onto this common equipment for performing specific purposes.

Figure 50:
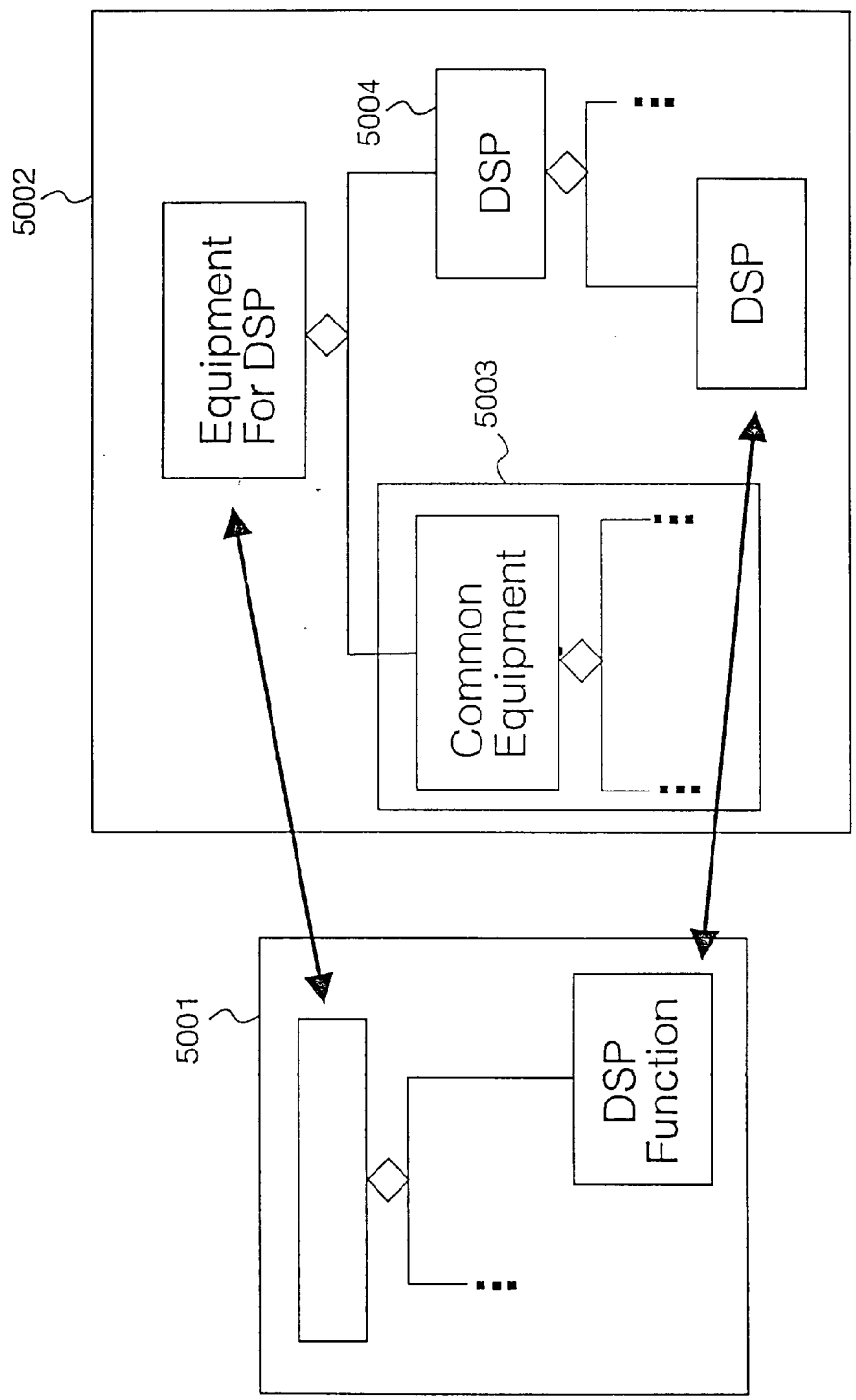
FIG. 50 illustrates a common object model illustrating a management unit for an item of common equipment which can be customized to perform a specific functionality.

If, in the management system the common functionality of equipment is modeled separately from the specific functionality, then as a common equipment item is reused throughout the network, the implementation model corresponding to the common equipment can be reused throughout the management system, or in other management systems. Management of the common aspects of the equipment can be reused from management system to management system. An implementation model may comprise a plurality of objects describing a common part of the equipment, and parts of the equipment which are specific to a particular application can be modeled by additional objects in the implementation class model, or as a sub-class of an existing object in the implementation model which customizes the general equipment for a specific purpose. For example referring to FIG. 50 herein there is illustrated an application class model 5001 for an item of common equipment, adapted for a specific function, together with its corresponding implementation model 5002. The common equipment item is customized for digital signal processing. The implementation model 5002 comprises an implementation model 5003 for the common equipment, together with an implementation model 5004 specific to the digital signal processing. The composite of the common equipment implementation model 5003 and the digital signal processing model 5004 customizes the equipment for the digital signal processing function. An application level element arising from the application class model 5001 maps across directly to a corresponding implementation level element in the implementation class model 5002. Thus, functionality of the customized equipment is described in the network management system by an application level element constructed in accordance with application class model whilst the implementation and operation of the customized equipment is represented in the network management system by an implementation level element constructed according to the implementation class model, which itself comprises an implementation class sub-model relating to the part of the equipment which is common.

To customize the common equipment for a different function, for example ATM access, the customized equipment is represented in the management system by an implementation level element constructed according to an implementation class model comprising the common equipment implementation class sub-model and a further implementation class sub-model constructed of specific component controllers and by an application level element constructed in accordance with an application class model describing the ATM access function. In the network management system, the application level element controls the implementation level element in accordance with mappings between the classes of the application class model and implementation class model respectively.

The common equipment is application independent and can be customized for specific functionality, and the component controller in the network management system corresponding to the common equipment is also application independent and can be customized by addition of other component controllers to give application specific control of the equipment New or enhanced functionality can be applied across a wide variety of models: Although specific application class models and implementation class models are dedicated to specific functions and specific composites, with some reuse of common equipment embedded, there are some management functions which apply to a majority of the composites and their constituent components, such as for example fault management, configuration management and performance management because these types of functions are common regardless of what type of equipment or applications are included in the network. The same structures of objects can be applied to application level elements controlling functions of a wide variety of equipment. For example the generic aspect of configuring a managed object can be applied to a DS0 port, a DS0 connection termination point, and so. Thus, there is an advantage in that whenever a new item of hardware equipment of a composite is built, which needs to be managed, because the equipment in general will be constructed from a known pool of components, the component controllers representing items such as termination points, ports, cross-connects and links will recur. Each time one of these items appears, the corresponding portions of the management system can be reused, without the need to manufacture new component controllers. Further, where a hardware component is modified, the corresponding application level element need not be altered. Only a new component controller needs to be created for the new component.

New or enhanced functionality has value across all models. Thus, if a management functionality is improved, those improvements can be applied across all composites and components. Thus, if for example management functionality is enhanced to provide enhanced alarm correlation, that enhanced alarm correlation can be applied to all composites elements and components of the network. Thus, management functions can be incrementally improved without the need for complete management system restructuring, but rather only by incremental management system restructuring. Incremental improvements to the network management system representing improvements in management functionality can be made independently of incremental improvements to the management system reflecting improvements in the composite and component equipments.

The management system can be viewed from several different views due to its separation of construction into the plurality of application level, implementation level, system controllers, composite controllers and component controllers. For example, the internal structure of the network controller is not locked into any one particular view, and views can be added incrementally. For example different customers may require different types of interface to the management system for example different machine-machine interfaces. Using the present methods herein each interface can be constructed incrementally. It is not necessary to reconsider the whole management system when applying a new interface and changes to the management system can be constrained.

The same views may be offered over different underlying transport protocols. The graphical user interface view is separated from the application model and implementation models within the management system, and the graphical user interface views may be offered over different transport protocols eg X.25, ATM.

Figure 51:
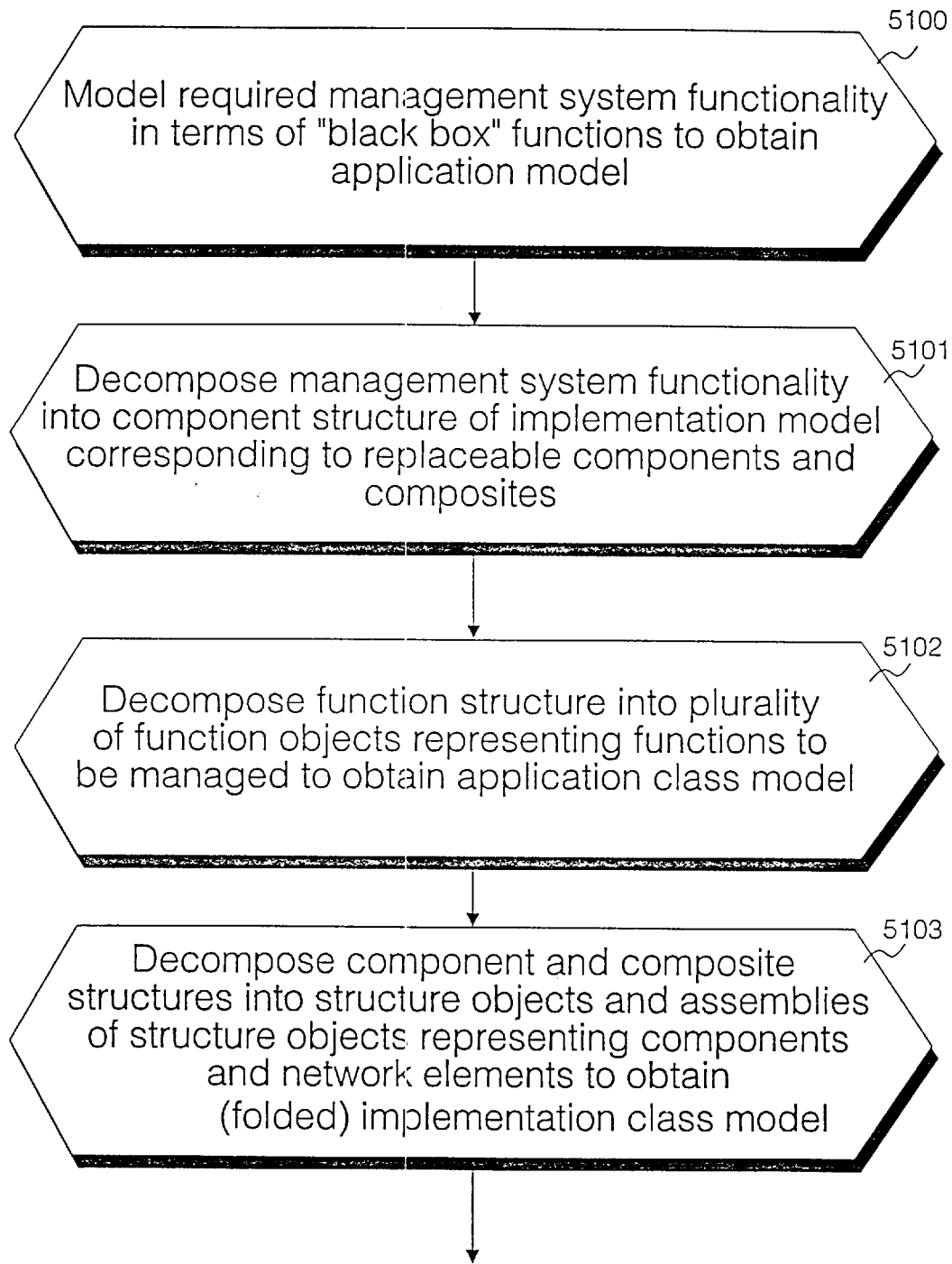
FIG. 51 illustrates steps for constructing a management system for a communications network having pre-defined components and composites.
Figure 51:
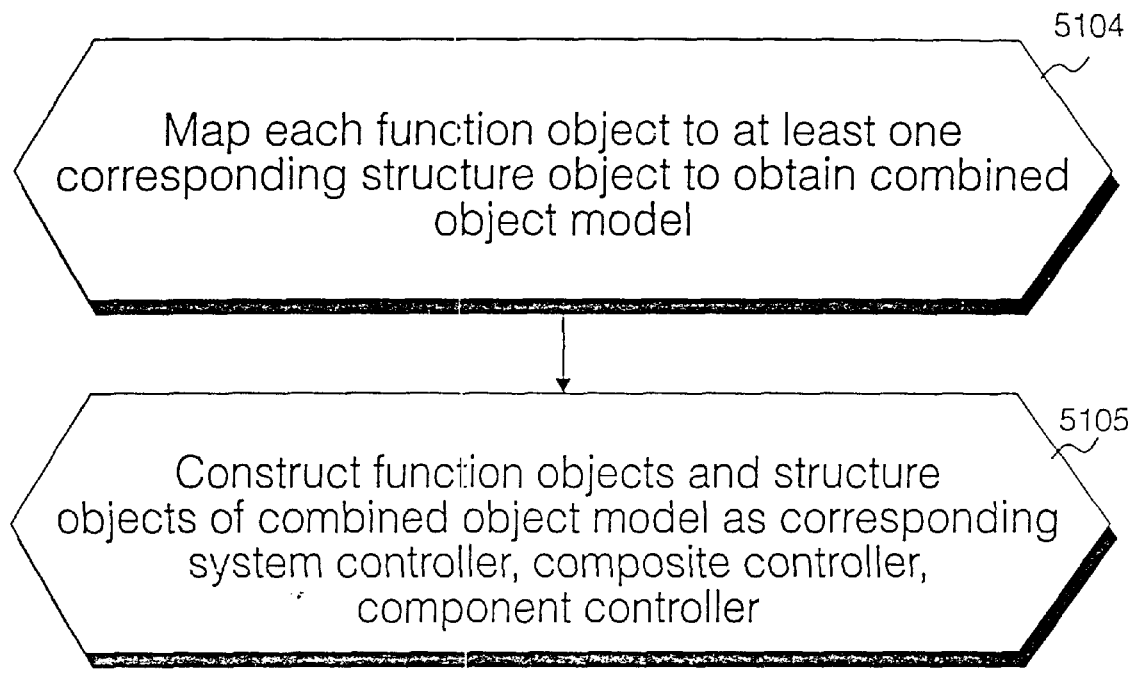

Referring to FIG. 51 herein, there is illustrated steps for constructing a network management system based on a combined object model as obtained with reference to FIGS. 14 to 50 herein. The steps illustrated in FIG. 51 are shown in a sequence which may be followed where a plurality of composites and components for a communications network have already been selected, and a management system for that network is to be constructed. In step 5100, a set of functionality requirements which are to be managed are modeled in terms of "black box" functions as described hereinbefore. A plurality of black box functions are modeled interconnected, to obtain a functionality structure comprising an application model as hereinbefore described. In step 5101, the management system functionality is decomposed into an implementation model, in which each composite and component of the network is described in terms of its component structure to form an implementation model. Connectivity between "black box" models of components and composites is included in the implementation model. In general, replaceable and reusable components are modeled as "black boxes". In step 5102, the structure comprising the application model is decomposed into a plurality of function objects, each representing functions to be managed, to obtain an application class model as hereinbefore described. In step 5103, the component structures and composite structures of the implementation model are decomposed into a plurality of interconnected structure objects and assemblies of structure objects representing components and composites, to obtain an implementation class model as hereinbefore described. The implementation class model may comprise a folded implementation class model for optimization of the network management system. In step 5104, each function object of the application class model is connected to a corresponding structure object of the implementation class model by a mapping, to obtain a combined class model as hereinbefore described. The combined class model is then used as a plan for constructing the management system in terms of application level elements, implementation level elements, system controllers, composite controllers, and component controllers. In step 5105, each function object and each structure object of the combined object model are constructed as a corresponding application level element or implementation level element as appropriate.

Figure 52:
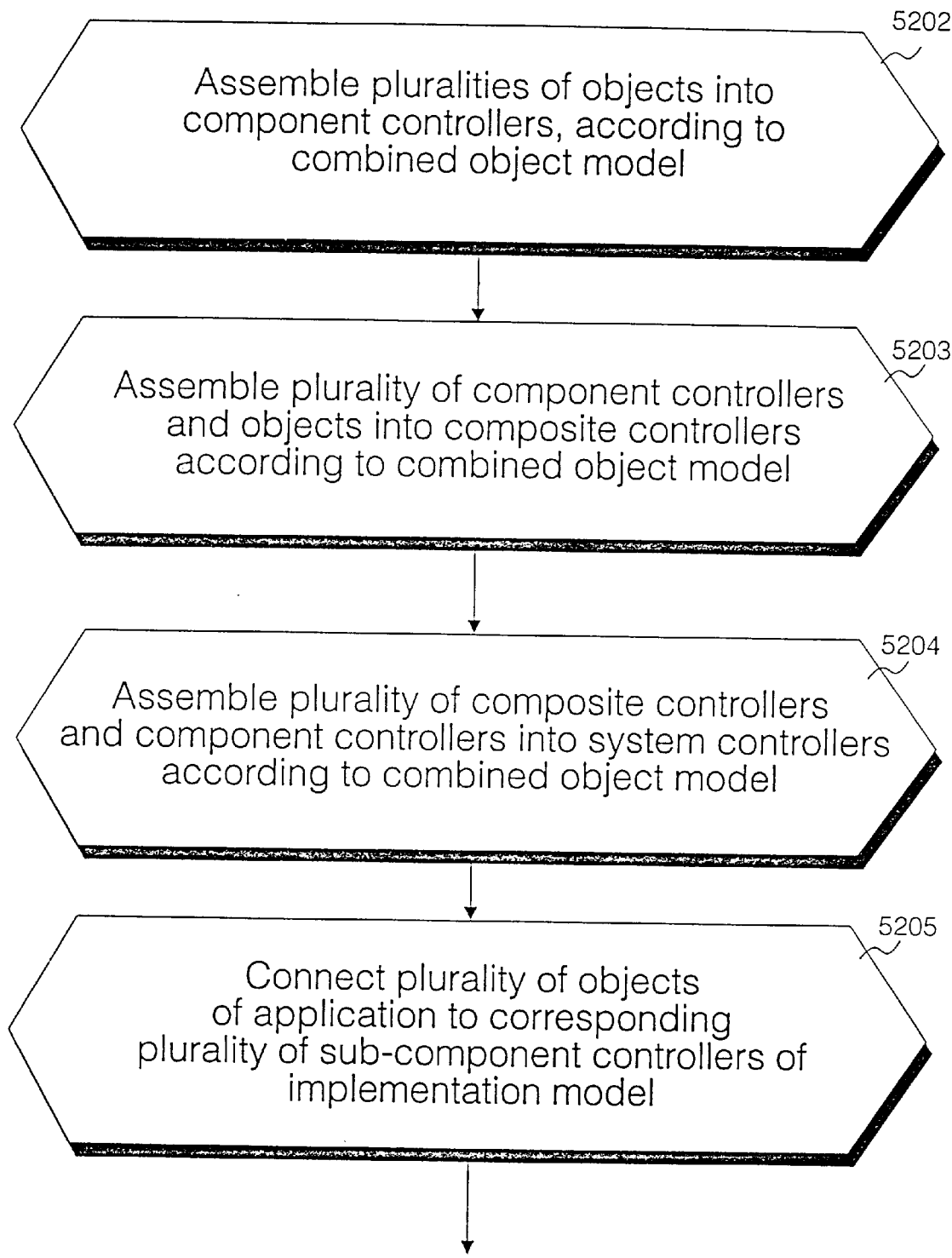
FIG. 52 illustrates a method of constructing a set of objects to create system controllers, composite controllers and component controllers.
Figure 52:
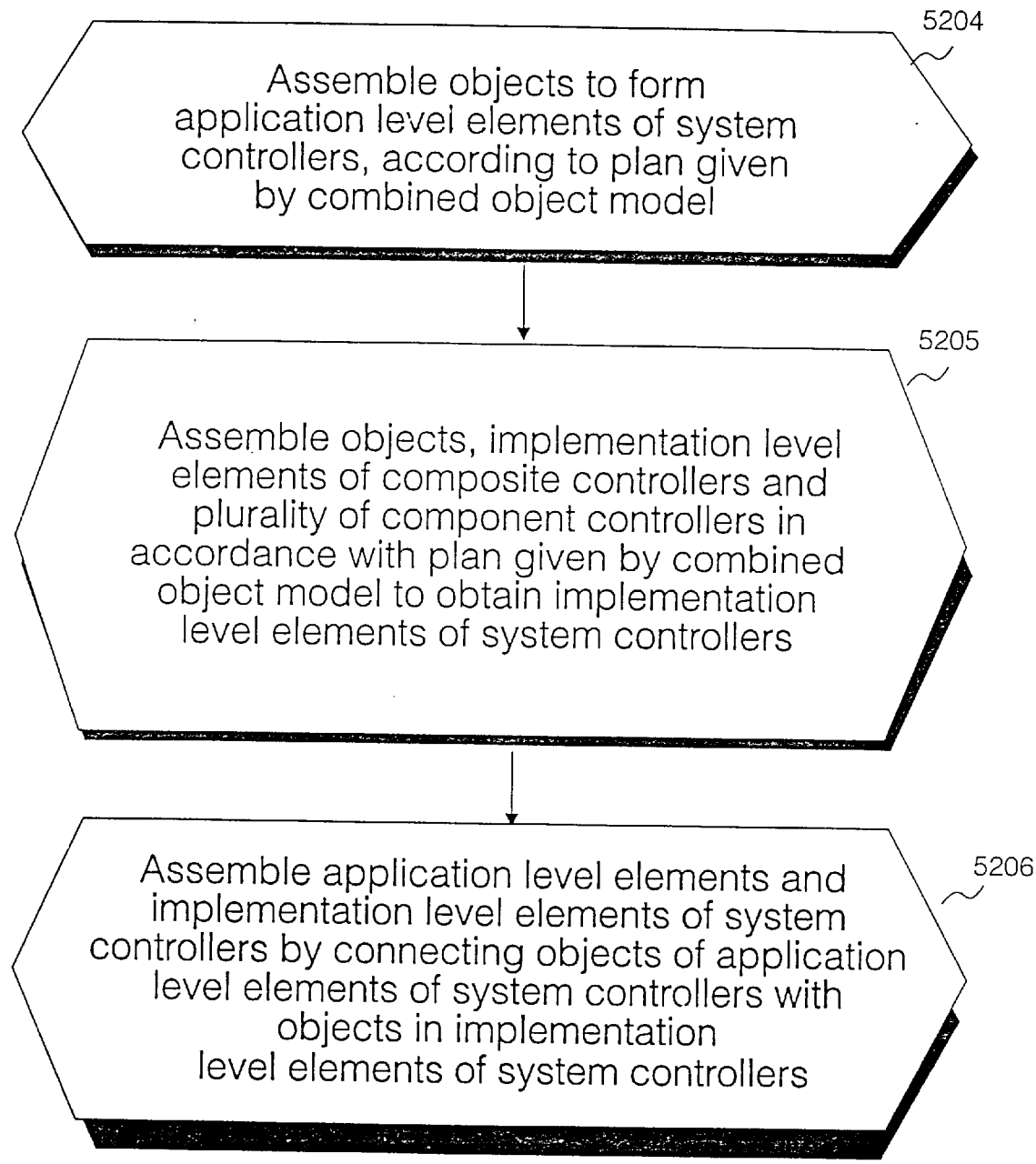

Referring to FIG. 52 herein, there is explained a method of constructing objects of the combined object model as a set of system controllers, composite controllers and component controllers. In step 5201, objects are assembled to form individual component controllers according to the layout of objects given in the combined object model. The component controllers are constructed by implementing the objects in an object oriented programming language which is used to control a processor and communications interface ports to send the appropriate OAM signals to the component itself, for managing that component. In step 5202, the component controllers are aggregated into assemblies of component controllers linked together by further objects to form implementation level elements of composite controllers according to the plan specified in the combined object model. In step 5203, a plurality of objects representing function only of a composite are assembled to form a plurality of application level elements of a corresponding plurality of composite controllers according to the plan defined by the combined object model. In step 5204, for each composite controller, the application level element and implementation level element are connected so as to communicate with each other, the connections being constructed in the object oriented programming language, in accordance with a set of mappings between objects of the application level element and objects of the implementation level element of the composite controller. In step 5205, a plurality of objects describing functionality of a system are assembled into an application level element of a system controller, according to the plan specified in the combined object model. In step 5206, a plurality of implementation level elements of composite controllers, and a plurality of component controllers nested within the implementation level elements are assembled in accordance with a plan given by the combined object model to obtain an implementation level element of a system controller. In step 5207, objects describing functionality in the application level element of the system controller are connected to the internal objects of the implementation level elements, composite controllers and component controllers by means of mappings specified in the combined object model in order to create a complete system controller.

Figure 53:
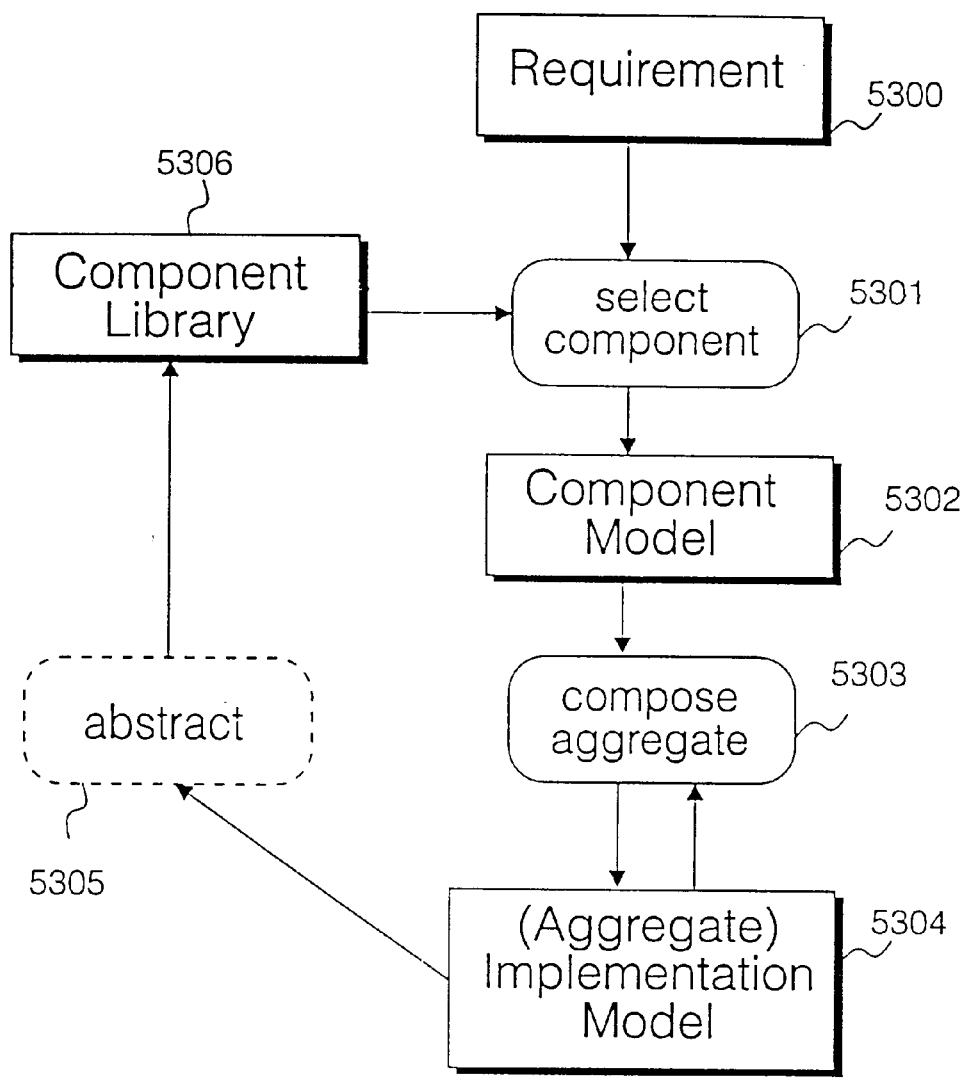
FIG. 53 illustrates steps for variation of a method of constructing a management system for a communications network.

Referring to FIG. 53 herein, there is described another example of steps for constructing a network management system using a library of reusable replaceable components and libraries of function controllers and component controllers as hereinbefore described. In step 5300 a requirement for a modification of a functionality of a communications network is established. In step 5301, appropriate components are selected in order to fulfill the functional requirements. In step 5302, component models comprising individual implementation models for individual components as hereinbefore described, which correspond to components selected from component library 5016 are composed and aggregated in step 5303 to form an aggregate implementation model 5304 reflecting the new functionality requirement set out in step 5300. The aggregate implementation model obtained in step 5304 may be abstracted in step 5305, for example by folding of the implementation model as hereinbefore described. When new network elements are created, through the composition aggregation of components, in steps 5303 and 5304, the implementation class models obtained through this process may be added to the component library 5306 for future use. The aggregate implementation model 5304 may be arrived at iteratively by assembly and composition of components from the component library. Physical construction of new network elements comprising a plurality of existing components may involve addition of sub-components to link the components. Each sub-component may be controlled by a new sub-component controller. The new sub-component controllers which connect the component controllers need to be designed and constructed. However, the components and component controllers which were taken from the component library 5306 need not be redesigned, but are assembled to each other as modular units wherein assembly of a set of hardware components is reflected in the management system by assembly of a set of corresponding component controllers.

| Abbreviations | |
| --- | --- |
| AAL | ATM Adaptation Layer |
| ATM | Asynchronous Transfer Mode |
| CCITT | Comité Consultatif International Télégraphique et Téléphonique (part of ITU). |
| CMIP | Common Management Information Protocol |
| CMISE | Common Management Information Service Elements |
| CTP | Connection Termination Point |
| DSP | Digital Signal Processor |
| IBM | International Business Machines |
| IP | Internet Protocol |
| ISDN | Integrated Services Digital Network |
| ISUP | ISDN Services User Part (of SS7) |
| ITU-T | International Telecommunications Union |
| MIB | Management Information Base |
| MTP | Message Transfer Part (of SS7) |
| NC | Network Controller |
| NE | Network Element |
| NMF | Network Management Forum |
| OAM | Operation, Administration and Maintenance |
| OSI | Open System Interconnect |
| SNMP | Simple Network Management Protocol |
| SS7 | Signalling System No 7 |
| TCP | Transmission Control Protocol |
| TTP | Trail Termination Poirt |
| VC | Virtual Circuit |
| VTG | Virtual Trunk Group |

We claim:

1. A method of constructing a management base of a communications network, said communications network comprising:

a plurality of components, each component comprising a unit of manufacture providing a functionality within said network, and which is capable of being managed individually as a discrete entity;

said plurality of components arranged into a plurality of assemblies of components, each said assembly arranged to cooperate with other said assemblies, and each said assembly capable of being managed as a whole;

said method comprising the steps of:

representing an overall functionality of said network by an application model, in which each said function of said network is modeled independently of its implementation within said network;

decomposing said application model into an implementation model, in which every function represented by said application model is represented in said implementation model;

representing said application model as a first plurality of objects;

modeling a connectivity layering between individual modeled functions within said application model;

representing said implementation model as a second plurality of objects;

connecting said first plurality of objects with said second plurality of objects to obtain a combined object model; and constructing said management base in accordance with said combined object model.

2. The method as claimed in claim 1, wherein individual portions of said implementation model representing duplicated components or assemblies of components are re-used recursively within said implementation model.

3. The method as claimed in claim 1, where-in individual elements of said application model representing a duplicated said component, or a duplicated said assembly of components is re-used recursively within said application model.

4. A method of constructing a management base of a communications network, said communications network comprising:

a plurality of components, each component comprising a unit of manufacture providing a functionality within said network, and which is capable of being managed individually as a discrete entity;

said plurality of components arranged into a plurality of assemblies of components, each said assembly arranged to cooperate with other said assemblies, and each said assembly capable of being managed as a whole;

said method comprising the steps of:

representing an overall functionality of said network by an application model, in which each said function of said network is modeled independently of its implementation within said network;

decomposing said application model into an implementation model, in which every function represented by said application model is represented in said implementation model;

representing said application model as a first plurality of objects;

representing said implementation model as a second plurality of objects by modeling connectivities between assemblies of components at a first layer and assemblies of components at a second layer;

connecting said first plurality of objects with said second plurality of objects to obtain a combined object model; and constructing said management base in accordance with said combined object model.

5. A method of constructing a management base of a communications network, said communications network comprising:

a plurality of components, each component comprising a unit of manufacture providing a functionality within said network, and which is capable of being managed individually as a discrete entity;

said plurality of components arranged into a plurality of assemblies of components, each said assembly arranged to cooperate with other said assemblies, and each said assembly capable of being managed as a whole;

said method comprising the steps of:

representing an overall functionality of said network by an application model, in which each said function of said network is modeled independently of its implementation within said network;

decomposing said application model into an implementation model, in which every function represented by said application model is represented in said implementation model;

representing said application model as a first plurality of objects;

of optimizing said application class model by identifying symmetrical portions of said application class model and folding said symmetrical portions to obtain a folded application class model;

representing said implementation model as a second plurality of objects;

connecting said first plurality of objects with said second plurality of objects to obtain a combined object model; and constructing said management base in accordance with said combined object model.

6. A method of constructing a management base of a communications network, said communications network comprising:

a plurality of components, each component comprising a unit of manufacture providing a functionality within said network, and which is capable of being managed individually as a discrete entity;

said plurality of components arranged into a plurality of assemblies of components, each said assembly arranged to cooperate with other said assemblies, and each said assembly capable of being managed as a whole;

said method comprising the steps of:

representing an overall functionality of said network by an application model, in which each said function of said network is modeled independently of its implementation within said network;

decomposing said application model into an implementation model, in which every function represented by said application model is represented in said implementation model;

representing said application model as a first plurality of objects;

optimizing said implementation class model by identifying symmetrical portions of said implementation class model and folding said symmetrical portions of said implementation class model to obtain a folded implementation class model;

representing said implementation model as a second plurality of objects;

connecting said first plurality of objects with said second plurality of objects to obtain a combined object model; and constructing said management base in accordance with said combined object model.

* * * * *